United States Patent [19]

Kitaura et al.

[11] Patent Number: 4,816,855
[45] Date of Patent: Mar. 28, 1989

[54] DATA TRANSMISSION SYSTEM FOR A CAMERA

[75] Inventors: Mashio Kitaura, Tondabayashi; Masaaki Nakai, Kawachinagano; Tadahiro Yoshida, Takatsuki; Yoshiiku Kikukawa, Kishiwada; Takanobu Omaki, Sennan; Nobuyuki Taniguchi, Tondabayashi, all of Japan

[73] Assignee: Minolta Camera Kabushiki Kaisha, Osaka, Japan

[21] Appl. No.: 126,606

[22] Filed: Nov. 30, 1987

Related U.S. Application Data

[63] Continuation of Ser. No. 879,110, May 23, 1986, abandoned.

[30] Foreign Application Priority Data

| Sep. 26, 1984 | [JP] | Japan | 59-201381 |
| Feb. 27, 1985 | [JP] | Japan | 60-38243 |
| Feb. 28, 1985 | [JP] | Japan | 60-39476 |
| Mar. 6, 1985 | [JP] | Japan | 60-44361 |

[51] Int. Cl.⁴ .................. G03B 15/05; G03B 17/38; G01J 1/42
[52] U.S. Cl. .................. 354/415; 354/423; 354/441; 354/446; 354/266; 356/218
[58] Field of Search .............. 354/410, 412, 413, 415, 354/444, 465, 471, 474, 475, 126, 127.1, 127.11, 127.12, 127.13, 266, 268, 289.1, 289.12, 446, 441, 423; 352/140; 350/218

[56] References Cited

U.S. PATENT DOCUMENTS

| 3,518,927 | 7/1970 | Mehlitz | 354/445 X |
| 4,036,762 | 7/1977 | Troetscher | 354/410 X |
| 4,239,356 | 12/1980 | Freudenschuss | 352/140 X |
| 4,462,666 | 7/1984 | Orban | 354/126 |
| 4,601,557 | 7/1986 | Bogle et al. | 352/140 |
| 4,636,052 | 1/1987 | Bowsher | 354/410 |

FOREIGN PATENT DOCUMENTS

| 95057 | 7/1980 | Japan . |
| 11384 | 7/1981 | Japan . |
| 181293 | 11/1982 | Japan . |

Primary Examiner—W. B. Perkey
Attorney, Agent, or Firm—Price, Gess & Ubell

[57] ABSTRACT

From a data transmission device to a camera system including a camera and electronic flash device, operation instruction data such as set or calculated exposure control data, shutter release data instructing the operation of the camera system, flash emission testing data and the like are serially transmitted in the form of infrared light signal. When the reception of these data is completed, the camera starts its operation to control given operation of the camera system such as the exposure initiation of the camera, test light emission of the electronic flash device and the like in accordance with received data. Additionally, in the case where the data transmission device is an exposure meter which measures flash light and daylight, flash light emission operation or light emission interruption operation of the electronic flash device is controlled in accordance with the determination whether the exposure control data calculated and transmitted to the camera system is for the daylight photography or the flash light photography.

7 Claims, 33 Drawing Sheets

DATA TRANSMISSION SYSTEM FOR A CAMERA

This is a continuation of application Ser. No. 879,110, filed May 23, 1986, abandoned.

TECHNICAL FIELD

The present invention relates to a data transmission system composed of a camera system including a camera body, a flash device such as an electronic flash device, and an exchangeable lens, and a data transmission device which is distant from the camera system and exchanges data with the camera system, and in particular it pertains to a camera data transmission system wherein the operation of the camera system is controlled in accordance with the data transmitted from the data transmission device.

TECHNICAL BACKGROUND

When a picture is taken on the basis of a value measured by an incident light exposure meter or flash meter, the light is measured in the vicinity of an object or person to be photographed and the measuring place is distant from the picture taking or camera place. Accordingly, the photographer must move between the two places, to measure the light at the measuring position and to set exposure conditions and release the camera shutter at the camera position. Thus, such picture taking requires complex operation. To cope with such a trouble, a camera data transmission system has been proposed in a Japanese laid-open patent application with a laid open number 52-58529. In the system, an external exposure meter can be connected through a cable with a camera which is provided with a built-in exposure meter and the camera, when the external exposure meter is connected therewith, controls its exposure in accordance with the light measurement data measured by the external exposure meter at a place distant from the camera and captured by the camera, with the light measurement data from the built-in exposure meter being replaced thereby. However, the prior art system requires a cable for connecting the external exposure meter with the camera and is inconvenient in that the cable sometimes disturbs the measuring operation and that the length of the cable restricts the distance from the camera to a place where the measurement can be made. Additionally, although the light measurement data from the external exposure meter is automatically input to the camera, the setting of an exposure time and a diaphragm aperture value and the shutter release operation must be made manually. Accordingly, when the photographer wishes to take a picture without a desired exposure time or diaphragm aperture for his or her desired photographic effect, or when he or she suddenly comes across a chance for shutter releasing during the measurement, he or she must return to the camera position to manually set the exposure condition and/or depress the shutter release button. Thus, the system still requires troublesome operation.

Further, the camera of the prior art system is provided with a power switch which is operated independently of the depression of the shutter release button to actuate the camera exposure measuring and calculating circuit, such that the camera can capture the light measurement data from the external meter at any time instead of the data of the built-in exposure meter. The camera is arranged such that it maintains the light measuring operation with the built-in exposure meter while the power switch is closed to effect power supply. In the case when a picture is taken on the basis of the light measurement data fed from the external exposure meter, the built-in exposure meter makes vain measurement and the electric power is wasted from turning-on of the power switch till the light measurement being made by the external exposure meter.

In the prior art system, the external flash meter is not to be connected with the camera. Even if the system is arranged such that flash meter can be connected with the camera with data from daylight photography and flash light photography being selectively input to the camera, following inconvenience is expected. Electronic flash devices are generally constructed to start its light emission, when coupled with cameras, in response to a light emission instruction signal from the camera such as an X contact closure signal produced upon fully opening of the camera shutter. Accordingly, when the combination of the camera and the electronic flash device is desired to be switched from the flash photography condition wherein the flash device is fired upon photography, to the daylight photography wherein a picture is taken without the firing of the flash device, a manual operation for disabling the flash device is required, such as decoupling the flash device from the camera or turning off the switch of the flash device. Manual operation is also required when the combination is switched from the daylight photography to the flash photography mode. Thus, although the system dispenses with the trouble of reading the indication of the exposure meter and manually setting the exposure condition, it still requires a manual operation for the switching of the photography mode, resulting in the remaining of complexity of operation.

Many cameras have been put into practice which have a function of measuring the object brightness passing through the camera objective lens and reflected by the film plane during the film exposure, i.e., during the camera operation, i.e., the function of TTL direct light measuring, and which supplies a flash firing interruption signal to the flash device when the integration of the light measurement reaches a given level. On the other hand, the flash meter is used for measuring the amount of flash light with the flash device being fired independently prior to the camera operation, in order to determine the exposure condition for a particular photographic effect wherein a desired exposure is given with the flash light to a desired portion of the object to be photographed. Hence, the TTL direct light measurement is effected at a different time from the flash light measurement by means of the flash meter. When the amount of flash light is measured with the flash meter, the camera is not in operation, i.e., the camera does not work with no flash light interruption signal being output. At that time, the flash device is fired prior to a camera operation to emit a given amount of flash light and the flash meter calculates, on the basis of the measurement of the given flash light amount, an exposure control data such as a diaphragm aperture value or an exposure time with which a desired exposure is given for a desired portion of an object to be photographed. Thus, a flash photography is made in accordance with predetermined data such as the exposure control data calculated by the flash meter, a desired photography is effected if the flash device emits the same amount of light as that at the time of the measurement and calculation by means of the flash meter. However, it is likely to occur that the flash photography system that controls the flash light amount on the basis of the TTL direct light measurement, will generate a flash light interruption signal at a time when the amount of the emitted flash light reaches a value different from the value of the amount at the time of the prior flash light measurement, since the TTL direct light measuring section of the camera is different from the light receiving portion of the flash meter, in the light acceptance angle and viewing portion in the object to be photographed. Thus, the amount of light emitted upon photography differs from the light amount at the time of measurement by means of the flash meter and the probability of undesired exposure is high.

DISCLOSURE OF THE INVENTION

An object of the present invention is to provide a data transmission system for remote control which controls a desired camera operation and automatically sets exposure data in the camera, at a place distant from the camera system.

Another object of the present invention is to provide a data transmission device which enables wireless remote control of desired operation of the camera system and setting or adjustment of camera exposure control data.

Still another object of the present invention is to provide a data transmission system which is simple in the construction and operation for the control of desired operation of the camera system and for the setting or adjustment of the camera exposure data.

Further object of the present invention is to provide a camera system which less wastes electric power.

Still further object of the present invention is to provide a flash photography system in which flash firing and non-flash firing are automatically selected.

Yet another object of the present invention is to provide a flash photography system wherein the exposure with flash light is automatically controlled selectively in accordance with either the light measurement by means of the flash meter and the TTL direct light measurement.

Additional object of the present invention is to provide a flash meter which may be operated from a distance to control the operation of the camera system in the daylight and flash photography mode.

According to the present invention, the data transmission system serially and wirelessly transmits to a camera system exposure control data based on a light measurement and manual settings and data for controlling desired operation of the camera system. Upon completion of receipt of the serial data, the camera starts its operation with the operation being controlled in accordance with the received data. With this arrangement, exposure control data in accordance with the light measurement or the manual setting is automatically set in the camera and operation control data such as a shutter release data for initiating the camera exposure operation and a test light emission data for firing the electronic flash device independently, are transmitted to the camera system to effect automatic operation of the camera system, such as the automatic camera shutter release operation and the test light emission of the flash device.

In accordance with the determination whether the exposure control data of the data transmitted to the camera system is for the daylight photography or for the flash light photography, automatic selection is made between flash firing and non-flash firing or between flash photographies in compliance with the light measurement by means of the flash meter and the light measurement by means of the TTL direct light measurement.

PREFERRED EMBODIMENTS FOR CARRYING OUT THE INVENTION

Figure 1:
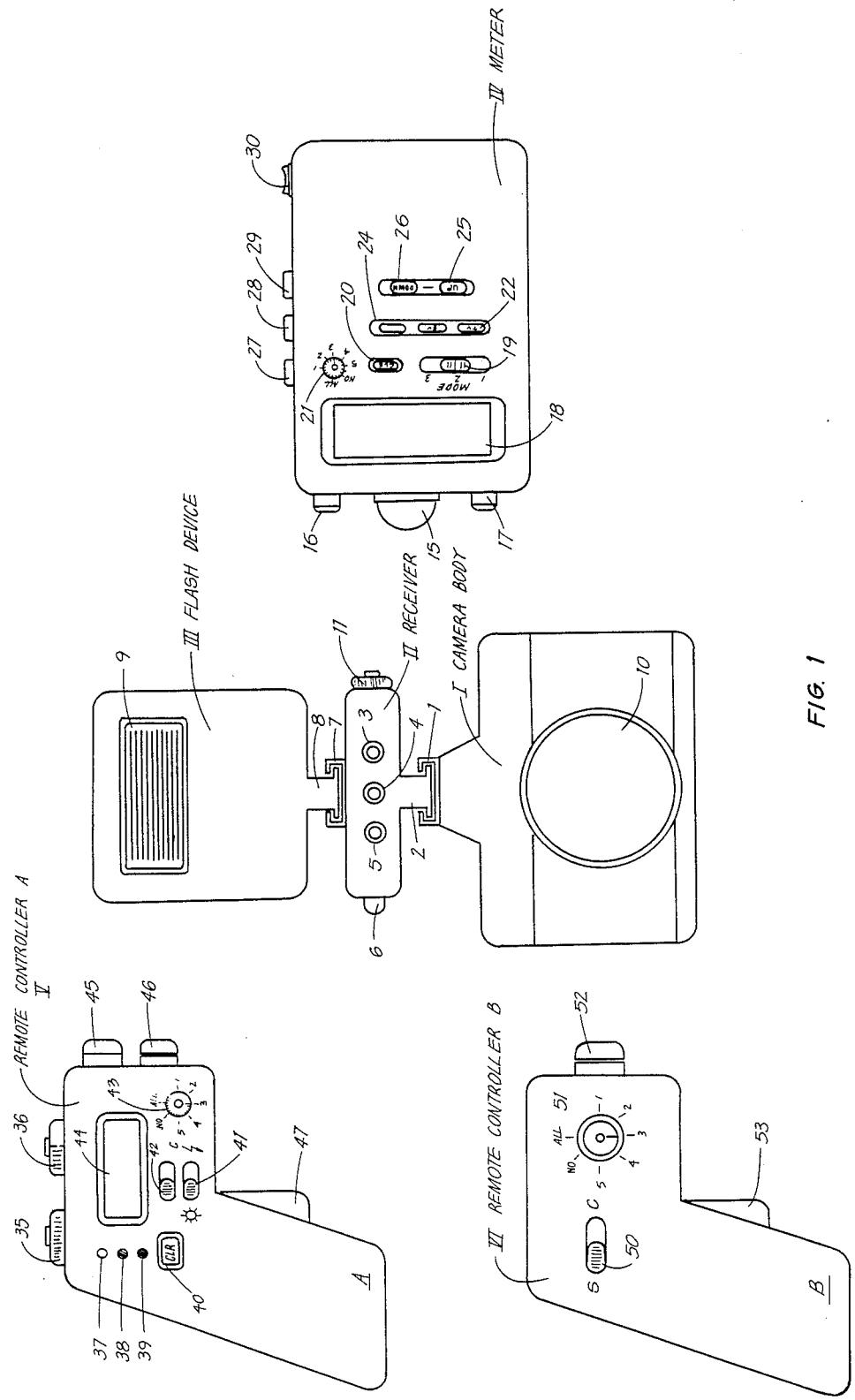
FIG. 1 illustrates the outer appearance of the camera system according to the present invention.

FIG. 1 shows an outer appearance of a photographic camera system to which the present invention is applied. The camera system is composed of a camera body I, a signal receiving device II (hereinafter referred to as receiver), an electronic flash device III, and an exposure meter IV (hereinafter referred to as a meter), a signal transmitter A (V) (hereinafter referred to as a remote controller A), and a signal transmitter B (VI) (hereinafter referred to as a remote controller B). In the system, the camera body I and the flash device III are controlled by the meter IV or the remote controller A (V) or B (VI). The camera body I, with reference to FIG. 1, is provided on its top with a hot accessory shoe 1 on which the signal receiving device II or the flash device III may be mounted. An objective lens 10 is mounted on the camera body.

The receiver II is provided with a light receiving portion 3 adapted to receive a data carrying light signal projected from the remote controller A or B or the meter IV. A light emitter 4 emits a data carrying light signal to the remote controller A or B. A light receiving section 5 receives light emitted from a flash device other than the flash device III in order to generate an output signal for initiating the light emission of the flash device III which is mounted on the receiver II. A display section 6 makes an indication when the receiver II has properly received data from the meter IV or the remote controller A or B.

A dial 11 is operated to designate or select the channel of the receiver II. Like the camera body I, the receiver II is also provided with a hot shoe 7 on which a flash device III is mounted through a mounting member 8. The flash device III emits light from a light emitting portion 9 to illuminate an object to be photographed.

Figure 5:
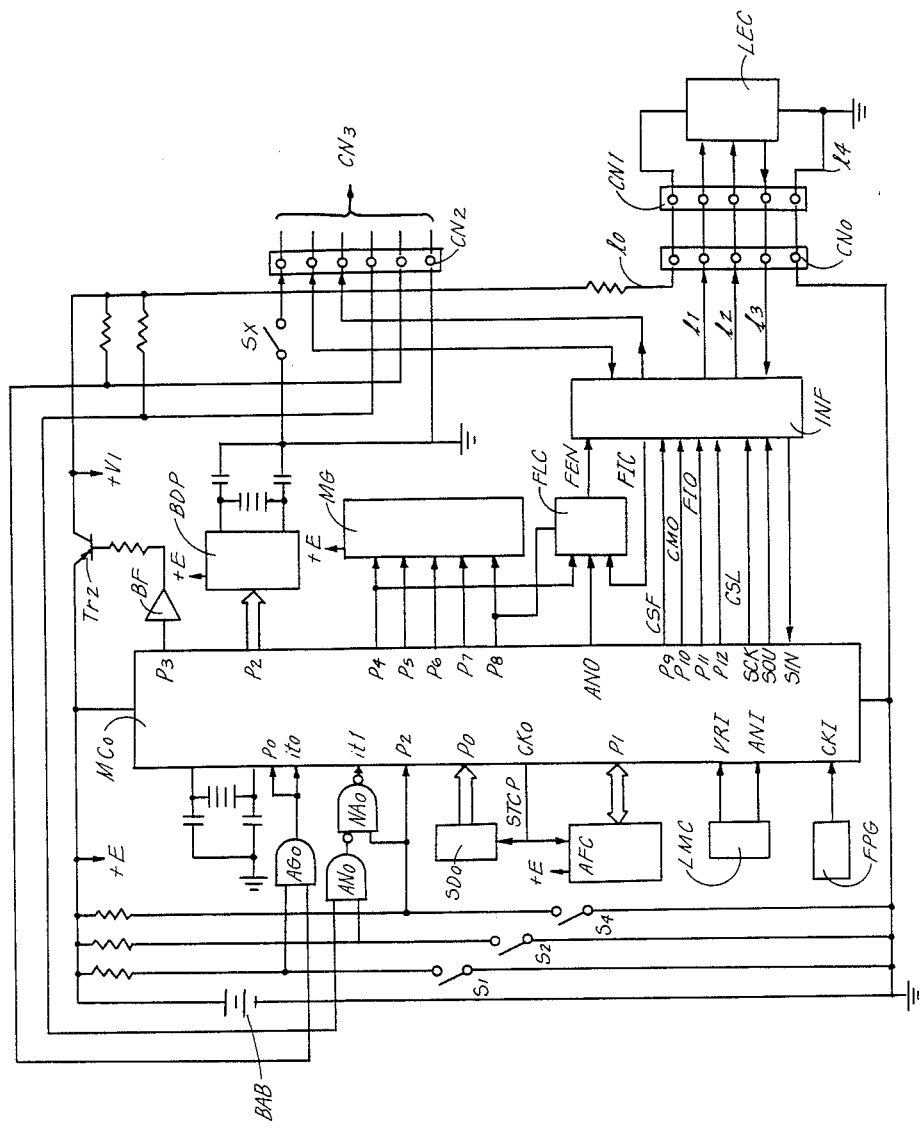
FIGS. 5(a) and 5(b) are block diagrams showing the general circuit construction of the camera I, the signal receiving device II and the flash device III.
Figure 5:
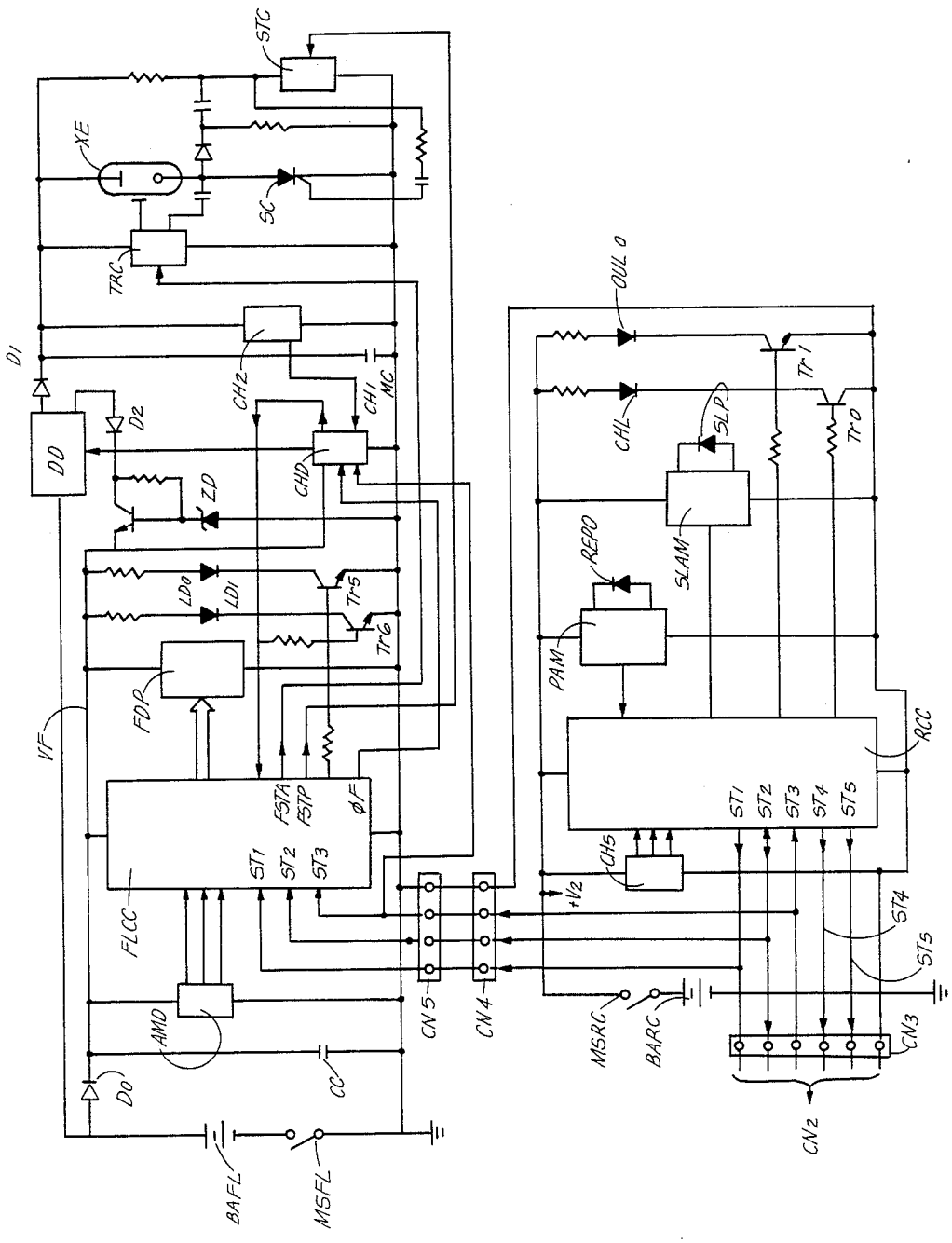
Figure 6:
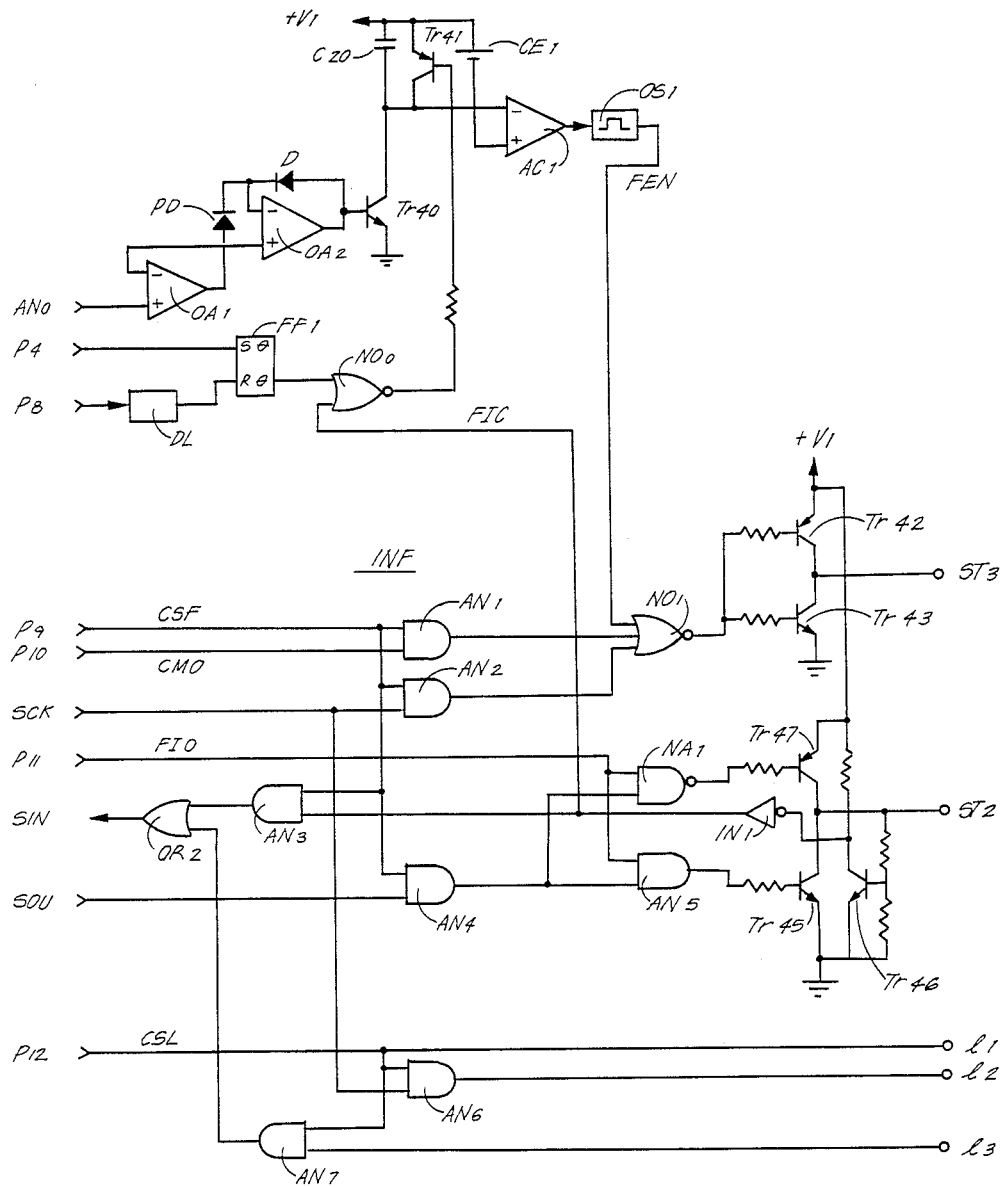
FIG. 6 is a circuit diagram showing an exemplary definite circuits of the blocks INF and FLC in the camera I shown in FIG. 5.
Figure 7:
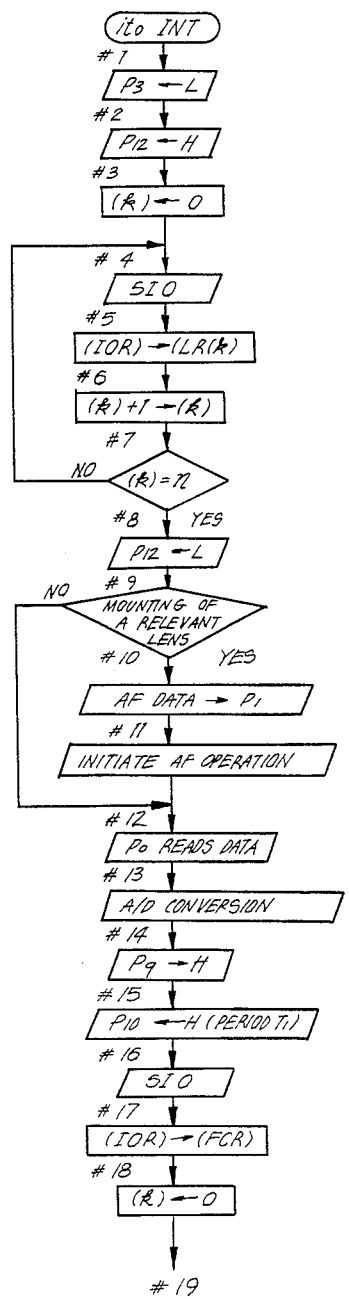
FIGS. 7(a), 7(b), 7(c), 8(a), 8(b), and 8(c) are flowcharts for showing the operation of the microcomputer MC0 in the camera I.
Figure 7:
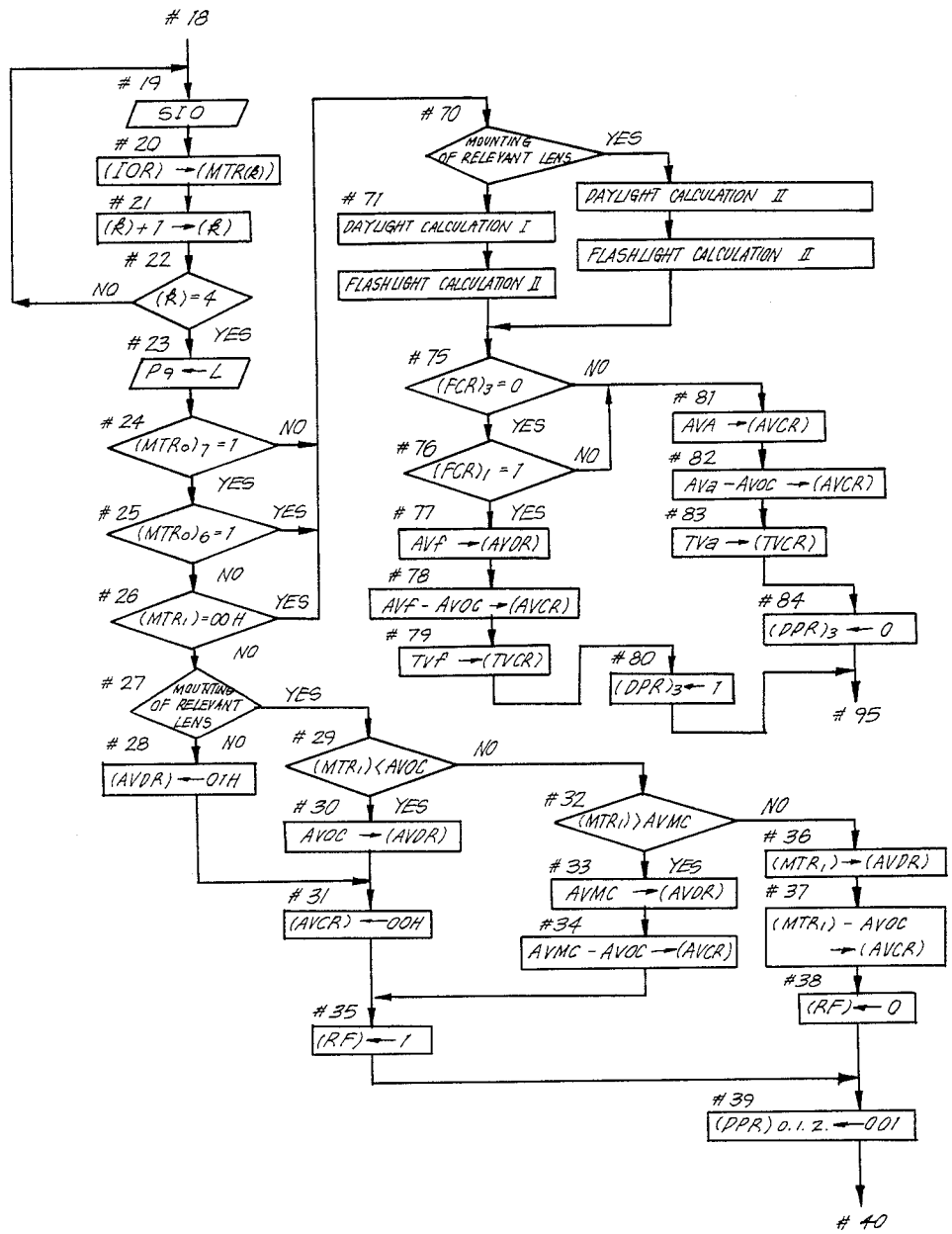
Figure 7:
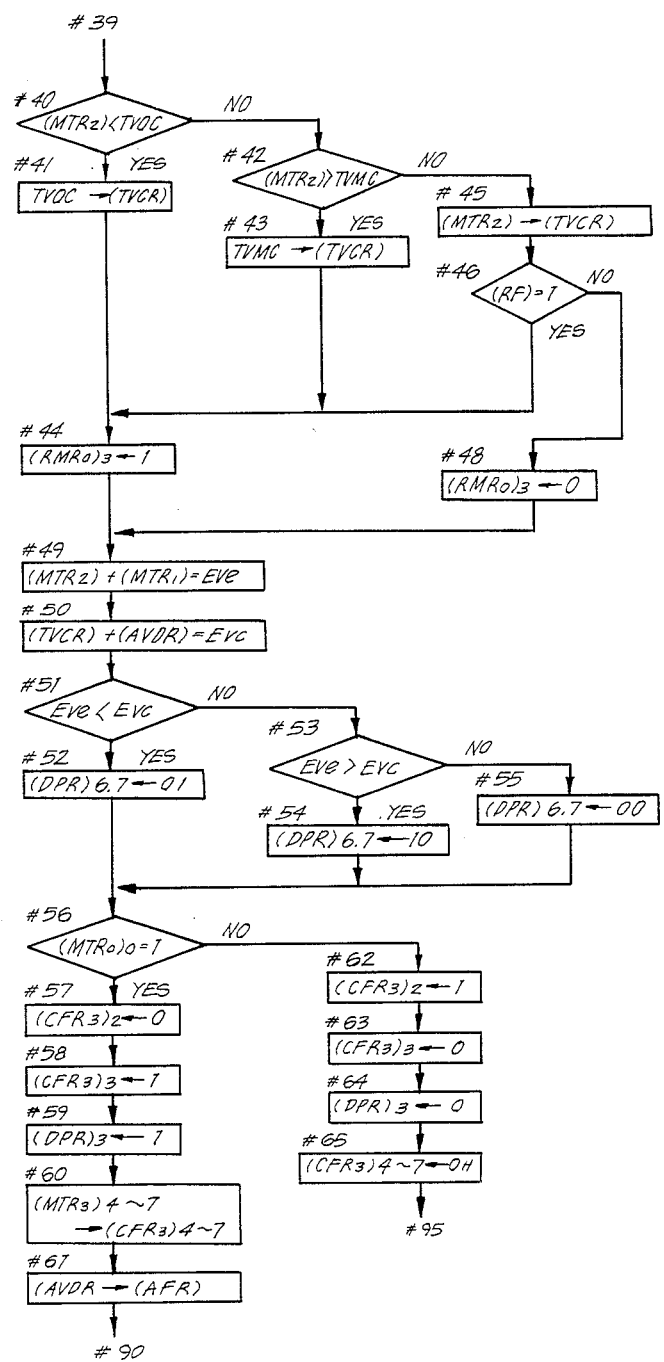
Figure 8:
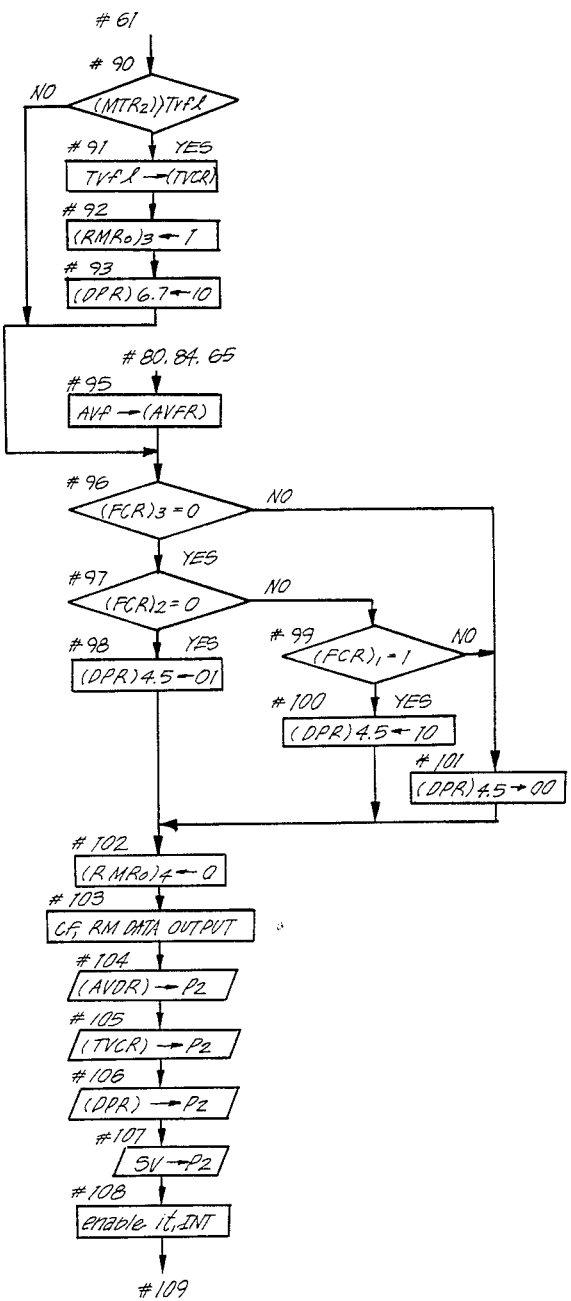
Figure 8B:
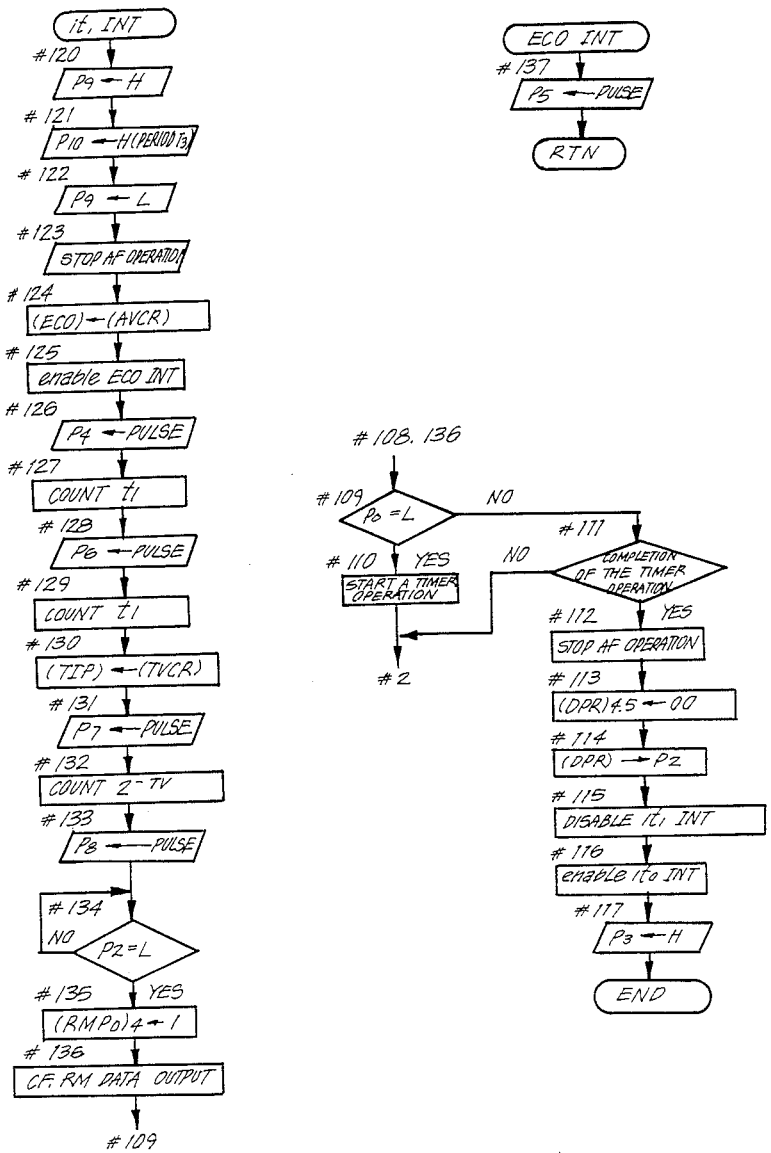
Figure 8:
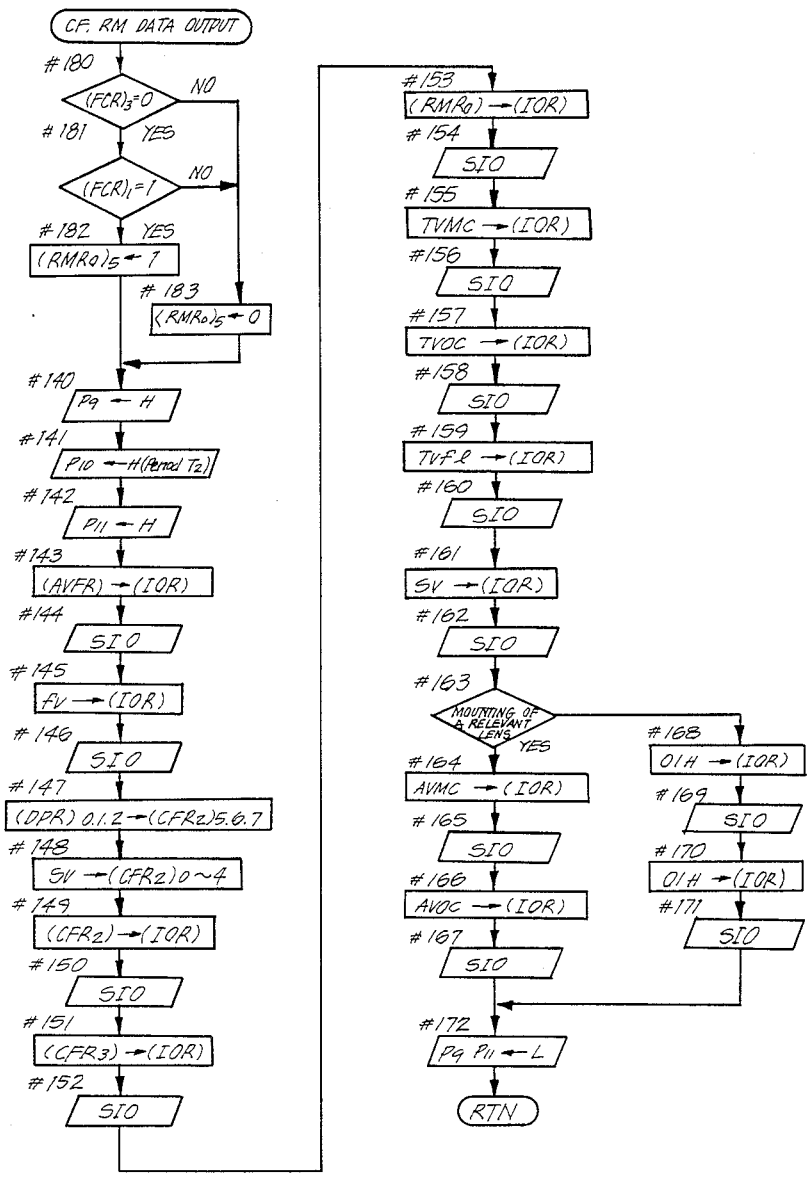

FIG. 5 is a block diagram showing the general construction and mutual relationship of the above described camera body I, receiver II and flash device III. FIG. 6 shows exemplary definite circuit arrangements of the data input/output circuit or I/O interface circuit INF and the light emission control circuit FLC in the camera body I. FIGS. 7 and 8 are flow charts showing the operation of a microcomputer MCo in the camera body.

Figure 2:
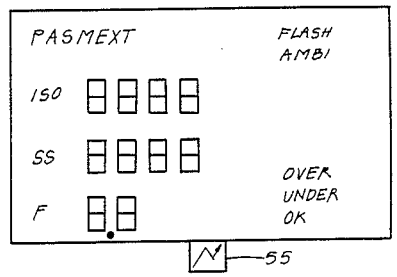
FIGS. 2, 3 and 4 respectively illustrate the display portions of the camera I, the flash device III and the exposure meter IV shown in FIG. 1.

The camera body I is provided with a display portion as shown in FIG. 2. With reference to FIG. 2, the characters "P", "A", "S", "M" and "EXT" respectively represent exposure control modes. The character "P" is displayed in the case of programmed automatic exposure control mode (hereinafter referred to as P mode). The character "A" is displayed in the case of the diaphragm aperture priority automatic exposure control mode (hereinafter referred to as A mode). The character "S" is displayed in the case of exposure time or shutter speed priority automatic diaphragm aperture control mode (hereinafter referred to as S mode). The character "M" is displayed in the manual exposure control mode (hereinafter referred to as M mode) wherein both the diaphragm aperture and the exposure time are controlled in accordance with manual settings. In the case of the exposure control mode wherein the camera exposure is controlled in accordance with the exposure control data transmitted from the meter IV or the remote controller A (hereinafter referred to as external mode), the character "EXT" is displayed with the character "FLASH" being displayed at the same time when the transmitted data is for the control of flash photography. When the transmitted data is for the control of natural light or ambient light photography, character "AMBI" is displayed along with the character "EXT".

Figure 13:
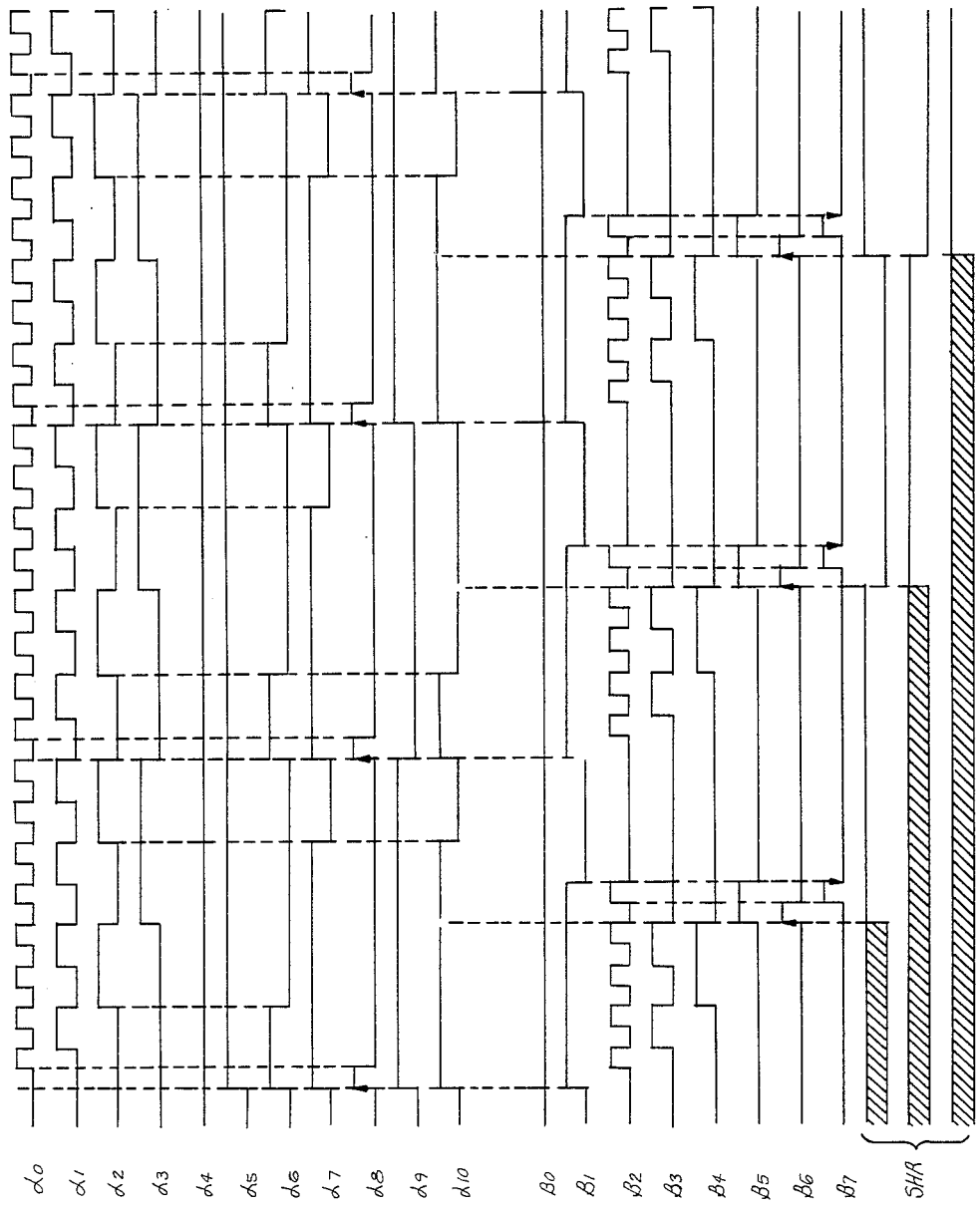
FIG. 13 is a timechart showing the operation of those circuits in FIG. 9.
Figure 14:
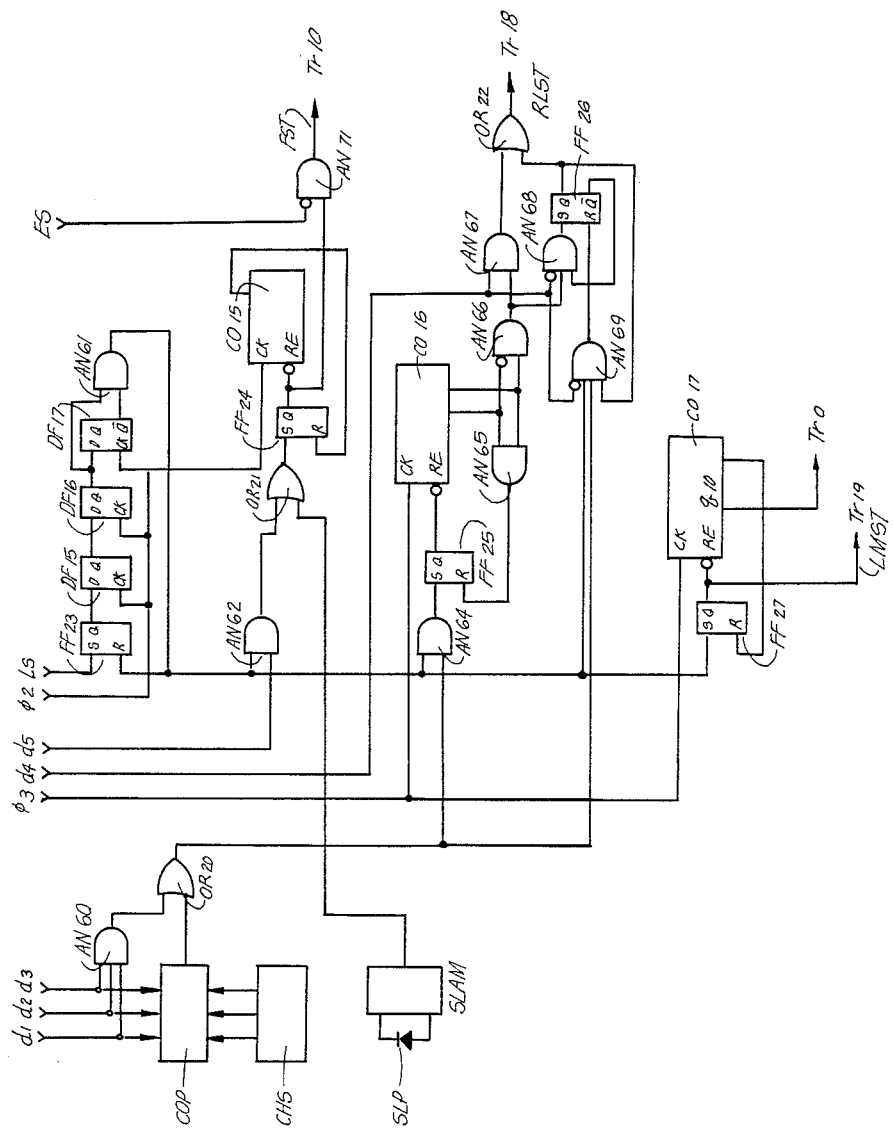
Figure 15:
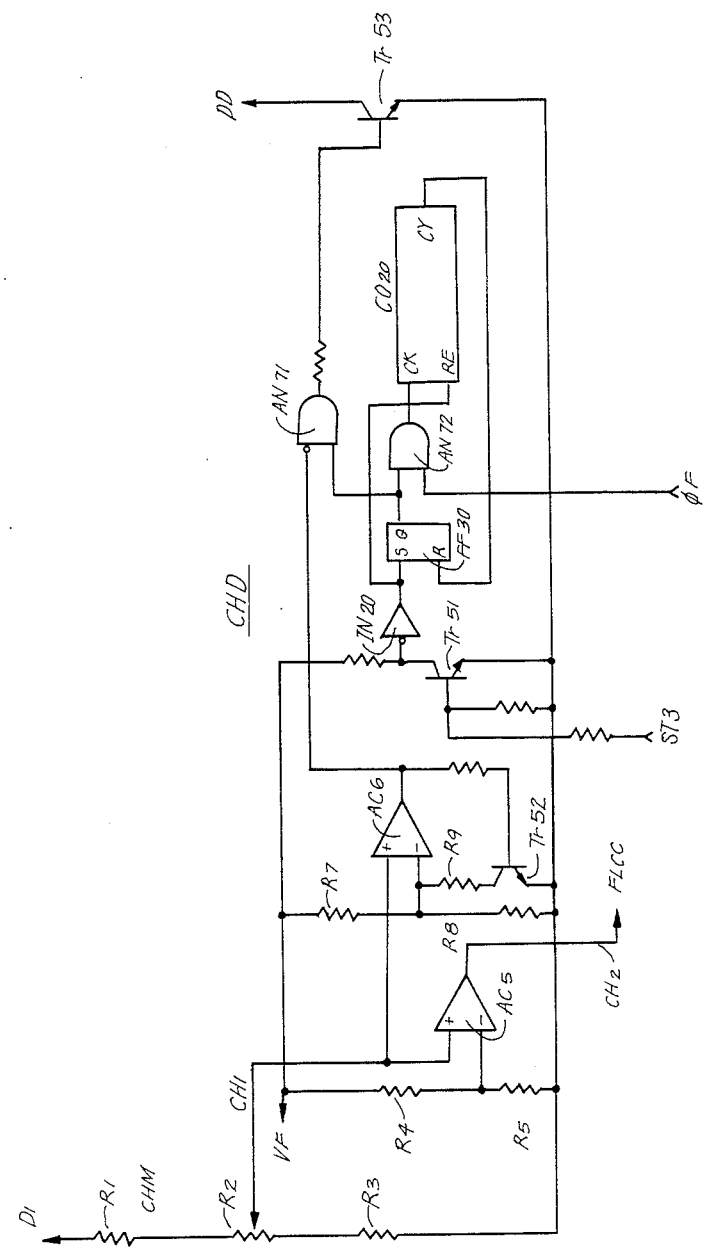
FIGS. 15 and 16 are circuit diagrams showing exemplary definite circuits of the blocks CHD and FLCC of the flash device III shown in FIG. 5.
Figure 16:
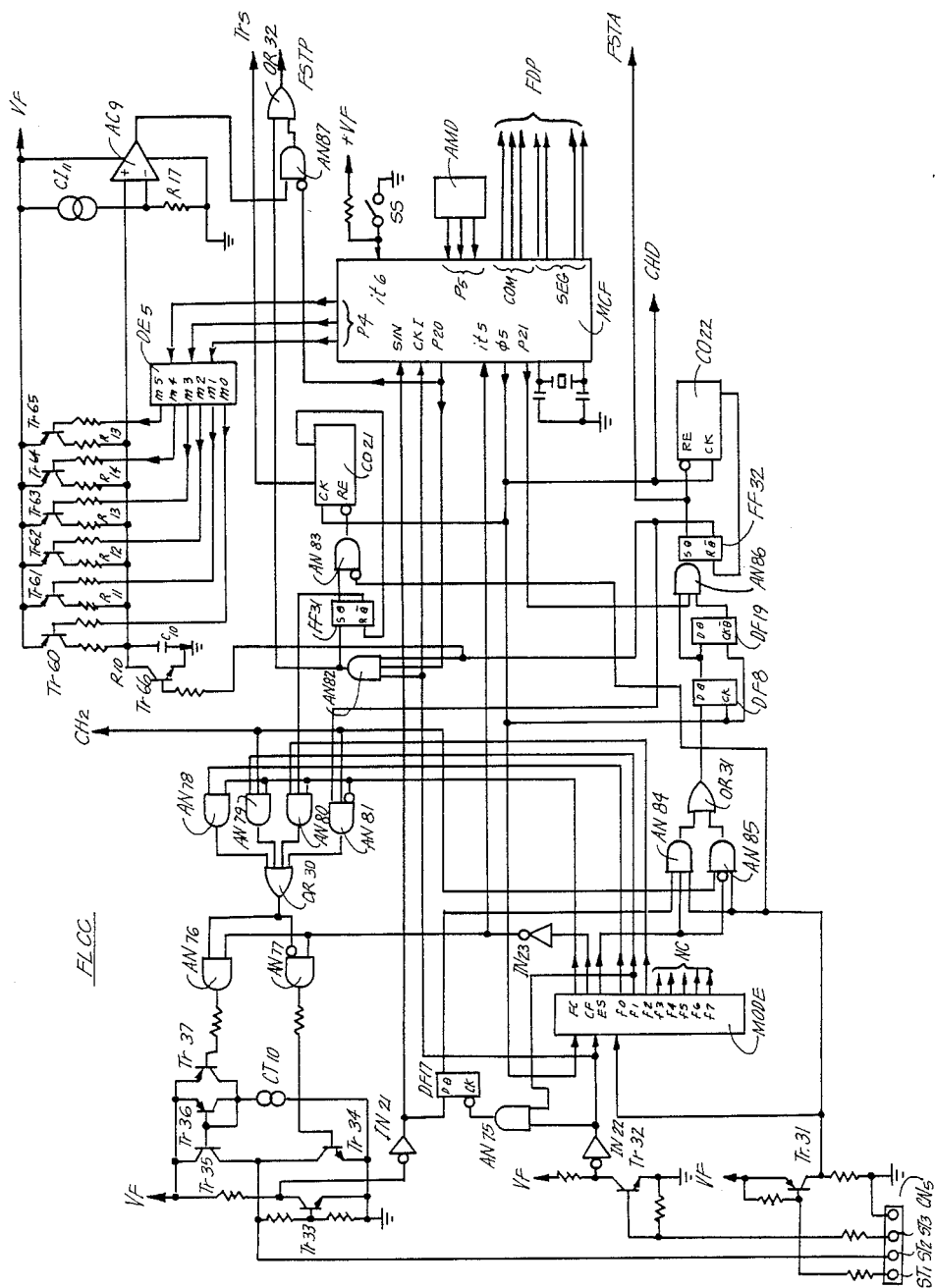
Figure 17A:
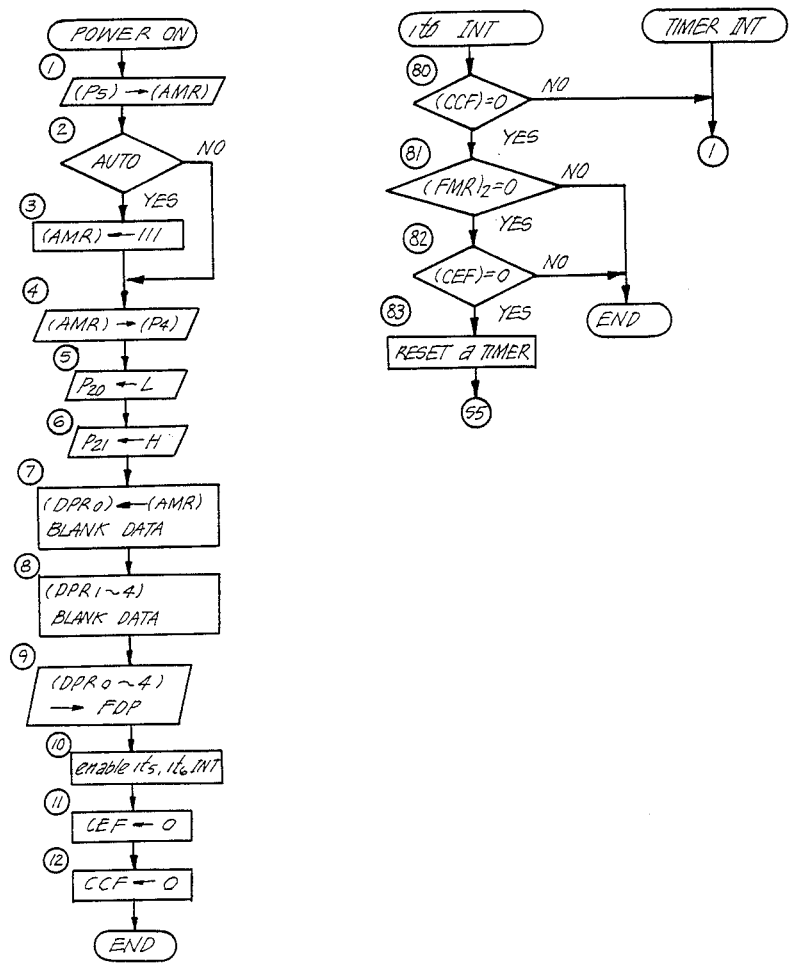
FIGS. 17(a) and 17(b) comprise a flowchart showing the operation of the microcomputer MCF in the flash device.
Figure 17B:
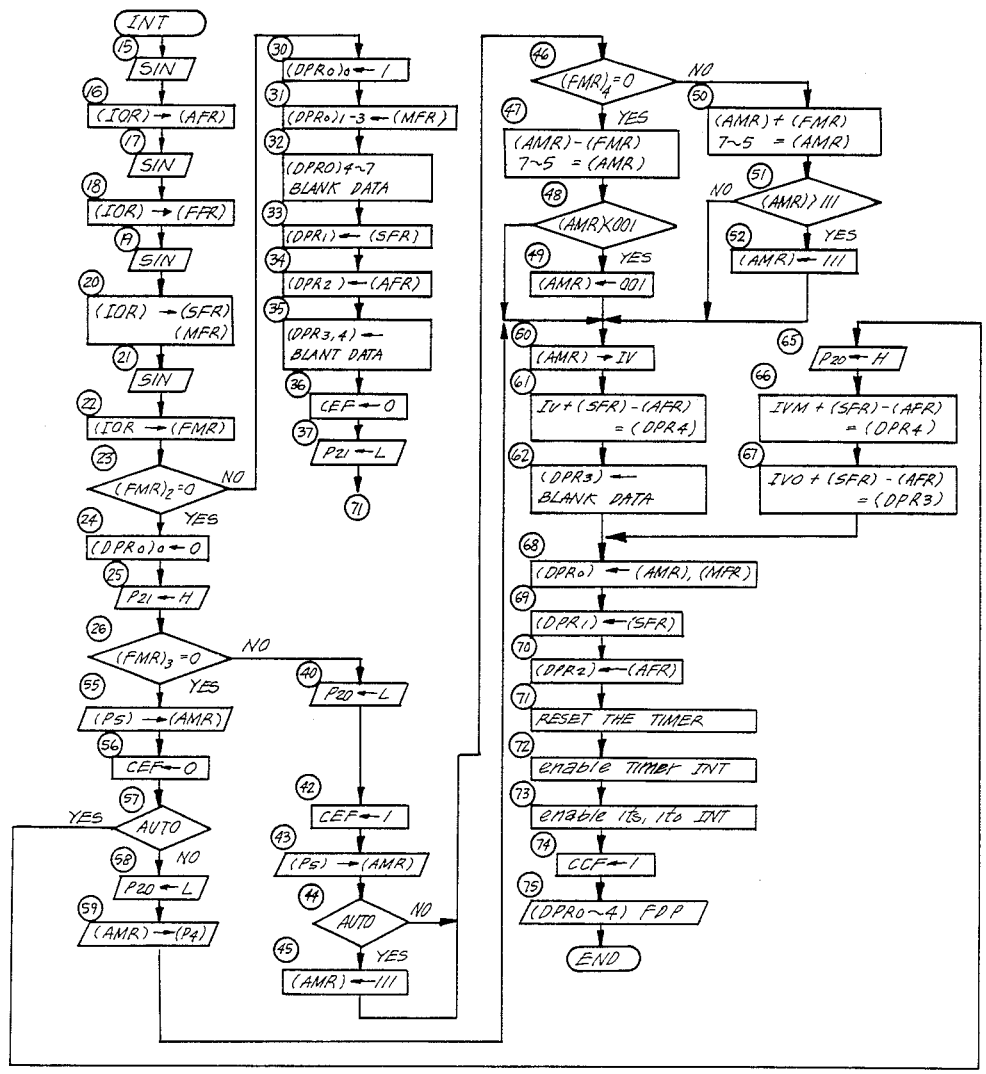

An ISO data, i.e. the data of film sensitivity is displayed at the portion of ISO. The data of the exposure time is displayed at the portion SS, while the data of the diaphragm aperture is displayed at the portion F. Those data are displayed numerically. As to the display of the exposure control data, characters "OVER" and "UNDER" are displayed respectively for the case of over exposure and under exposure. In the case of the manual exposure control mode, a character "OK" is displayed when a proper exposure is expected with the manually set exposure time and diaphragm aperture. The flash mark "⚡", i.e. the mark of lightning blinks with a given frequency when the flash device becomes ready for light emission. The flash mark also blinks but with a higher frequency when the light emission of the flash device has been automatically and properly controlled. An exemplary definite circuit of the receiver II is shown in FIGS. 9 through 14 and will be explained later. An exemplary definite circuit of the flash device III is shown in FIGS. 15 through 17.

Figure 3:
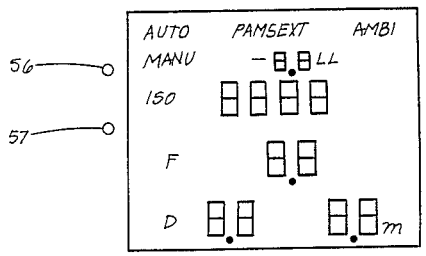

The flash device III is provided on its back with a display portion as shown in FIG. 3. With reference to FIG. 3, an indicator 56 is energized when the flash device III has become ready for light emission, while another indicator 57 blinks for a given period when the light emission of the flash device has been automatically controlled to a proper amount in accordance with the through-the-lens (TTL) light measurement in the camera body I. A character "AUTO" is displayed when the flash device III is set to an automatic light control mode. A character "MANU" is displayed when the flash device III is set to a manual light control mode wherein the flash device III emits a manually set amount of light. In the case of the manual light control mode, a character "FULL" is displayed when the full light emission is manually set. A numerical value "−0.5" is displayed for the setting of emitted light amount that is less than the full light emission by 0.5 Ev as measured by the unit of APEX system. A numerical value "−1.0" is displayed for the setting of 1 Ev less than the full light emission, "−1.5" for the setting of 1.5 Ev less amount of light and in the same manner numerical values are displayed every 0.5 Ev until 3 Ev less than the full light emission for which a numerical value "−3.0" is displayed. At the ISO, i.e. the film sensitivity display portion is displayed the ISO data fed from the camera body I. At the F portion is displayed a diaphragm aperture data fed from the camera body. At the D portion is for the display of proper exposure available distance, i.e. the limit of the camera-to-object distance within which a proper exposure is guaranteed in the flash photography with the flash device. When the automatic flash light control mode is set, what is displayed at the portion D is a proper exposure available range of the camera-to-object distance which is determined by the ISO data and the diaphragm aperture data fed from the camera body I and the data of the maximum and minimum amounts of light to be emitted from the flash device III. A proper exposure is guaranteed when the camera-to-object distance is within the range. When the manual light control mode is set, the maximum proper exposure available camera-to-object distance is displayed that is determined by the manually set light amount data and the data of the ISO and the diaphragm aperture fed from the camera.

The reference character IV denotes an exposure meter of which exemplary definite construction and operation is shown in FIGS. 18 through 23. The exposure meter is provided with a hemispherical light receptor 15 for incident light measuring and a photoelectric element disposed behind the light receptor 15. A transmitter 16 is adapted to transmit data that are obtained by the exposure meter IV. A signal receiver 17 receives data that are transmitted from the light emitter 4 of the receiver II. A mode selector switch 19 is manually operated to select a measuring mode of the exposure meter IV. When the mode selector switch 19 is set to a position 1, an ambient light measuring mode (hereinafter referred to as AMBI mode) is selected. A position 2 is for the selection of an with-cord flash light measuring mode (hereinafter referred to as CORD mode), and a position 3 is for the selection of non-cord or cordless flash light measuring mode (hereinafter referred to as NONCORD mode). When the CORD mode is selected, depression of a measurement initiation button 27 causes a flash terminal 30 to output a trigger signal which in turn causes the light emission of the flash device III, and the emitted light is measured by the exposure meter IV. In the case of NONCORD mode, the light measuring operation is initiated when the flash device emits light in response to the depression of the measurement initiation button 27 and the rising of the flash light intensity is detected.

The exposure meter IV is further provided with a key 22 for exposure time setting, a key 23 for film sensitivity setting and a changed amount data setting key 24 for setting the data of the amount by which the data of the flash light amount is changed. Those setting keys are operated in combination with UP key 25 and DOWN key 26 to set three kinds of exposure control data, i.e. the data of the exposure time, the film sensitivity and the amount of flash emission to be changed.

When a transmission key 28 is depressed, the data set or obtained in the exposure meter IV is transmitted in the form of light signals from the transmitter 16. When the transmission key 28 is depressed with a light emission testing key 29 being depressed, a light emission testing signal is transmitted in the form of light signals from the emitter 16. The flash device III mounted on the receiver II is fired when the light signals are received by the receiver II, the exposure meter IV measures in the NONCORD mode the amount of light emitted from the flash device III.

When the transmission key 28 is depressed with the light emission testing key 29 being left undepressed, an exposure control operation is initiated in a camera I or cameras which is coupled with the receiver II with a channel selected by a channel selection dial 21. The channels to be selected are from 1 through 5 and the channel selection dial 21 is further settable to NO position and ALL position. At the NO position of the dial 21 only the data transmisson is effected but the camera is not actuated. When the channel selection dial 21 is set to the ALL position, all the cameras respectively coupled with the receiver II are activated to perform exposure control operation, irrespective of the channels selected for the receivers coupled with the cameras. A key 20 is operated to transmit a data for clearing the data transmitted to the camera I.

Figure 4:
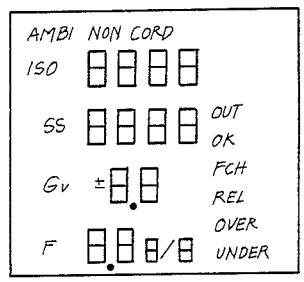

FIG. 4 shows an example of display on the display portion 18 of the exposure meter IV. With reference to the Figure, character "AMBI" is displayed when AMBI mode is selected. Character "CORD" is displayed for the CORD mode, and character "NON-CORD" is displayed for the NONCORD mode. At the position ISO is displayed an ISO data set on the exposure meter IV or transmitted from the camera I. At the position SS is displayed the data of exposure time set on the exposure meter IV. The data of the flash light amount to be changed is displayed at a position Gv. The to-be-changed flash light amount data can be selected at every 0.5 Ev from +3 Ev to −3 Ev. At the position F is displayed a diaphragm aperture value that is determined by the set values of the ISO, exposure time and to-be-changed flash light amount and the light measurement measured by the photoelectric element and that is expected to provide a proper exposure. The display of the diaphragm aperture value consists of an F value display portion for displaying the diaphragm aperture value by the unit of 1 Ev and a fraction display portion for displaying the fraction of the diaphragm aperture value by the unit of ⅛ Ev. Character "OUT" is displayed when the value of the data transmitted from the exposure meter IV to the camera is out of the range within which the camera I can control the exposure. Character "OK" is displayed when the value of the transmitted data is within the controllable range. Character "FCH" is displayed when the flash device III has become ready for light emission. Character "REL" is displayed upon the completion of the exposure control operation. Character "OVER" and "UNDER" are displayed when the diaphragm aperture value is out of the range that can be displayed on the exposure meter IV or the range within which the camera I can control the exposure.

The remote controller A (V) shown in FIG. 1 is provided with a signal transmitter 45 and a signal receiver 46. The signal transmitter 45 transmits the data set in the remote controller A (V), to the receiver II in the form of light signal. The signal receiver 46 receives the data transmitted from the receiver II in the form of light signal. A dial 35 is operated to set an exposure time manually. A dial 36 is operated to set a diaphragm aperture value manually. When a user uses an oridnary exposure meter without fhe function of the signal transmission, he or she may read the indication on the ordinary exposure meter and set the read data on the remote controller A (V) by means of the dials 35 and 36. Thus, the ordinary exposure meter in combination with the remote controller A (V) may have the function of the exposure meter IV that has the data transmitting function. An indicator 37 is energized when the value of the exposure control data transmitted to the camera I is out of the range within which the camera I can control the exposure. An indicator 38 is energized when the flash device III has become ready for light emission, while an indicator 39 is energized upon completion of exposure control operation in the camera I.

Figure 24:
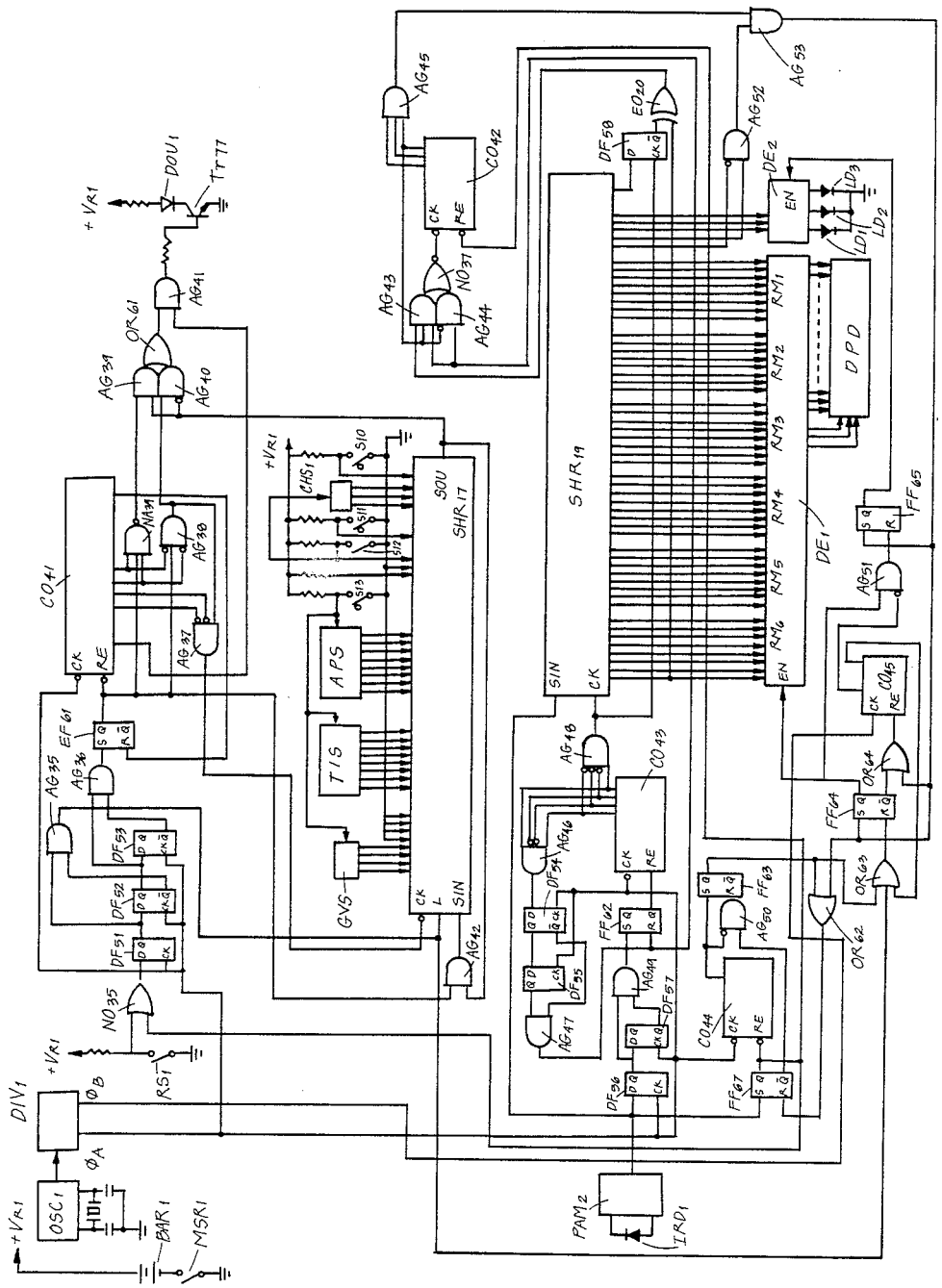
FIGS. 24 and 25 are circuit diagrams showing the circuit constructions of the remote controller A(V) and B(VI).

A selector switch 41 is operated to switch the transmitted exposure control data between for natural or day light photography and for flash photography. When the selector switch 41 is at the left position for the daylight photography indicated by mark ☼, a signal transmitted to the receiver II indicates that the transmitted exposure control data is for the daylight photography. When the selector switch is at the right position for the flash photography indicated by a mark ⚡, a signal transmitted to the receiver II indicates that the transmitted exposure control data is for the flash photography. Another selector switch 42 is operated to select the motor driven photography mode between a single shot photography mode and a continuous photography mode. When the selector switch 42 is at the position S, the single shot photography mode is selected wherein a single frame of photography is effected in response to a single time depression of a signal transmission button 47. When the selector switch 42 is at the position C, the continuous photography mode is selected wherein a single time depression of the signal transmission button 47 initiates the continuous photography operation which is effected by a motor drive device. Once the continuous photography operation is initiated, the photography cycle is repeated until the signal transmission button is depressed again whereupon the continuous photography operation is stopped. A channel selection or designating dial 43 has the same construction and function as the dial 21 on the exposure meter IV. A clear key 40 has the same construction and function as the key 20 on the exposure meter IV. When the clear key 40 is depressed along with the signal transmission button 47, the data transmitted to the camera are cleared. A display portion 44 displays various data transmitted from the camera I through the receiver II. An exemplary definite circuit arrangement of the remote controller A (V) is shown in FIG. 24.

Figure 25:
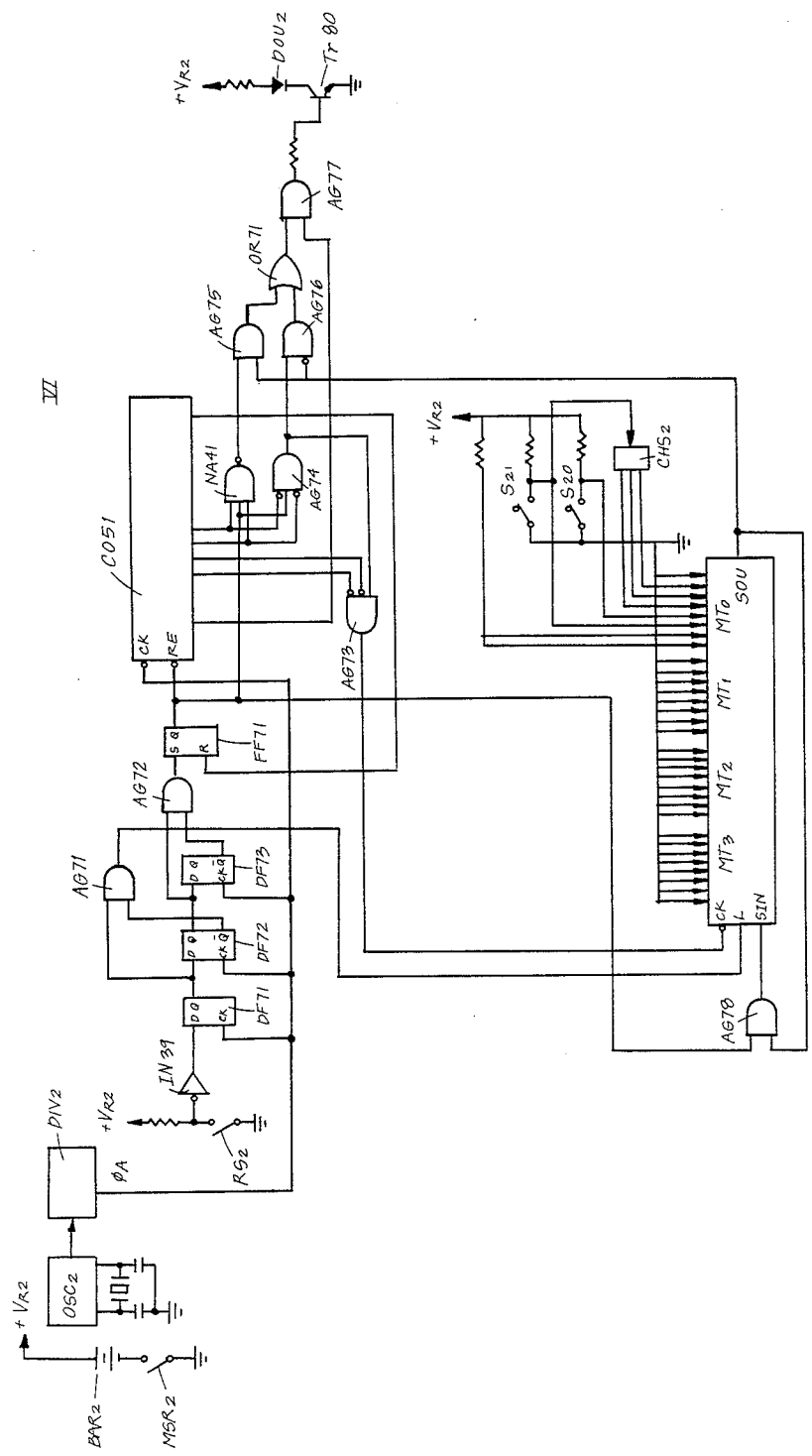

The remote controller B (VI) shown in FIG. 1 lacks the functions of receiving data from the receiver II and of transmitting the exposure control data, in comparison with the remote controller A (V). Accordingly, the remote controller B (VI) is provided only with a selector switch 50 for the selection of the continuous and one-shot photography modes, a channel selection dial 51, a signal transmitter 52 and a button for effecting the signal transmission. An exemplary definite circuit arrangement of the remote controller B (VI) is shown in FIG. 25.

Then explanation will be made about the data transmission system in the above described system. To begin with, an electric serial data transmission with two lines of clock line and serial data bus line is made among the camera I, the receiver II and the flash device III. On the other hand, an optical serial data transmission with a high frequency infrared ray is made among the receiver II, the exposure meter IV, the remote controller A (V) and the remote controller B (VI). In the optical data transmission with the infrared ray, the period during which the high frequency infrared ray pulses are transmitted, is changed between the logic "1" and "0" signals to be transmitted, and the logic "1" and "0" are discriminated from each other depending on whether the infrared ray is received or not at a time earlier than the termination of "1" signal light but later than the termination of "0" signal light, i.e. after a lapse of the time of which duration is between the durations of the "1" and "0" signals. Table 1 shows data MT0 through MT3 which are transmitted from the exposure meter IV and the remote controllers A (V) and B (VI) to the receiver II and further to the camera I from the receiver II.

TABLE 1

| Data Name | Bit | Content |
|---|---|---|
| MT0 | b0 | Daylight Photography Data/Flash Photography Data (1 ... Flash, 0 ... Daylight) |
| | b1 | The Channel of the Receiver Coupled with a |
| | b2 | Camera to Be Released |
| | b3 | |
| | b4 | One Shot Photography/Continuous Photography (1 ... One Shot, 0 ... Continuous) |
| | b5 | Test Light Emission/Non Light Emission (1 ... Test Light, 0 ... Non Light) |
| | b6 | The Discrimination among the Exposure Meter and |
| | b7 | the Remote Controller, and Clearing |
| MT1 | b0 | Av or 00H |
| | ∫ | |
| | b7 | |
| MT2 | b0 | Tv or 00H |
| | ∫ | |
| | b7 | |
| MT3 | b0 | Spare 0 |
| | b1 | 0 |
| | b2 | 0 |
| | b3 | 0 |
| | b4 | Data of Direction of Changing the Flash Light Amount + or − (1 ... +, 0 ... −) |
| | b5 | Data of the Flash Light Amount to Be Changed |
| | b6 | |
| | b7 | |

TABLE 2

| Data Name | Bit | CH1 | CH2 | CH3 | CH4 | CH5 | ALL | N0 |
|---|---|---|---|---|---|---|---|---|
| MT0 | b1 | 1 | 0 | 1 | 0 | 1 | 1 | 0 |
| | b2 | 0 | 1 | 1 | 0 | 0 | 1 | 0 |
| | b3 | 0 | 0 | 0 | 1 | 1 | 1 | 0 |

TABLE 3

| Data Name | MT0 b7 | b6 | Content |
|---|---|---|---|
| | 1 | 1 | Remote Controller B |
| | 1 | 0 | Exposure Meter, Remote Controller A |
| | 0 | 0 | Clearing |

TABLE 4

| Data Name | Bit | 0 | 0.5 | 1.0 | 1.5 | 2.0 | 2.5 | 3.0 |
|---|---|---|---|---|---|---|---|---|
| MT3 | b7 | 0 | 0 | 0 | 0 | 1 | 1 | 1 |
| | b6 | 0 | 0 | 1 | 1 | 0 | 0 | 1 |
| | b5 | 0 | 1 | 0 | 1 | 0 | 1 | 0 |

In the above tables, MT0 donates a 8-bit data input first from the exposure meter IV, the remote controller A (V) and the remote controller B (VI) to the receiver II. The first bit b0 of the data MT0 is "0" when the data MT1 and MT2 input next are exposure control data for daylight photography. The first bit b0 of the data MT0 is "1" when the data MT1 and MT2 are exposure control data for flash photography. The bits b1 through b3 represent a channel designated on the exposure meter IV or the remote controller A (V) or B (VI). (See table 2). When the data of the designated channel coincides with the data of the channel selected by the dial 11 on the receiver II, an exposure control operation is initiated in the camera I on which the signal receiving device II with the selected dial is mounted. The bit b4 of the data MT0 is "1" for the one-shot photography and "0" for the continuous photography. It should be noted that the exposure meter IV is not provided with the selector switch for the selection of one shot and continuous photography, and is adapted to always output a signal "1" for the one shot photography.

The bits b6 and b7 of the data MT0 bear a data for showing the source from which data are transmitted, as shown in table 3. When the bits b6 and b7 are "01", they show that the data are transmitted from the exposure meter IV or the remote controller A (V). "11" of the bits b6 and b7 shows that the source is the remote controller B (VI). When "00" is input, the data received by the receiver II and transferred to the camera I are cleared.

The data MT1 shows, by one bite, a diaphragm aperture value that is calculated in the exposure meter IV or set on the remote controller A (V). The data MT2 shows, by one bite, an exposure time value set on the exposure meter IV or the remote controller A. The bits b0 through b3 of the data MT3 are all spare and "0". The bit b4 of the data MT3 shows the direction of change of the flash light amount. "1" of the bit b4 shows + direction (increase) while "0" shows − direction (decrease). The bits b5 through b7 show the amount by which the flash light is to be changed. When the remote controller B (VI) is used, the data of "00H" are output from the three bites of the data MT1, MT2 and MT3.

Table 5 shows data RM0 through RM6 that are transmitted from camera I to the receiver II and then from the receiver II to the remote controller A (V) or the exposure meter IV.

TABLE 5

| Data Name | Bit | Content |
|---|---|---|
| RM0 | b0 | Spare  0 |
|  | b1 |  0 |
|  | b2 |  0 |
|  | b3 | 1 . . . outside of controllable range, 0 . . . inside of the range |
|  | b4 | 1 . . . has been released, 0 . . . has not been released |
|  | b5 | 1 . . . charge completion, 0 . . . has not been charged |
|  | b6 | receiver  1 |
|  | b7 |  0 |
| RM1 | b0 ∫ b7 | shortest exposure time Tvmc |
| RM2 | b0 ∫ b7 | longest exposure time Tvoc |
| RM3 | b0 ∫ b7 | flash synchronizable limit exposure time Tvfl |
| RM4 | b0 ∫ b7 | ISO sensitivity (film speed) Sv |
| RM5 | b0 ∫ b7 | maximum diaphragm aperture value (the value of the minimum diaphragm aperture) Avmc |
| RM6 | b0 ∫ b7 | maximum diaphragm aperture value (the value of the full diaphragm aperture) Avoc |

In the Table 5, the bits b0 through b2 of the data RM0 are spare and all "0". The bit b3 is "1" when the exposure control data transmitted from the exposure meter IV or remote controller A (V) is out of the range within which the camera can control the exposure. The bit b3 is "0" when the transmitted exposure control data is within the camera controllable range. The bit b4 is "1" when the camera I has completed an exposure control operation in response to a signal from the exposure meter IV or the remote controller A (V) or B (VI). The bit b4 is "0" when the camera I has not made an exposure control operation. The bit b5 shows whether the flash device has become ready for light emission, i.e. whether the main capacitor of the flash device has been charged to or beyond a given level. The bit b5 is "1" when the camera I receives from the flash device I a charge completion signal showing that the main capacitor had been charged to the given level. The bit b5 is "0" when the camera I has not received the charge completion signal. From the bits b6 and b7 is output a data "10" which shows that the receiver II is the source of the infrared ray signal, and which is discriminated from the signals "01", "11" and "00" of the data MT0.

The data RM1, RM2, and RM3 respectively represent, by one bite, the shortest exposure time value Tvmc, the longest exposure time value Tvoc and the flash synchronizable shortest limit exposure time Tvfl. The data RM4 represents, by one bite, the ISO data Sv. The data RM5 represents, by one bite, the aperture value Avmc of the minimum diaphragm aperture of the exchangeable lens 10, mounted on the camera I, while the data RM6 represents, by one bite, the full aperture value Avoc of the exchangeable lens 10.

TABLE 6

| Data Name | Bit | Content |
|---|---|---|
| FC0 | b0 | Power ON signal, ON . . . 1, OFF . . . 0 |
|  | b1 | Charge Completed . . . 1, Uncompleted . . . 0 |
|  | b2 | FDC . . . 0, Non FDC . . . 1 |
|  | b3 | Discrimination Signal . . . 0 |
|  | b4 | Spare  0 |
|  | b5 |  0 |
|  | b6 |  0 |
|  | b7 |  0 |

The table 6 shows data FC0 which are read from the flash device III into the camera I. The bit b0 of the data FC0 is "1" when the main or power switch of the flash device III is ON, and the bit b0 is "0" when the main switch is OFF. This "1" or "0" signal is read into the camera I. It should be noted that the one bite of the data FC0 are all "0" when the main switch of the flash device III is OFF. The bit b1 is "1" when the main capacitor has been charged, and "0" when the main capacitor has not been charged. The bit b2 is "0" for a given period when it is detected that a proper exposure has been attained with an automatically light controlled flash photography. (Such attainment of a proper exposure is hereinafter referred to as FDC.) The bit b2 is "1" for the rest of the period. The bit b3 is used for determining in the camera whether the flash device in use is adapted for the relevant system. The bit b3 is always "0" when the flash device is adapted for the system. The bits b4 through b7 are spare and all "0".

TABLE 7

| Data Name | Bit | Content |
|---|---|---|
| CF0 | b0 ∫ b7 | Value Av of the Diaphragm Aperture to be Controlled for Flash Photography |
| CF1 | b0 ∫ b7 | Focal Length Value of the Exchangeable lens fv |
| CF2 | b0 | Exposure Control Mode |
|  | b1 |  |
|  | b2 |  |
|  | b3 ∫ b7 | ISO Data |
| CF3 | b0 | Spare  0 |
|  | b1 |  0 |
|  | b2 | Light Emission Inhibited . . . 1, Light Emission Allowed . . . 0 |
|  | b3 | Set Light Emission Mode . . . 0, Manual Light Emission Mode . . . 1 |
|  | b4 ∫ b7 | = (MT3) b4–b7 |

TABLE 8

| Mode | b2 | b1 | b0 |
|---|---|---|---|
| P Mode | 0 | 0 | 0 |
| A Mode | 0 | 0 | 1 |
| S Mode | 0 | 1 | 0 |
| M Mode | 0 | 1 | 1 |
| External Mode | 1 | 0 | 0 |

The table 7 shows the data CF0 through CF3 which are transmitted from the camera I to the flash device III. The data CF0 represents by one bite the value Av of the diaphragm aperture to be controlled for flash photography. The data CF1 represents, also by one bite, the focal length fv of the exchangeable lens 10. The bits b2 through b0 of the data CF2 represent the exposure control mode of the camera as shown in the table 8 in such a way that the P mode is represented by "000", A mode by "001", S mode by "010", M mode by "011" and the external mode by "100". The five bits b3 through b7 of the data CF2 represent the ISO data used in the camera I. The bits b0 and b1 of the data CF3 are spare and "00". When the camera I reads, through the receiver II, the exposure control data for the daylight photography, the bit b2 of the data CF3 is "1" to inhibit the light emission of the flash device III. When the camera I reads a data other than the daylight photography exposure control data, the bit b2 is "0" to allow the flash light emission.

The bit b3 is "1" when the flash device III is required to emit light in manual light emission mode wherein the flash device emits light of the amount manually set on the flash device. The bit b3 is provided for the following reason. When the flash device III emits light in response to a test light emission signal sent from the exposure meter IV, the camera I does not operate and does not output any light emission stop signal so that the light from the flash device III is not automatically controlled. In other words, when the test light is emitted, the exposure meter IV is to measure the amount of the manual light emisson, i.e., the amount of the light that is not automatically controlled. As the exposure of the camera I is controlled on the basis of measurement of the manual light emission, an incorrect exposure is attained or an unintended photography is effected if the flash light is automatically controlled in an actual exposure control operation. Accordingly, in the case of the test light "1" is output at the bit b3 such that the flash light is not automatically controlled but is controlled manually. In the other cases, "0" is output at the bit b3 such that the flash device III emits light in the automatic or manual light control mode set on the flash device III.

The bits b4 through b7 of the data MT3 of the data CF3 are the same as the bits b4 through b7 and represent the amount and direction of the change of the to-be-emitted light amount used in the calculation by the exposure meter. The data of the bits are transmitted to the flash device III to change the amount of the light emission therefrom on the basis of the data.

FIG. 5 is a block diagram showing the general circuit construction of the camera I, the receiver II and the flash device III. The lower left block I of the FIG. 5 is the camera circuit which is electrically connected with the circuit LEC of the exchangeable lens 10 by way of lines 10, 11, 12, 13 and 14 through connectors CN0 on the camera and connectors CN1 on the exchangeable lens. The line 10 is for supplying power to the lens circuit LEC through a power supply transistor Tr2 and a protective resistor. The ground level of the lens circuit LEC is equalized or made common with the ground level of the camera circuit through the line 14. The lens circuit LEC includes a ROM, an addressing means and a serial data output means. The ROM fixedly memorizes various data inherent or relevant to the exchangeable lens. The addressing means successively designates the addresses in the ROM on the basis of clockpulses fed through the line 12. The serial data output means serially outputs the data derived from the ROM, through line 13 on the basis of the clockpulses. A "High" signal is input through the line 11 to the lens circuit LEC that is provided with the above mentioned ROM and means, in order to activate the lens circuit LEC. The data input from the exchangeable lens 10 to the camera I include the data of the full aperture value, the value of the minimum diaphragm aperture, and the focal length of the lens and other data for the exposure control and the automatic focusing.

The camera I is provided with other connectors CN2 located on the hot shoe 1 of the camera I (see FIG. 1). The circuit of the receiver II is connected with the camera circuit through the connectors CN2 and connectors CN3 located on the button surface of the receiver II. The circuit of the receiver II is, in turn, connected with the circuit of the flash device III through connectors CN4 on the hot shoe 7 (see FIG. 1) of the receiver II and connector CN5 on the fott 8 (see FIG. 1) of the flash device III. It should be noted that the circuit of the flash device III can be directly connected with the camera circuit with the connector CN5 directly connected with the connector CN2.

Five signal lines ST1, ST2, ST3, ST4 and ST5 and a ground line extend from the camera I to the receiver II. The signal lines ST1, ST2 and ST3 and the ground line further extend from the receiver II to the flash device III. Through the signal line ST1, an X-contact closure signal, i.e., the signal generated upon closure of the flash synchro contact switch in the camera, and a "Low" level signal from a control circuit RCC in the receiver II are transmitted from the camera I or the receiver II to the flash device III. The signal line ST2 in a serial data bus through which the abovementioned data MT0-MT3, CF0-CF3, RM0-RM6 and FC0 are serially transmitted among the camera I, the receiver II and the flash device III on the basis of the clock pulses fed through the line ST3. In the sequential operation, the data FC0 is transmitted first from the flash device III to the camera I and then data MT0 through MT3 are transmitted from the receiver II to the camera I. When the camera has completed the preparation for the exposure control on the basis of those data, the data CF0 through CF3 output from the camera I are read by the flash device III and the data RM0 through RM6 also output from the camera are read by the receiver device II.

While the above mentioned data transmission has not been effected, the flash device outputs through line ST2 a "High" level signal when the main capacitor MC of the flash device III has been charged to or above a given voltage level, and a "Low" level signal when the voltage of the main capacitor has not reached the given level. When the Xenon tube XE of the flash device III begins to emit light, the flash device III forces the line ST2 to be a "Low" level which level in turn effects the light measurement signal integrating operation for the flash light control in the camera I.

The camera I first outputs through signal line ST3 a pulse signal for informing the operation mode of the camera to the flash device III and the receiver II. The pulse signal is identified by the width, i.e., the duration of a "High" level of the pulse. The camera outputs on the line ST3 a pulse of the width of, for example, 50 μsec just before it reads data FC0 and MT0 through MT3 from the flash deice III and the receiver II, and outputs a pulse of the width of, for example, 100 μsec before it outputs the data CF0 through CF3 and RM0 through RM6 to the flash device III and the receiver II. The camera outputs a pulse of the width of, for example, 150 μsec before it commences its exposure control operation. Through the line ST3, synchronous clock pulses are output eight by eight from the camera I during the exchange of the data and a flash light stopping pulse is output during the exposure control operation.

The line ST4 is not provided in the flash device III but between the receiver II and the camera I such that a release signal, i.e., an exposure control operation initiating signal of a "Low" level is input to the camera I through the line ST4.

The line ST5 is also provided only between the receiver II and the camera I but not in the flash device III. A light measurement initiating signal, i.e., a signal for initiating the preparatory operation for the exposure control is input through the line ST5 from the receiver II to the camera I. It should be noted that the lines ST4 and ST5 may be extended, instead of through hot shoe 1, through a cable with plugs at its both ends which plugs are respectively connected with the sockets provided on the receiver II and the camera I.

In the circuit of the camera I, power is supplied directly from a power source battery BAB through a power supply line +E to a microcomputer MC0, AND gates AG0 and AN0, a NAND gate NA0, an automatic focusing circuit AFC, a buffer BF, a display circuit BDP and an interface INF. When a terminal P3 of the microcomputer MC0 becomes a "Low" level, a transistor Tr2 is made conductive through buffer BF to supply power through a power line +V1, to an exposure control data outputting circuit SD0, a light measuring circuit LMC, a diaphragm control pulse outputting circuit FPG, an exposure control magnet driving circuit MG and a flash light control circuit FLC. Exemplary delete constructions of the flash light control circuit FLC and an interface circuit INF are shown in FIG. 6.

In the receiver II a power source battery BARC directly supply power through a main switch MSRC and a power line +V2 to the entire circuit of the receiver II. A channel data output circuit CHS outputs a channel data of the receiver II designated by means of channel setting with the dial 11 shown in FIG. 1. A light receiving or detecting element REP0 is provided in the light receiving portion 3 shown in FIG. 1 and is composed of a PIN photodiode. A preamplifier PAM is provided for converting the output of the light receiving element REP0 into a rectangular wave signal for digital processing. Another light receiving or detecting element SLP is provided in the light receiving section 5 shown in FIG. 1 and is connected with a preamplifier SLAM which outputs a pulse in synchronization with the rising of the flash light. An infrared light emitting diode CHL provided in the light emitter 4 shown in FIG. 1 is driven, for infrared light emission, by a transistor Tr0 which turns on and off in response to a signal from the control circuit RCC. A light emitting diode OUL0 is provided in the display section 6 shown in FIG. 1. When it is detected that the receiver II has correctly read data from the exposure meter IV and remote controllers A(V) and B(VI), a signal from the control circuit RCC makes the transistor Tr1 conductive to energize the light emitting diode OUL0, thereby informing the user that data have been correctly read.

In the circuit of the flash device III, a power source battery BAFL is connected through a main switch MSFL to a voltage booster or D-D converter circuit DD which raises the voltage of the power source battery BAFL to a given high level. The output of the voltage booster circuit DD is charged through a diode D1 into the main capacitor MC. The charged voltage of the main capacitor MC is monitored by a monitor circuit CHM of which output CH1 is applied to a charge condition detecting circuit CHD. The detecting circuit CHD controls the booster circuit DD on the basis of the output of the monitor circuit CHM and outputs through line CH2, a signal indicating whether the charging of the main capacitor MC has been completed or not. The main capacitor MC is connected in parallel with a flash firing circuit which is well known in the art. A trigger circuit TRC triggers the light emission of the Xenon tube XE in response to a light emission initiating signal supplied from the control circuit FLCC through line FSTA. A main thyristor SC conducts when the Xenon tube XE is triggered. A light emission stop circuit STC makes the thyristor SC non-conductive or block in response to light emission stop signal supplied from the terminal FSTP of the control circuit FLCC, and interrupts or stops the light emission of the Xenon tube XE.

A lower voltage supplied from one of the output terminals tapped from the secondary coil of the voltage booster circuit DD is connected with a power supply line VF through a diode D2 and a constant voltage circuit composed of a zener diode ZD and a transistor Tr7. The power supply line VF is further connected with the output of the power source battery BAFL through diode D0. A capacitor CC is provided for the stabilization of the power supply. A circuit AND is provided for outputting data for the selection of automatic flash light control and data of the manually set flash light amount. A circuit FDP is provided for indication. The charge condition detecting circuit CHD is supplied with the signal from the signal line ST3 and standard clock pulses $\phi F$ from the control circuit FLCC. The charge condition detecting circuit is provided with a timer which counts a time of a given length, e.g., 3 min. at each rising of the signal on the signal line ST3. The voltage booster circuit is allowed to operate while the timer is in operation. Accordingly, the voltage boosting operation is continued while data are exchanged between the camera I and the flash device III, and further continued for the given time after the termination of the data exchange. When the given time has lapsed, the voltage boosting operation is stopped. A exemplary definite circuit for such operation will be described later with reference to FIG. 15.

Now, the operation of the camera I is described with reference to FIGS. 5 through 8. When the light measurement switch S1 is closed with a shutter release button (not shown) being depressed down to a first stage, or a light measurement initiation signal of a "Low" level is input from the signal receiving device through the signal line ST5, the output of the AND gate AG0 falls to a "Low" level so that an interrupt signal is applied to the interrupt terminal it0 causing the microcomputer MC0 to start the operation from the step #1 in FIG. 7. At the step #1, the microcomputer MC0 makes the terminal P3 a "Low" level to render the transistor Tr2 conductive through the buffer BF, thereby causing power supply through the power supply line +V1. Then, the potential at the terminal P12 is made a "High" level to read the data from the lens circuit LEC. Then, the potential on the signal line CSL becomes a "High" level to make the AND gates AN6 and AN7 in FIG. 6 active and the potential on the line l1 also becomes "High" level to make the lens circuit LEC active. At the step #3, "0" is set in the register k and the procedure is proceeded to the step #4 wherein the serial signal input and output operation SIO is made.

At that step, eight clock pulses are output from the terminal SCK of the microcomputer MC0. Those pulses are output along the line l2 through AND gate AN6 of the interface INF (see FIG. 6) and transmitted to the lens circuit LEC which in turn outputs through line 13 data one bit by one bit from the lower bit in synchronization with the rising of the clock pulses. The data are input to the input terminal SIN of the microcomputer MC0 through the AND gate AN7 and the OR gate OR2 of the interface INF and are read into the input/output register IOR in the microcomputer one bit by one bit in synchronization with the falling of the clock pulses. In the serial data input/output operation, data are output from the serial output terminal SOU one bit by one bit from the lower bit in synchronization with the rising of the clock pulses.

When the operation at step #4 is completed, the data read into the input/output register IOR are set in the lens data setting register LR0 and "1" is added to the content of the register k. At step #7, it is discriminated whether the content of the register k has reached "n". If the content has not reached "n", the process returns to the step #4 wherein next data reading operation is performed. When it is detected that the content of the register k has reached "n", this means that necessary data of the "n" number have been read from the lens circuit LEC to the camera I and are set in the registers RL0 through RLn-1 of the "n" number. Then, the sequence is proceeded to step #8 wherein the potential at terminal P12 is made a "Low" level to make the potential on line 11 a "Low" level.

At step #9, it is discriminated, on the basis of the data read from the lens circuit, whether a relevant exchangeable lens is completely mounted on the camera. This discrimination is made by a check data stored at a predetermined ROM address that is common to all exchangeable lenses adapted for control system of the present embodiment. The microcomputer MC0 discriminates whether the check data has been read or not. When the mounting completion of the exchangeable lens is discriminated, the microcomputer MC0 outputs at a port P1 data for automatically controlling the focusing of the exchangeable lens and initiates the operation of the automatic focusing circuit AFC. If it is discriminated that any relevant exchangeable lens has not been mounted on the camera, the above described automatic focusing operation is not performed but the process jumps to step #12 wherein data are read through the port P0 from an exposure control data output circuit SD0 in the camera I. The data to be read include data of an exposure control mode, a set exposure time, a set diaphragm aperture value and a film speed. The film speed data may be manually set or automatically set by automatically reading a code pattern on the film cartridge. At step #13, the light measurement signal input from the light measuring circuit LMC to an analog signal input terminal ANI is converted into a digital signal on the basis of the reference voltage applied to a terminal VRI.

Data are read from the flash device III and the signal receiving device II in the sequence beginning with step #14. First, the potential at a terminal P9 is made a "High" level to make the potential on line CSF a "High" level, thereby activating or opening the AND gates AN1, AN2, AN3 and AN4 shown in FIG. 6. Then the potential at a terminal P10 is made a "High" level for a period of T1, e.g., 50 μsec so that a pulse with a "High" lever for 50 μsec is output on line CMO. The pulse is output through the AND gate AN1 so that a NOR gate NO1 outputs a pulse with a "Low" level for 50 μsec. The low level pulse makes a transistor Tr42 conductive for 50 μsec so that a pulse of a "High" level with the width of 50 μsec is output on the signal line ST3. The flash device III and the receiver II turn into data outputting condition when they discriminate receipt of the pulse of the 50 μsec width.

At step #16, data are serially input from the flash device III to the camera I. That is, aforementioned data FCO are output from the flash device III one bit by one bit from the lower bit. This data outputting operation will now be described in more detail with reference to FIG. 6. First, eight clock pulses output from the terminal SCK are output through an AND gate AN2 and inverted by NOR gate NO1 to alternatively turn on and off transistors Tr42 and Tr43 so that clock pulses with the same phase with the clock pulses from the terminal SCK are output from the terminal ST3. Thus, the data FCO are input to the terminal ST2 on the basis of the clock pulses. As a "Low" level signal is being output from the terminal P11 at this time, the output of the NAND gate NA1 is a "High" level and the output of th AND gate AN5 is a "Low" level so that the transistors Tr44 and Tr45 are non-conductive. Accordingly, the transistor Tr46 turns on and off in response to the signal applied to the terminal ST2 and the inverter IN1 outputs data that are the same as the data input to the signal line ST2. The data is read by way of AND gate AN3 and OR gate OR2 and through the data input terminal SIN into the input/output register IOR. At step #17, the data read into the register IOR is set in the register FCR and the process proceeds to step #18.

At step #18, "0" is set in the register k and data are serially input from the receiver II to the camera I. At this time, the receiver II outputs a data MTO which is read into a register IOR. The content of the register IOR is set in the register MTR0. Then, "1" is added to the content of the register k and it is discriminated whether the content of the register k has reached "4". If not, the process returns to step #19 wherein next data is read. Accordingly, when it is discriminated that the content of the register k is "4" and the process is proceeded to step #23, data MT0, MT1, MT2 and MT3 supplied from the receiver II have respectively set in the registers MTR0, MTR1, MTR2 and MTR3.

Then, a "Low" level signal is output at a terminal P9 at step #23 to stop the data capturing operation and the contents at bits b7 and b6 of the register MTR0 is discriminated. When the bits b7 and b6 are "00", "11" or "01", this means that exposure control data has not been read into the receiver II from the exposure meter IV or the remote controller A(V) as is apparent from the Table 3. Hence, the process jumps to step #70 wherein exposure control data are calculated on the basis of the camera data read at the step #12. If the bits b7 and b6 of the register MTRo are "10", it means the possibility that exposure control data are input from the exposure meter IV or the remote controller A (V). Hence, the process proceeds to step #26 wherein it is discriminated whether the content of the register MTR1 is "00H" or not. The register MTR1 receives a data MT1, i.e., the data "00H" or a diaphragm aperture value data Av fed from the exposure meter IV, or the remote controller A(V). Accordingly, when the content is "00H", any exposure control data has not been input, and the process jumps to the step #70. If the content of the register MTR1 is not "00H", this means that a diaphragm aperture data has been read from the exposure meter IV or the remote controller A(V) and the process proceeds to step #27.

At step #27, the mounting of a relevant lens is discriminated in the same manner as is done at step #9. If a relevant lens has been mounted on the camera I, the process jumps to step #29. If a relevant lens has not been mounted, the process proceeds to step #28 wherein a data "01H" representing that any relevant is not mounted, is set in a register AVDR for the display of the diaphragm aperture value. Then, at step #31, a data "00H" representing that the number of the diaphragm stopping-down step is zero is set in the register AVCR. At step #35, "1" is set in flag RF to show that the diaphragm aperture value is outside of the controllable range. At step #39, "100" are respectively set on the bits b2, b1 and b0 of the display register DPR to make the relevant circuit ready for indicating the external mode and the process proceeds to step #40.

When the mounting of a relevant exchangeable lens is determined at step #27, it is discriminated at step #29 whether the diaphragm aperture value data read into the register MTR1 shows a value requiring an aperture larger than the aperture given by the full open aperture value of the lens. If the diaphragm aperture data is such a value as to require an aperture larger than the full open aperture, the data of the full open aperture value Avoc is set in the register AVDR at step #30 and the process proceeds by way of aforementioned step #31, #35 and #39 to step #40. When it is determined that the diaphragm aperture data shows a value requiring an aperture smaller than the full open aperture, i.e., that the aperture value data is larger than the aperture value Avoc (in the same sense) of the full open aperture, it is discriminated at step #32 whether the aperture value (in the sense of APEX system) represented by the diaphragm aperture value data is larger or smaller than the aperture value Avmc (by the unit of the APEX system) of the minimum aperture available in the exchangeable lens. When the former aperture value is larger than the later one, the data of the aperture value Avmc of the minimum aperture is set in the register AVDR, and a data of the diaphragm stopping down number Avmc−Avoc to be controlled is set in an register AVCR. Thereafter, the process proceeds by way of above mentioned steps #35 and #39 to step #40. If the aperture value of the diaphragm aperture value data is smaller than the aperture value Avmc of the minimum diaphragm aperture, the diaphragm aperture data is set in the register AVDR at step #36 and the data of (MTR1)−Avoc is set, at step #38, in the register AVCR as the data of the diaphragm stopping-down number to be controlled. In this case, as the diaphragm aperture value is within the controllable range, the flag RF is made "0" and the process proceeds by way of step #39 to step #40.

Following tables show the relationships between the content of the register DPR and the display of P.A.S.M, EXT, FLASH, AMBI, OVER, UNDER, OK and "∧".

TABLE 9

| Bit | Content |
|---|---|
| b0 | Indication of exposure |
| b1 | control mode |
| b2 | |
| b3 | 1 ... FLASH, 0 ... AMBI |
| b4 | Display of ∧ |
| b5 | |
| b6 | Display of OK, OVER and UNDER |
| b7 | |

TABLE 9-continued

| Bit | Content |
|---|---|
| b7 | |

TABLE 10

| b2 | b1 | b0 | Indicated Mode | Display Mark |
|---|---|---|---|---|
| 0 | 0 | 0 | P mode | P |
| 0 | 0 | 1 | A mode | A |
| 0 | 1 | 0 | S mode | S |
| 0 | 1 | 1 | M mode | M |
| 1 | 0 | 0 | External mode | EXT |

TABLE 11

| b5 | b4 | Indication | Displayed Condition of |
|---|---|---|---|
| 0 | 0 | Charge uncompleted | Deenergized |
| 0 | 1 | Charge completion | Blinks at 2 Hz |
| 1 | 0 | FDC | Blinks at 8 Hz |

TABLE 12

| b7 | b6 | Indication | Displayed Mark |
|---|---|---|---|
| 0 | 1 | Proper exposure | OK |
| 0 | 0 | Over exposure | OVER |
| 1 | 1 | Under exposure | UNDER |

At step #40, it is discriminated whether the exposure time represented by the exposure value data MTR2 read from the receiver II is longer or not than the longest exposure time to be controlled by the camera I. When it is determined that the exposure time shown by the data MTR2 is longer than the longest exposure time, i.e., that the time value (by APEX unit) given by the data MTR2 (hereinafter referred to as a given time value) is less than the time value Tvoc of the longest exposure time, the data of the time value Tvoc of the longest exposure time is registered in a controlled exposure time register TVCR and the process proceeds to step #44. When the given time value is not less than the time value Tvoc, it is discriminated at step #42 whether the exposure time given by the exposure time data MTR2 is shorter or not than the shortest available exposure time, i.e., whether the time value of the given exposure time is larger or not than the time value Tvmc of the shortest exposure time. If the time value given by the data MTR2 is larger than the time value Tvmc, the data of the shortest exposure time is set in the register TVCR and the process proceeds to step #44.

When the time value given by the data MTR2 is not larger than the time value Tvmc of the shortest exposure time, this means that the exposure time given by the data MTR2 is within the controllable exposure time range and the data MTR2 is set in the register TVCR. Then, it is discriminated at step #46 whether the flag RF is "1" or not. When the flag RF is "1", this means that the diaphragm aperture value is outside of the controllable range and the process proceeds to step #44. When the flag RF is "0", this means that the diaphragm aperture value is within the controllable range and the process proceeds to step #48.

The data RM0 shown in Table 5 is set in the register RMR0 of which bit b3 is set at step #44 to "1" to show the out-of-range when the read diaphragm aperture value or exposure time is outside of the controllable range. The bit b3 is set at step #48 to "0" to show the in-range when both the read diaphragm aperture value and exposure time are within the controllable range.

At step #49, the read diaphragm aperture value data MTR1 and exposure time data MTR2 are summed up to calculate an exposure value Eve for providing proper exposure on the basis of the measurement by means of the exposure meter IV. Then, an exposure value Evc to be controlled is calculated from the set diaphragm aperture value AVDR and exposure time TVCR. If any relevant lens is not mounted on the camera I, the data of "01" is set in the register AVDR and the data has a particularly smaller value than ordinary diaphragm aperture data so that the controlled exposure value Evc also shows a particularly small value. At step #51, it is discriminated whether Eve<Evc. If it is determined that Eve<Evc, this means that an under exposure is anticipated and "10" are set at the bits b7 and b6 of the register DPR to make the camera circuit read for indicating the under exposure condition. Then the process proceeds to step #56. If it is determined that Eve≧Evc, it is discriminated whether Eve>Evc. When Eve<Evc, this means that an over exposure is anticipated, and "01" is set at bits b7 and b6 of the register DPR to make the camera circuit ready for indicating the over exposure condition. Then, the process proceeds to step #56. When Eve=Evc, this means that a proper exposure is anticipated and "00" is set at the bits b7 and b6 of the register DPR to make the camera circuit ready for indicating the proper exposure. The process then proceeds to step #56.

At step #56, it is discriminated whether the bit b0 of the register MTR0 is "1" or not. When the bit "b0" is "1", this means as shown in Table 1, that the transmitted data is for flash photography and the process proceeds to step #57. At the step #57, "0" is set at the bit b2 of the register CFR3, showing that the flash device III is ready for light emission. In the register CFR3 is set the data CF3 as shown in Table 7. At the bit b3 of the register CFR3 is set "1" which inhibits automatic flash light control such that the exposure meter IV measures the light of test light emission, i.e., the light which is not automatically controlled, and calculates a proper exposure value on the basis of the measurement. Then, "1" is set at the bit "b3" of the register DPR to make the camera circuit ready for indicating the flash photography mode. At step #60, the data of the amount of flash light to be changed, which data is read from the exposure meter IV, is set at the bits b4 through b7 of the register CFR3 without modifying the data and the data AVDR of the controlled diaphragm aperture value is set in the register AVFR for the flash photography. Then, the process jumps to step #90 shown in FIG. 8.

At step #90, it is discriminated whether the exposure time given by the data MTR2 read from the exposure meter IV is shorter or not than the flash synchronizable limit, i.e., shortest exposure time TVFL. When the exposure time is shorter than the limit exposure time, the data of the limit exposure time TVFL is set in the exposure time register TVCR and a signal "1" showing that the exposure time is out of synchronizable range, is set at bit b3 in the register RMR0. At the same time, "10" is set at bits b6 and b7 of the register DPR to make the camera circuit ready for indicating over exposure and the process jumps to step #96. When the exposure time given by the data MTR2 is not shorter than the synchronizable limit exposure time TVFL, the process jumps to step #96.

When the bit b0 of the register MTR0 is "0" at the step #56, this means that the exposure control data transmitted from the exposure meter IV and the like is for the daylight photography, and the process jumps to step #62. "1" is set at the bit b2 of the register CFR3 at the step #62 to inhibit the light emission of the flash device III even if the flash device III is ready for emitting light more than a given amount. Then, "0" is set at the bit b3 of the register CFR3, showing that automatic flash light control is allowed. At the same time "0" is set at the bit b3 of the register DPR to indicate the daylight photography mode wherein the photography is effected with ambient light. At step #65, "OH" is set at bits b4 through b7 of the register CFR3 as the data to change the amount of flash light to be emitted and the process proceeds to step #95. At step #95, the diaphragm aperture value Avf for the flash photography is set in the register AVFR and the process proceeds to step #96.

Now, returning back to FIG. 7, explanation will be made about the case when it is determined at steps #24, #25 and #26 that no data has been transmitted from the exposure meter IV or the remote controlled A (V). In that case, the process jumps to step #70 to perform exposure calculation on the basis of the light measurement made in the camera I. At step #70, it is discriminated whether relevant exchangeable lens is mounted on the camera or not. When a relevant lens is mounted, exposure calculations are performed for the daylight photography and for the flash light photography on the basis of a full aperture light measurement. When a relevant lens is not mounted, i.e., when an exchangeable lens that is not adapted for the system of the present embodiment, is mounted on the camera I, the exposure calculations for the daylight photography and the flash photography are made on the basis of a stopped-down aperture light measurement which is obtained by measuring the object light through a diaphragm aperture that has been stopped down to a preset value. Then, the process jumps to step #75.

At the step #75, it is discriminated whether the bit b3 of the register FCR is "0" or not. If the bit b3 is "0", this means that a flash device adapted for the system of the present embodiment is coupled with the camera I and then it is discriminated at step #76 whether or not the bit b1 of the register FCR is "1" for showing that a charge completion signal has been input. When it is determined that a charge completion signal has been received, flash photography is to be effected and the aperture value Avf, the number of diaphragm stopping-down steps Avf—Avoc and the time value Tvf for the flash photography are respectively set in the registers AVDR, AVCR and TVCR. At the same time, "1" is set at the bit b3 of the register DPR to indicate that a flash photography is to be effected and the process proceeds to the step #95 mentioned before. When it is determined at step #75 and #76 that the system is not in condition for flash photography, the aperture value Ava, the number of the diaphragm stopping-down steps Ava—Avoc and the time value Tva for the daylight photography are respectively set in the registers AVDR, AVCR and TVCR and the bit b3 of the register DPR is set to "0" to indicate that a daylight photography is to be effected. Then, the process proceed to step #95.

At step #96 in FIG. 8, it is discriminated whether the bit b3 of the register FCR where the data FCO transmitted from the flash device III is set, is "0" or not. When the bit b3 is "1", this means that the flash device coupled to the camera I is not adapted for the system of the present embodiment and the process jumps to step #101 wherein data "00" for deenergizing the flash mark 55 shown in FIG. 2 are set at bits b4 and b5 of the register DPR for the display, and then the process proceeds to step #102. When the bit b3 of the register FCR is "0", it is then discriminated whether the bit b2 is "0" or not. At bit b2 is set an FDC signal for showing that an automatic flash light control has been completed. When the bit b2 is "0", "01" are set at the bits b4 and b5 of the register DPR such that the flash mark 55 will blinks at 8 Hz, and the process proceeds to the step #102. When the bit b2 of the register FCR is "1", the content at the bit b1 of the register FCR where the charge completion signal is stored, is discriminated. When the bit b1 is "0", "00" are set at the bits b4 and b5 of the register DPR to deenergize the flash mark 55. When the bit b1 is "1", "10" is set at the bits b4 and b5 of the register DPR to make the flash mark blink at 2 Hz and the process proceeds to step #102.

At step #102 where the exposure control operation has not been commenced, "0" is set at the bit b4 of the register RMR0 where the data RM0 is to be set, and the process jumps to a subroutine for transmitting data CF0 through CF3 and RM0 through RM6 to the flash device III and the receiver II. This subroutine starts at step #180 wherein it is discriminated whether or not the camera I is coupled with a proper flash device adapted for the system of the present embodiment and the bit b3 of the register FCR is 0. The bit b3 is "0" with the camera coupled with the proper flash device. When the bit 3 is "1", "0" is set at the bit b5 of the register RMR0 to supply the receiver II with a charge uncompletion signal which shows that the main capacitor in the flash device has not been charged to a given level. When the bit b3 of the register FCR is "0", it is discriminated whether the bit b1 of the register RCR is "1" or not. When the bit b1 is "1", "1" is set at the bit b5 of the register RMR0 to output a charge completion signal. When no charge completion signal has been received, "0" is set at the bit b5.

Then, the process proceeds to step #140, wherein the potential at a terminal P9 is made a "High" level, and a pulse of a "High" level is output from a terminal P10 for a given time T2, e.g. 100 μsec. The "High" level pulse is output through an AND gate AN1, a NOR gate NO1 and a transistor Tr42 to a signal line ST3 so that the flash device III and the receiver II turn into a data reading mode. Next, a "High" level signal is output at a terminal P11 and the signal line FI0 becomes a "High" level which activates or enables the NAND gate NA1 and the AND gate AN5 so that the data supplied from the data output terminal SOU through AND gate AN4 is output along the signal line ST2 through that AND gate AN5, NAND gate NA1 and transistors Tr45 and Tr47. At step #143, the data CF0 of the diaphragm aperture value Avf for flash photography and which has been set in the register AVFR is set in the serial input/output register IOR to be output serially. It is to be noted here that data to be output serially are once set in the serial input/output register IOR and then output serially as is done for the data CF0. At step #145, the data CF1 of the focal length value fv of the exchangeable lens is serially output. At step #147, the exposure control mode data set at bits b0, b1 and b2 of the display register DPR is set at bits b0, b1 and b2 of the register CFR2 and the data of the film sensitivity value Sv is set at bits b3 through b7 of the register CFR2, the content i.e. data CF2 of the register CFR2 being serially output.

Then the content of the register CFR3 wherein the data CF3 has been set, is output. The above mentioned data are sequentially read into the flash device.

Next, the data RM0 set in the register RMR0 is output serially and the data RM1 of the shortest exposure time Tvmc is also serially output. Subsequently, serially output are the data RM2 of the longest exposure time Tvoc and the data RM3 of the flash synchronizable limit exposure time Tvfl. After the data of the ISO film sensitivity Sv is serially output, the process proceeds to step #163, wherein it is discriminated wherein a relevant exchangeable lens 10 is completely mounted on the camera or not. If yes, the process proceeds to step #164. If not, the process jumps to step #148. At step #164, the data RM5 of the aperture value Avmc of the minimum diaphragm aperture is serially output. Then, the data RM6 of the full open aperture value Avoc is serially output. At step #172, "Low" level signals are output at terminals P9 and P11 and the process returns to step #104. On the other hand, when it is determined at step #163 that no relevant exchangeable lens has been mounted on the camera, "01H" is output as the data RM5 and RM6 and the process returns via step #172 to step #104. The above data RM0 through RM6 are read into the signal receiving device II.

At step #104, the data of the controlled diaphragm aperture value set in the register AVDR is transmitted through the output port P2 to the display circuit BDP. At step #105, the data of the controlled exposure time set in the register TVCR is transmitted to the display circuit BDP. Also to the display circuit BDP are transmitted the data for the display of set mode and the like at step #106, the data being set in the register DPR, and the ISO data at step #107. At step #108, the microcomputer is made ready for accepting an interrupt signal at the interrupt terminal it1 and the process proceeds to step #109.

At step #109, it is discriminated whether the potential at terminal P0 is a "Low" level or not. The input level at the terminal P0 is "Low" when a "Low" level signal i.e. a light measuring effecting signal that is equivalent to the closure of the light measuring switch S1 is applied to the AND gate AG0 by way of the signal line ST5 from the receiver II. When the level at the terminal P0 is a "Low" level, a timer is actuated to count from an initial value a given time, e.g. 15 sec, during which the operations from step #2 to step #108 are repeated, and the process returns to step #2. When the level at the terminal P0 is "High", it is discriminated at step #111 whether the timer has completed the time counting. If the time counting has not been completed, the process returns to the step #2. When the given time has lapsed after the opening of the light measuring switch or disappearance of the light measuring effecting signal, the process proceeds to step #112.

In the process starting at the step #112, the operation of the automatic focusing circuit AFC is stopped and "00" is set at bits b4 and b5 of the display register DPR. The set data "00" is transitted through the output port P2 to the display circuit BDP to deenergize the flash mark 55. The microcomputer MC0 is brought into a condition to accept the interrupt signal not at the terminal it1 but at the terminal it0. A "High" level signal is output at the terminal P3 to stop the power supply along the power supply line +V1 by means of the transistor Tr2.

When the shutter release button is depressed down to its second stage to close the switch S2 under the condition wherein the microcomputer MC0 has become ready for exposure control and the exposure control mechanism has been cocked with the reset switch S4 being open, an interrupt signal is accepted at the terminal it1 and the microcomputer MC0 performs the operation starting at step #120. This operation can also be inititated by the release signal of a "Low" level on the signal line ST4 led from the receiver II. It is to be noted that when the cocking of the exposure control mechanism has not been completed, the reset switch S4 remains closed to make the output of the NAND gate NA0 a "High" level and the terminal it1 can not accept the interrupt signal even if the output of the AND gate AN0 becomes a "Low" level with the release switch S2 being closed or a release signal being input.

At step #120, a "High" level signal is output at the terminal P9 to make the potential on the signal line CSF a "High" level. At step #121, a "High" level pulse is output at the terminal P10 for the given time T3, e.g. 150 μsec and thereafter a "Low" level signal is output at the terminal P9. This pulse is read by the flash device III and the receiver II and it is determined that an exposure control operation is to be performed.

At step #123, the operation of the automatic focusing circuit is stopped and the data AVCR=AVDR−Avoc of the number of controlled diaphragm stopping-down steps is set in an event counter ECO to enable the interruption by the event counter ECO and a "High" level pulse is output at terminal P4. With this "High" level pulse, the release magnet is activated to release the cocking of the exposure control mechanism and initiate the stopping-down operation of the diaphragm. At step #127, a given time t0 is counted. When the time counting is completed, a "High" level pulse is output at the terminal P6 to activate the mirror driving magnet such that the reflex mirror begins to swing up. At step #129, a given time t1 is counted. The time period t0+t1 corresponds to the longest time necessary for the diaphragm to be stopped down from its full open to the minimum aperture position. The time t1 covers the period during which the mirror swings from its initial or viewing position to the raised or photographic position. During the time period t0+t1, pulses are output from the pulse generating circuit FPG in conjunction with the diaphragm stopping down operation. Those pulses are input through the terminal CK1 to the event counter ECO of which content decreases at each pulse until the content becomes "0" which means that the diaphragm has been stopped down by desired steps. With this, the process is interrupted by the event counter ECO and jumps to step #137 wherein a pulse is output from the terminal P5 to arrest the diaphragm mechanism and interrupt the stopping-down operation.

When the counting of the time t1 is completed at step #129, the data of the controlled exposure time set in the register TVCR is set in a timer register TIR and a pulse is output at the terminal P7 to initiate the travel of the leading shutter curtain. It should be noted that the camera I of the present embodiment is a single lens reflex camera with a focal plane shutter of the type having leading and trailing curtain or blade set. At step #132, the actual exposure time $2^{-TV}$ is counted. When the counting is completed, a pulse is output at the terminal P8 to initiate the travel of the trailing shutter curtain. At this condition, the microcomputer MC0 waits for the completion of the trailing shutter curtain travel which will cause the reset switch S4 to close and the potential at terminal P2 to be a "Low" level. When the exposure control operation is completed, "1" is set at bit b4 of the register RMR0 to enable the transmission of a signal that indicates that an exposure control operation has been done. Then, the process jumps to a subroutine for transferring the data CF and RM and thereafter the process jumps to step #109. It should be noted that standard clock pulses are supplied to the automatic focusing circuit AFC and the data output circuit SDO through the terminal CKO of the microcomputer MCO along the line STCP.

The above is the description of the operation of the microcomputer MC0. Table 13 shows the functions of the registers and flags referred to in the description.

TABLE 13

| Registers or Flags | Function |
| --- | --- |
| k | Designating the number (address) of the data setting registers |
| IOR | Serial inputting and outputting |
| FCR | Setting the data FC0 fed from the flash device |
| MTR0 | Setting the data MT0 fed from the signal receiving device |
| MTR1 | Setting the aperture value (Av) data MT1 fed from the signal receiving device |
| MTR2 | Setting the exposure time value (Tv) data MT2 fed from the signal receiving device |
| MTR3 | Setting the flash light amount data MT3 fed from the signal receiving device |
| AVDR | For the controlled diaphragm aperture, i.e. the diaphragm aperture to be controlled actually. |
| AVCR | For the controlled number of stopping-down steps of the diaphragm aperture |
| DPR | For the display of modes, warning and so forth |
| TVCR | For the controlled exposure time, i.e. the exposure time to be controlled actually |
| AVFR | For the diaphragm aperture value for flash photography |
| RMR0 | Setting the data RM0 |
| CFR2 | Setting the data CF2 of the film speed value Sv and the exposure control mode |
| CFR3 | Setting the data CF3 of MT3 and the flash light emission mode |
| TIR | Counting the exposure time $2^{-TV}$ |
| ECO | Event counting |
| RF | Flag for indicating that anticipated diaphragm aperture is out of controllable range |

Now, explanation will be made, with reference to FIG. 6, about the operation of the flash light control circuit FLC effected during the exposure control operation. From the analog output terminal ANO of the microprocessor MC0 is output a voltage signal which has been converted from the ISO data Sv. The voltage signal is applied to non-inverting input terminal of an amplifier OA2 through the buffer circuit OA1. Between the two input terminals of the amplifier OA2 is connected a photocell PD which is arranged in the camera body to receive light coming from an object to be photographed (objected light), passing through the diaphragm aperture and reflected by the film plane. A logathmic compression diode D0 is connected in the feedback roop of the amplifier. Thus, the amplifier outputs a voltage signal as a sum of the voltage proportional to the logarithm of the object light intensity and the voltage converted from the ISO data. The output voltage of the amplifier OA2 is logarithmically expanded by a transistor Tr40 into a current which is proportional to the antilogarithm of the voltage. A pulse output from the terminal P4 upon the commencement of the release operation, set a flip-flop FF1 of which $\overline{Q}$ output becomes a "Low" level.

Closure of the X contact Sx causes the flash device to emit light with the potential on the signal line ST2 dropping to a "Low" level so that a transistor Tr46 becomes non-conductive and the output FIC of the inverter IN1 will be a "Low" level. With this, both inputs of the NOR gate NO0 are "Low" levels to make the transistor Tr41 nonconductive. Thus, in response to the closure of the X contact Sx, the collector current of the transistor Tr40 is integrated by a capacitor C20. When the integration of the current reaches the output level of a constant voltage source CE1, the output of a comparator AC1 inverts to a "High" level, causing an one-shot circuit OS1 to output a pulse. In response to the pulse, a "Low" level pulse is output from the NOR gate NO1 so that a transistor Tr42 is conductive for the duration of the pulse to output a flash light stop pulse along the signal line ST3. If the flash device III is in the automatic flash light control mode at this time, the flash light stop signal interrupt the flash light emission. When a pulse is output from the terminal P8 to start the travel of the trailing shutter curtain, the pulse is delayed for a given time by a delay circuit DL1 and resets the flip-flop FF1 to make the transistor Tr41 conductive to stop the integration by the capacitor C20, thereby restoring the initial condition.

Figure 9:
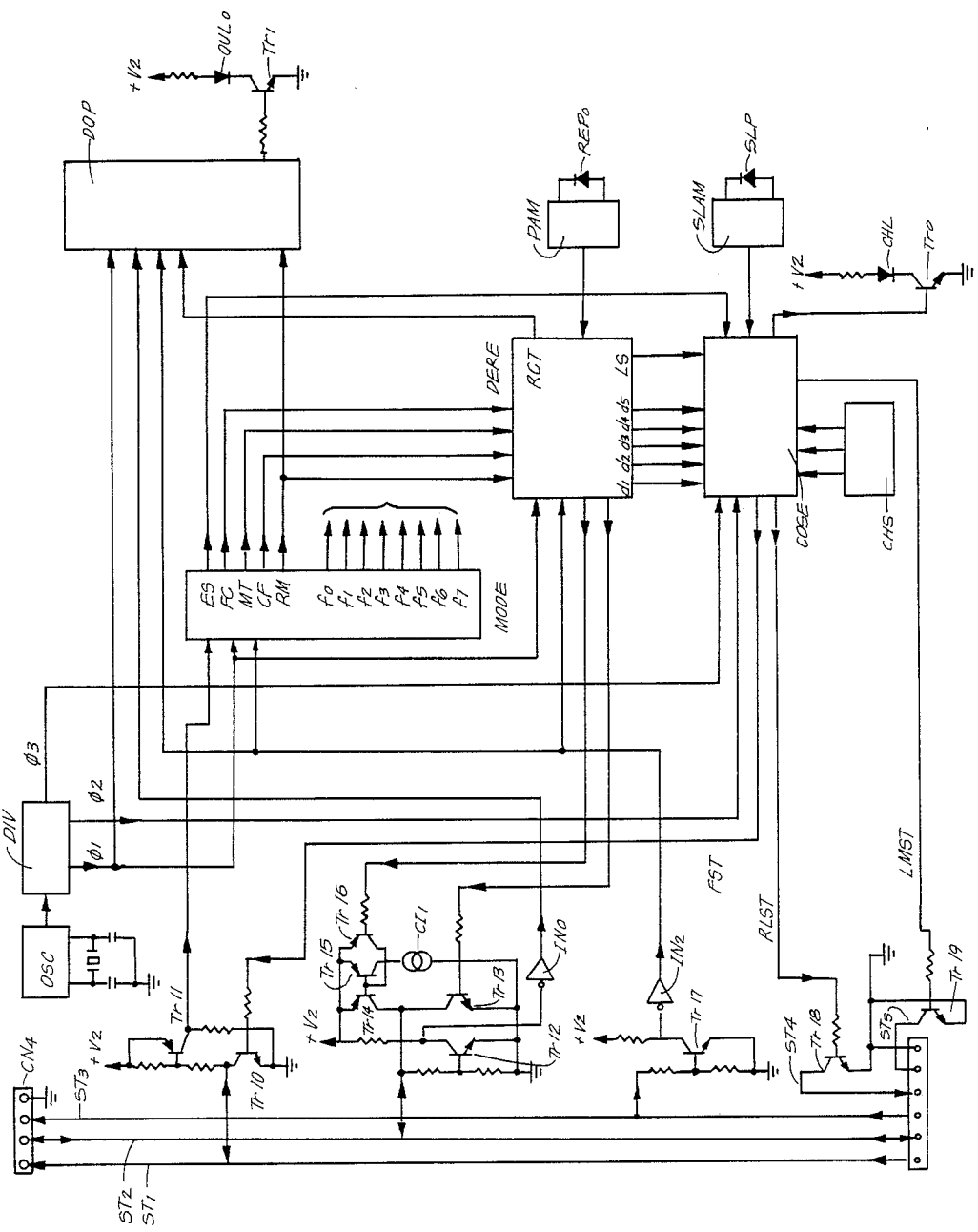
FIG. 9 is a circuit diagram showing an exemplary definite circuit of the signal receiving device II.

An exemplary definite circuit of the receiver II is now described with reference to FIGS. 9 through 14. FIG. 9 is a block diagram showing the construction of the receiver II. A frequency divider DIV divides the clock pulses fed from an oscillator OSC and outputs standard clock pulses $\phi_1 > \phi_2 > \phi_3$. A transistor Tr11 detects the signal representing the closure of the X contact Sx and fed along the signal line ST1. The X contact closure signal is input to an operation mode detecting circit MODE as the light emission initiating signal of a "High" level. The flash emission signal fed through a signal line FST is detected by a transistor Tr10 which outputs the flash emission inititating signal of a "Low " level along a signal line ST1.

The data fed through a signal line ST2 is read into a data output circuit DOP through a transistor Tr12 and an inverter IN0 which turns on and off or inverts its output in response to the data. The data read by a data reading circuit DERE are applied to the bases of transistors Tr10 and Tr13 and are output along the signal line ST2. In order to output a "High" level signal, transistors Tr13 and Tr16 are non-conductive and transistors Tr14 and Tr15 are conductive with the transistor Tr14 being in a condition to be driven by a constant current. In order to output a "Low" level signal, the transistors Tr13 and Tr16 are conductive, while the transistors Tr14 and Tr15 are non-conductive. Accordingly, the output impedance is lower in the case of the "Low" level signal being output than in the case of the "High" level signal being output. When no data is output, the transistor Tr16 is conductive and the transistors Tr13, Tr14 and Tr15 are non-conductive in order not to effect the data exchange between the camer I and the flash device III and the data reading from the camera I into the receiver.

The signal fed along a signal line ST3 is converted by a transistor Tr17 and an inverter IN2 into a signal of the same phase and supplied to the operation mode detecting circuit MODE, the data output circuit DOP and the data reading circuit DERE. A light measurement initiation signal is output from an exposure control signal output circuit COSE along a line LMST to make a transistor Tr19 conductive so that a "Low" level signal is transmitted through a signal line ST5 to the camera I, thereby initiating a preparatory operation for the exposure control in the camera. An exposure control operation initiating signal i.e. a release signal is output from the exposure control signal output circuit COSE along a line RLST to make a transistor Tr18 conductive so that a "Low" level signal is transmitted through the line ST4 to the camera I and the camera exposure control operation is commenced. The definite circuit of each block in FIG. 9 will be explained in the following.

Figure 10:
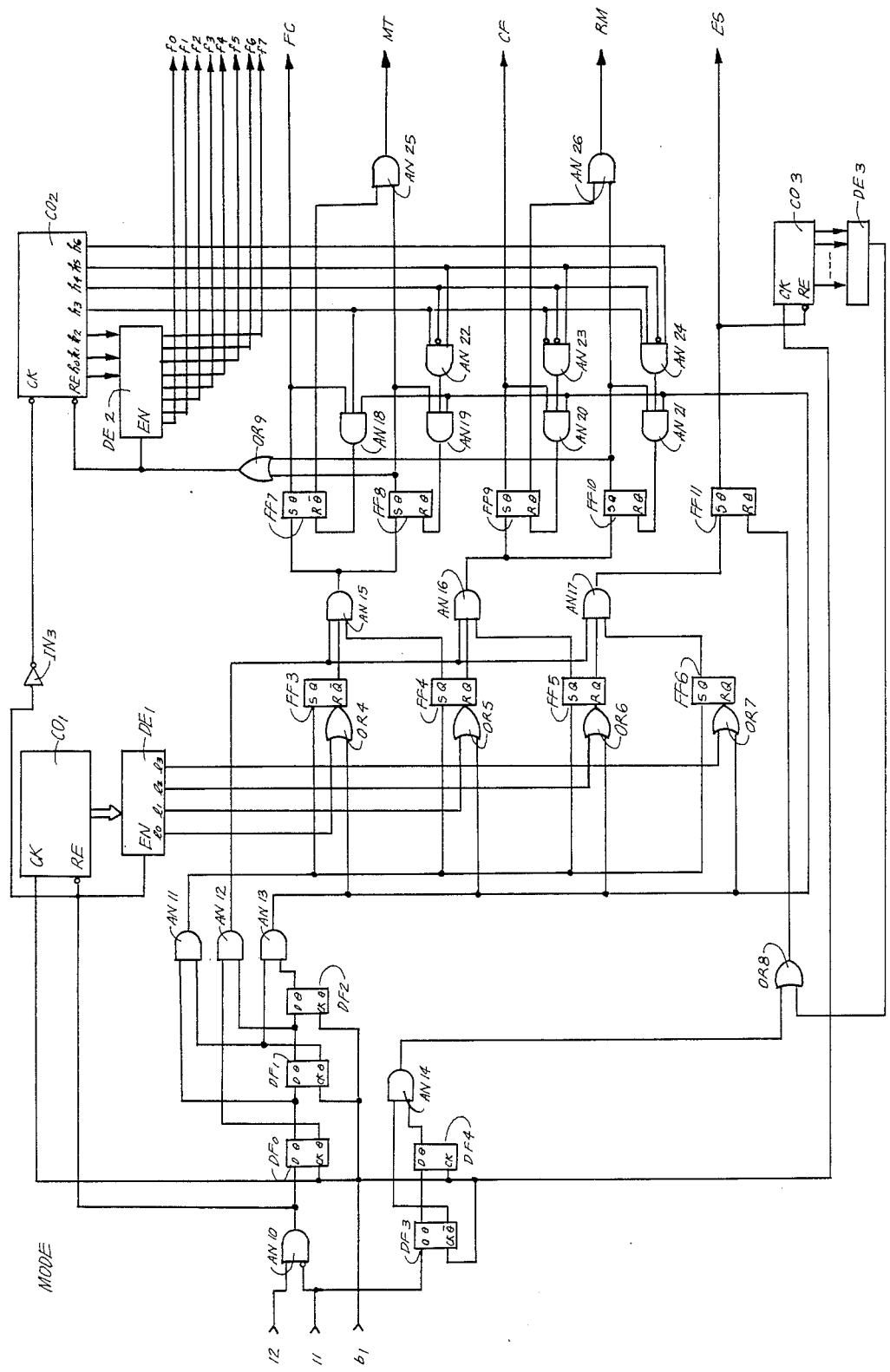
FIGS. 10, 11, 12, and 14 are circuit diagrams showing exemplary definite circuit of the blocks MODE, DERE, DOP and COSE in FIG. 9.

FIG. 10 shows an exemplary definite circuit of the operation mode detecting circuit MODE, which detects the width (50, 100 or 150 $\mu$sec) of the pulse fed through the signal line ST3, determines the camera operation mode and the operation of the receiver II. When a light emission initiating signal is not supplied through the signal line ST1 and the transistor Tr11 is non-conductive to unblock an AND gate AN10, a pulse fed through the signal line ST3 is output from the AND gate AN10 through the transistor Tr17 and the inverter IN2. While the "High" level of the pulse continues, a counter CO1 is released from the reset condition so that the counter CO1 counts the standard clock pulses $\phi_1$. Further, an AND gate AN11 outputs a pulse for one clock that synchronizes with the rising of a pulse fed from the AND gate AN10, thereby setting flip-flops FF3 through FF6. A decoder DE1 responds to the output of the counter CO1 and outputs signals as shown in the following table 14.

TABLE 14

| Time ($\mu$sec) | e0 | e1 | e2 | e3 |
|---|---|---|---|---|
| 0–30 | L | L | L | L |
| 30–80 | H | L | L | L |
| 80–130 | H | H | L | L |
| 130–180 | H | H | H | L |
| more than 180 | H | H | H | H |

An AND gate AN12 outputs a pulse for one clock of the standard clock pulses $\phi_1$ that synchronizes with the falling of the pulse fed through the signal line ST3. An AND gate AN13 outputs a pulse that delays by one clock time from the output of the AND gate AN12.

Accordingly, when a pulse of the width of 50 $\mu$sec is fed from the camera I, the falling of the pulse resets a flip-flop FF3 and sets a flip-flop FF4 so that flip-flops FF7 and FF8 are set by a pulse fed from the AND gate AN12 through an AND gate AN15. When a pulse of the width of 100 $\mu$sec is supplied, the falling of the pulse resets the flip-flops FF3 and FF4 so that an AND gate AN16 outputs a pulse fed from the AND gate AN12, to set flip-flops FF9 and FF10. Further, when a pulse of the width of 150 $\mu$sec is supplied, the falling of the pulse resets the flip-flops FF3, FF4 and FF5 so that an AND gate AN17 outputs a pulse fed from the AND gate AN12, to reset the flip-flop FF11. Thus, the flip-flop FF7 and FF8 or FF9 and FF10 or FF11 are set in accordance with the width of the pulse fed from the camera I and representing the operation mode.

It is to be noted that when a data transferring clock signal is output along the signal line ST3 the width of the clock pulse is less than 30 $\mu$sec and that the pulse from the AND gate AN12 is not output from any of the AND gates AN15, AN16 and AN17 so that the determination of the operation mode is not affected. A pulse from the AND gate AN13 resets flip-flops FF3 through FF6. When a pulse with a width larger than 180 $\mu$sec, all the outputs e0 through e3 of the decoder DE1 are "High" levels at the rising of the pulse so that all the flip-flops FF3 through FF6 are reset and the pulse from the AND gate AN12 will not be output from AND gates AN15 through AN17.

When the flip-flops FF7 and FF8 are set, the potential at a terminal FC and the output of an OR gate OR9 become "High" levels and the counter CO2 is released from the reset condition to enable the decoder DE2. When the potential at the terminal FC is a "High" level, the data FCO is transmitted from the flash device III to the camera I. During the data transmission, clock pulses $\phi 1$ are supplied through the AND gate AN10 and the inverter IN3 to the counter CO2 so that "High" level signals are output sequentially from the terminals f0 through f7 of the decoder DE2 in accordance with the counted values k0, k1 and k2.

When eight clock pulses have been counted with the fourth bit k3 of the counter becoming a "High" level and the AND gate AN18 outputs a pulse which is fed from the AND gate AN13 and which is delayed by one clock time from the standard clock pulse $\phi 1$, the flip-flop FF7 is reset and the potential at the terminal FC becomes a "Low" level. With this, the output MT of an AND gate AN25 becomes a "High" level to attain an operation mode wherein the data MT0, MT1, MT2 and MT3 captured in the receiver II are output. When four-bite data are output and are combined with the above mentioned data FC0 to make the values at the terminals k5, k4 and k3 of the counter CO2 "101", the output of an AND gate AN22 becomes a "High" level and an AND gate AN19 outputs a pulse fed from the AND gate AN13 to reset a flip-flop FF8 whereby the potential at a terminal MT becomes a "Low" level to reset the counter CO2. Following table 15 shows those operations.

TABLE 15

| FC | MT | k5 | k4 | k3 | Output Data |
|---|---|---|---|---|---|
| H | L | 0 | 0 | 0 | FC0 |
| L | H | 0 | 0 | 1 | MT0 |
| L | H | 0 | 1 | 0 | MT1 |
| L | H | 0 | 1 | 1 | MT2 |
| L | H | 1 | 0 | 0 | MT3 |

When the flip-flips FF9 and FF10 are set, the potential at the terminal CF becomes a "High" level so that the data CF0, CF1, CF2 and CF3 fed from the camera are read into the flash device III. When the outputs k5, k4 and k3 of the counter CO2 becomes "100", the output of the AND gate AN23 turns to a "High" level and the pulse fed from the AND gate AN13 is output from the AND gate AN20 to reset the flip-flop FF9. Hence, the potential at the terminal CF becomes a "Low" level and the output RM of the AND gate AN26 becomes a "High" level to effect the reading of data RM0 through RM6 from the camera I into the receiver II. When the exchange of the eleven byte data CF0 through CF3 and RM0 through RM6 has been completed, the outputs k6, k5, k4 and k3 of the counter CO2 becomes 1011 so that the output of the AND gate AN24 becomes a "High" level and the pulse fed from the AND gate AN13 is output from the AND gate AN21 to reset the flip-flop FF10. Hence, the output RM of the AND gate, AN26 becomes a "Low" level and the data reading operation stops. Those operations are summarized in the following table 16.

TABLE 16

| CF | RM | k6 | k5 | k4 | k3 | Data read in |
|---|---|---|---|---|---|---|
| H | L | 0 | 0 | 0 | 0 | CF0 |
| H | L | 0 | 0 | 0 | 1 | CF1 |
| H | L | 0 | 0 | 1 | 0 | CF2 |
| H | L | 0 | 0 | 1 | 1 | CF3 |
| L | H | 0 | 1 | 0 | 0 | RM0 |
| L | H | 0 | 1 | 0 | 1 | RM1 |
| L | H | 0 | 1 | 1 | 0 | RM2 |
| L | H | 0 | 1 | 1 | 1 | RM3 |
| L | H | 1 | 0 | 0 | 0 | RM4 |
| L | H | 1 | 0 | 0 | 1 | RM5 |
| L | H | 1 | 0 | 1 | 0 | RM6 |

When the flip-flop FF11 is set to make the potential at the terminal ES a "High" level so that exposure control operation is to be effected in the camera I. When the trailing shutter curtain completes its travel to open the X contact Sx under this condition, the transistor Tr11 becomes non-conductive and the output of the transistor Tr11 drops to a "Low" level. Then, the AND gate AN14 outputs an one clock of the standard clock pulse in synchronization with the drop of the output of the transistor Tr11. The pulse resets the flip-flop FF11 through the OR gate OR8 to make the potential at the terminal ES a "Low" level. When the potential at the terminal ES is a "High" level the counter CO3 is released from the reset state and is allowed to count the standard clock pulses $\phi 1$. When a given time, e.g. five second has lapsed, the output of the decoder DE3 becomes a "High" level to reset the flip-flop FF11. The counter CO3 is provided to prevent the flip-flop FF11 from being left in the set state. The counter CO3 may be made operative even in the case when the flip-flops FF8 and FF10 are set, such that the output of the decoder DE3 also resets the flip-flops FF7 through FF10.

Figure 11:
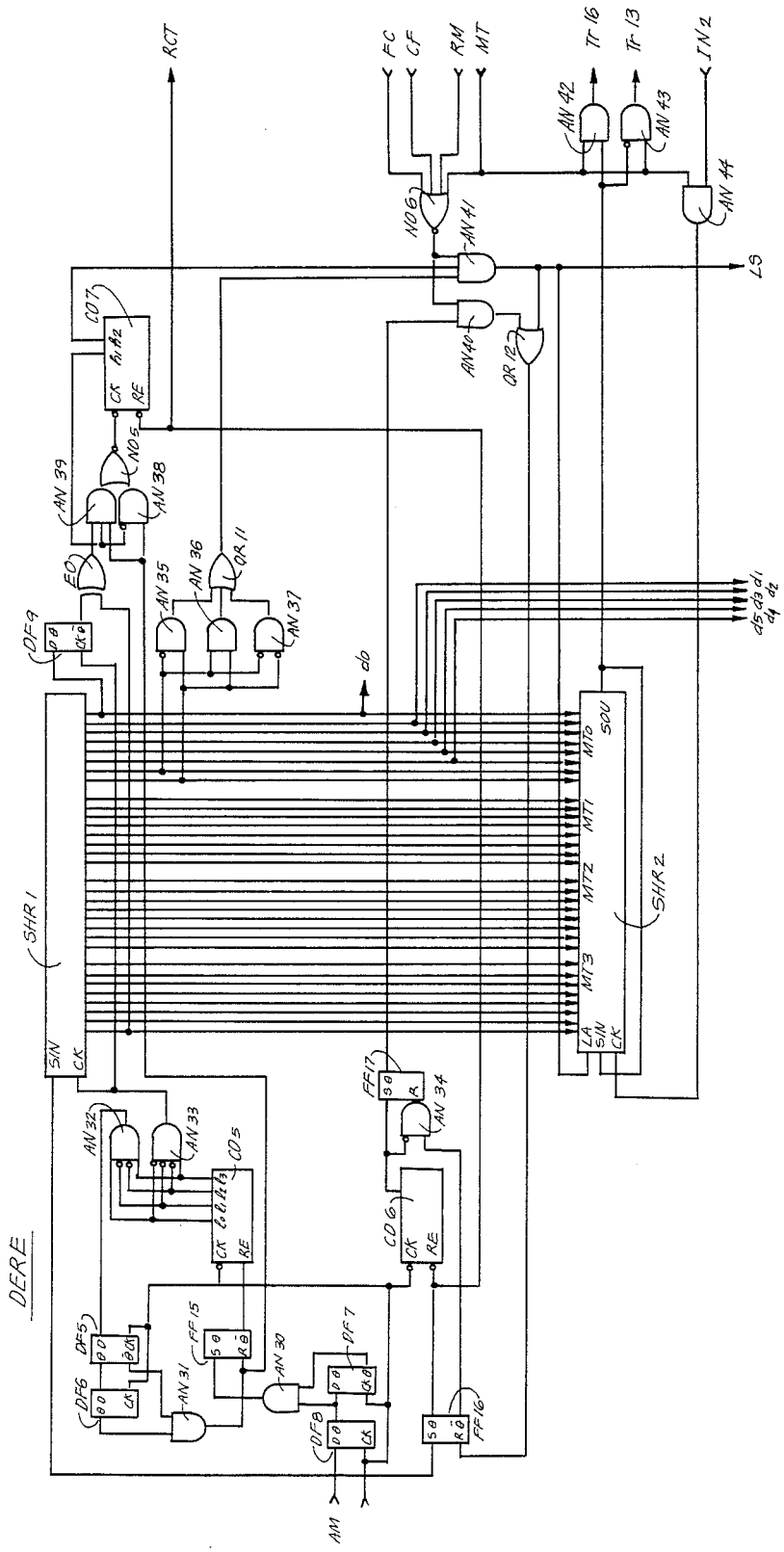
Figure 12:
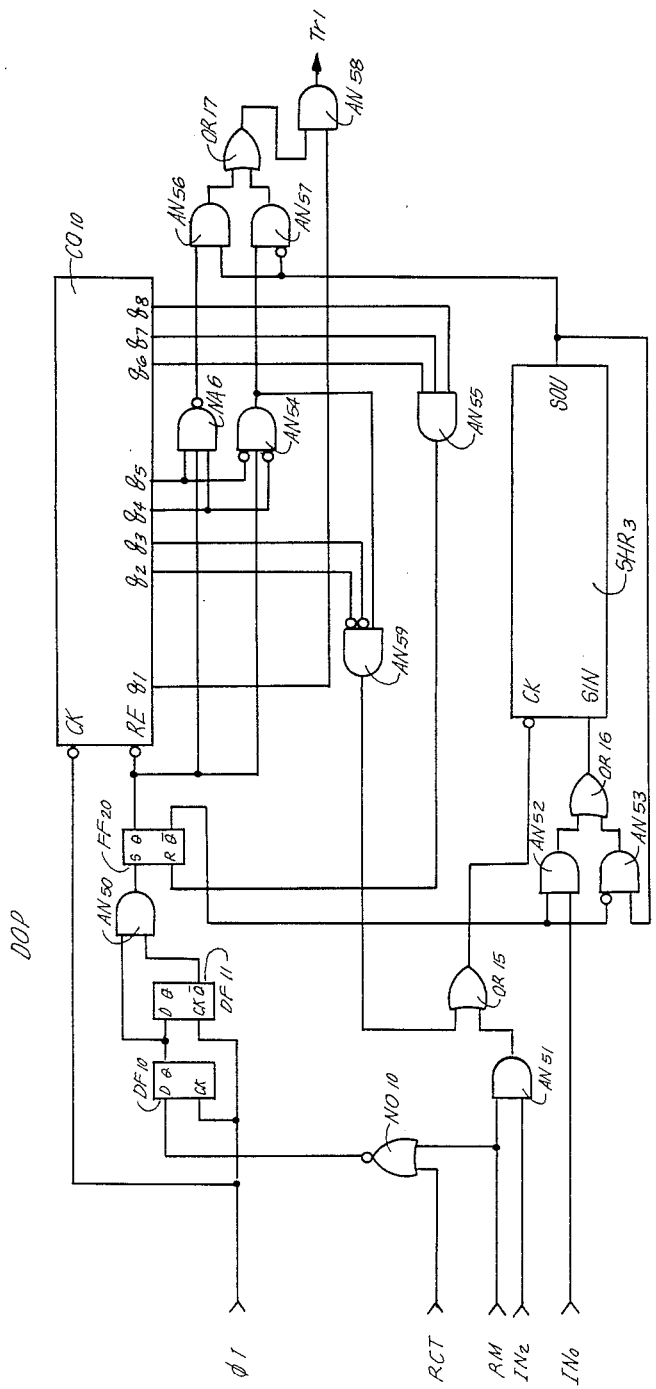

FIG. 11 shows an exemplary definite data reading circuit DERE which reads the data transmitted in the form of infrared light signals from the exposure meter IV or the remote controller A(V) or B(VI). FIG. 12 shows an exemplary definite data output circuit DOP which transmits the data to the exposure meter IV or the remote controller A(V) in the form of infrared light signal. FIG. 13 is a time chart for explaining the operation of those circuits.

When the preamplifier PAM shown in FIG. 9 supplies, to the circuit of FIG. 11, a pulse of the width commensurate with the received signal light, and AND gate AN30 responds to the rising of the pulse and outputs a pulse ($\beta 0$ in FIG. 13) in synchronization with the standard clock pulse $\phi 1$ to set a flip-flop FF15 ($\oplus 1$ in FIG. 13). When the flip-flop FF15 is set, its $\overline{Q}$ output becomes a "Low" level so that a counter CO5 is released from a reset state and begins to count the standard pulses $\phi 1$. Then, signals $\beta 2$, $\beta 3$, $\beta 4$ and $\beta 5$ as shown in FIG. 14 are output from terminals 10, 11, 12 and 13 and signals $\beta 6$ and $\beta 7$ are respectively output from AND gates AN33 and AN32. At the rising of the output of the AND gate AN33, the output of the preamplifier PAM is a "High" level with the transmitted light signal being "1" and a "Low" level with the light signal being "0". Accordingly, if the output of the preamplifer PAM is captured by the shift register SHR1 at the rising of the output of the AND gate AN33, the shift register SHR1 is to capture the transmitted data "1" or "0". (SHR in FIG. 13)

Additionally, in synchronization with the drop of the output of the AND gate AN32, the AND gate AN31 outputs a pulse of one clock of the standard clock pulses φ1 to reset the flip-flop FF15 and the counter CO5. Then, when data of the next bit has been transmitted, the flip-flop FF15 is set again to effect the operation as described above and data of the next bit is captured by the shift register SHR1. Thus, data are captured a bit by a bit until four byte data MT0, MT1, MT2 and MT3 are captured whereupon the same four byte data are supplied from the exposure meter IV or the remote controller A(V) or B(IV). Accordingly, the highest bit data in the shift register SHR1 is captured into the D flip-flop DF3 with the rising of the output of the AND gate AN33. Then, an exclusive OR gate EO determines whether or not the data input to the lowest bit of the shift register SHR1 coincides with the data captured in the D flip-flop DF9. Thus, when the next same four byte data are read, it is discriminated bit by bit whether the previous data were correctly read.

While the first four byte data are being read, the potential at the terminal h1 of the counter CO7 is a "Low" level enabling an AND gate AN38 so that pulses fed from the AND gate AN31 are applied through the AND gate AN38 and a NOR gate NO5 to the clock input terminal of the counter CO7. As the result, 32 (=4×8) clock pulses are applied to the counter CO7. When the 32 clock pulses have been counted, the potential at the terminal h1 turns to a "High" level, disabling or blocking the AND gate AN38 and enabling or opening an AND gate AN39. If the previously read bit coincides with the bit which was read this time, this means that the $\bar{Q}$ output of the D flip-flop DF9 does not coincide with the data that was read this time from the lowest bit. Accordingly, the output of the exclusive OR gate EO is a "High" level causing the counter CO7 to count the pulses fed from the AND gate AN31. When the two kinds of data coincide with each other at all of the 32 bits, this means that the counter CO7 has counted 64 pulses, and the potential at another terminal h2 of the counter CO7 becomes a "High" level.

When all the data have been read, AND gates AN35, AN36 and AN37 determine which of "10", "11" and "00" has been read for the bit b7 and b6 of the data MT0. If one of the data has been read, the output of the corresponding one of the AND gates AN35, AN36 and AV37 becomes a "High" level to make the output of an OR gate OR11 a "High" level. At this stage, if no data is exchanged between the camera I and the flash device III or the receiver II, the output of the NOR gate NO6 remains a "High" level. As the result, the outputs of an AND gate AN41 and an OR gate OR12 rise to "High" levels and the data MT0 through MT3 read in the shift register SHR1 are preset in another shift register SHR2. Further, the rising signal of the output of the AND gate AN41 is supplied through a terminal LS to the exposure control signal outputting circuit COSE.

Additionally, the "High" level signal from the AND gate AN41 is transmitted through an OR gate OR12 and a flip-flop FF16 to reset the flip-flop FF16. The flip-flop FF16 is set when the preamplifier PAM applies thereto a signal receipt signal. When the Q output of the flip-flop FF16 turns to a "High" level, the reset of the counter CO7 is released. The Q output of the flip-flop FF16 is transmitted through a terminal RCT to the signal transmission circuit DOP and serves as a signal interference preventing signal which inhibits signal transmission while a signal is being received. When data are exchanged between the camera I and the flash device III or the receiver II and an input signal of the NOR gate NO6 is a "High" level, the output of the NOR gate NO6 is a "Low" level so that none of the above described operations is performed. When the data exchange is completed and the output of the NOR gate NO6 turns to a "High" level, the above described operations including the data presettings and other are performed.

If data are not correctly read with the potential at the terminal h2 of the counter CO7 remaining at a "Low" level for a long time or signals are read from another signal receiving device with the bits b7 and b6 and the data MT0 becoming "01", the output of the AND gate AN41 remains a "Low" level. In this case, setting of the flip-flop FF16 release the reset condition of the counter CO9, which will then be enabled. When a sufficient time during which all the data are expected to be read and data are exchanged with the camera I, has lapsed from the releasing of the reset condition, the output of the counter CO6 becomes a "High" level to set a flip-flop FF17. At this time, if no data is exchanged with the camera I or the data exchange has been completed, the output of the AND gate AN40 is a "high" level to make the output of the OR gate OR12 a "High" level which resets the flip-flop FF16 and accordingly resets the counter CO6, the flip-flop FF17 and the counter CO7 so that the initial condition is restored. In this case, no data is preset in the shift register SHR2 in which former data remain, and the signal rising to a "High" level is not transmitted to the terminal LS.

When the potential at the terminal MT of the aforementioned operation mode detecting circuit MODE becomes a "High" level, AND gates AN42, AN43 and AN44 are enabled to attain a condition wherein the data captured in the shift register SHR2 are transferred to the camera I. Then, an AND gate AN44 outputs clock pulses that are input thereto along the line ST3 through the transistor Tr17 and the inverter IN2 shown in FIG. 9. From the output terminal SOU of the shift register SHR2 are output data bit by bit in synchronization with the rising of the clock pulses. Those data are transmitted to the input terminal SIN of the shift register SHR2 and read by the shift register SHR2 at the drops of the clock pulses. This to transmit the same data to the camera repeatedly, in view of the fact that no new data for the next data transmission is often preset.

If the data from the output of the shift register SHR2 is a "High" level, the output of the AND gate AN42 is a "High" level and the output of the AND gate AN43 is a "Low" level, so that transistors Tr15 and Tr14 are conductive and a "High" level signal is output along a line ST2. If the output of the shift register SHR2 is a "Low" level, the output of the AND gate AN42 is a "Low" level and the output of the AND gate AN43 is a "High" level so that transistors Tr13 and Tr16 are conductive and a "Low" level signal is output along the line ST2. Thus, description has been made about the operation of the signal receiving device for reading the data transmitted in the form of infrared light signal from the exposure meter IV, or the remove controller A(V) or B(VI).

Then, an exemplary definite circuit of the data outputting circuit DOP is described with reference to FIG. 12. In the case when the data RM0 through RM6 which are to be transmitted from the camera I to the receiver II are output along the signal line ST2, the potentialar the terminal RM of the operation mode detecting circuit MODE first become a "High" level to enable an AND gate AN51. At this time, data transfer clock pulses input from the signal line ST3 through the transistor Tr17 and the inverter IN2, are applied through an AND gate AN51 and OR gate OR16 to the clock input terminal CK of a shift register SHR3. As a flip-flop FF20 has been reset at this stage, an AND gate AN52 is open. Accordingly, the data RM0 through RM6 that are input from the signal line ST2 through the transistor Tr12 and the inverter IN0, are input to the input terminal SIN of the shift register SHR3 through the AND gate AN52 and the OR gate OR16. Those data are sequentially captured in the shift register SHR3 in synchronization with the drops of input clock pulses.

When the capturing of the data RM0 through RM6 has been completed, the potential at the terminal RM becomes a "Low" level and the output of the NOR gate NO10 becomes a "High" level. Then, if the receiver device II is not in signal receiving condition, the potential at the terminal RCT of the operation mode detecting circuit MODE is a "Low" level, so that the AND gate AN50 outputs a pulse corresponding to the one clock pulse of the standard clock pulse $\phi1$ in synchronization with the rising of the output of the NOR gate NO10. ($\alpha4$ of FIG. 13). The pulse, then, sets the flip-flop FF20 ($\alpha5$ of FIG. 13) to release the reset condition of the counter CO10 and enable an AND gate AN53. If the receiver II is receiving signals and the potential at the terminal RCT is a "High" level when the potential at the terminal RM becomes a "Low" level, the output of the NOR gate NO10 remains at a "Low" level, and the output of the NOR gate NO10 rises to a "High" level when the signals have been received with the potential at the terminal RCT becoming a "Low" level.

When released from the reset condition, the counter CO10 counts the standard clock pulses $\phi1$. From the terminal q1 is output high frequency clock pulses for carrier wave. Clock pulses $\alpha1$ through $\alpha3$ as shown in FIG. 13 are output from teriminals q2 through q5 and an AND gate AN59 outputs pulses $\alpha8$ shown in FIG. 13 which pulses are supplied through an OR gate OR15 to the clock input terminal CK of the shift register SHR3. The shift register SHR3 captures data with the drop of the clock pulses and outputs data with the rising of the clock pulse. Accordingly, the shift register SHR3 outputs signals shown as $\alpha9$ in FIG. 13. In this example, data "1011 ... " is output.

Additionally, a NAND gate NA6 outputs a signal $\alpha7$ shown in FIG. 13 and an AND gate AN57 outputs a signal $\alpha6$ shown in FIG. 13. As seen in FIG. 13, those signals $\alpha6$ and $\alpha7$ respectively have widths of one period and three periods of the clock pulses $\alpha1$ output from the terminal q3, and can be determined by the difference of the width to be "1" or "0". When the shift register SHR3 outputs a signal of "0", a narrow or short duration pulses $\alpha6$ fed from the AND gate AN54 is output through an AND gate AN57 and an OR gate OR17. When a signal "1" is output, wide or long duration pulses $\alpha7$ fed from the NAND gate NA6 is output through the AND gate AN56 and the OR gate OR17. ($\alpha10$ in FIG. 13) The signal output from the OR gate OR17 and the carrier wave clock pulses are applied through an AND gate AN58 to the transistor Tr1 such that the infrared light emitting diode OUL0 blinks with the durations of energizations depending on the signal applied to the transistor Tr1.

It is to be noted that, as seen in FIG. 13, the signal receiving side determined at the termination of two period of the signal $\beta3$, i.e., at the termination of two period of the siignal $\alpha1$ whether the received signal is a "High" level or not, and that the detection signal never fails to be a "Low" level for "0" and a "High" level for "1", therby ensuring accurate data exchange.

As the receiver II transmits the same data twice, the data output from the shift register SHR3 is again captured through the AND gate AN53 and the OR gate OR16 at the drops of the clock pulses. When the data RM0 through RM6 are sent out twice, i.e. when data of $8\times7\times2=112$ bits are sent out, the potentials at terminals q6, q7 and q8 become "High" levels to make the output of an AND gate AN55 a "High" level and reset the flip-flop FF20 so that the counter CO10 is reset and restores to the initial condition. The above are description of the data transmission.

Then, the operation of the operation of the exposure control signal output circuit COSE will be described with reference to FIG. 14. When the data exchange has been completed normally, a "High" level pulse is input from the terminal LS of the data reading circuit DERE and a flip-flop FF23 is set. In response to the rising of the Q output of the flip-flop FF23, an AND gate AN61 outputs the third of the standard clock pulses $\phi2$. At that time, if the channel signal (the bits b1, b2 and b3 of the data MT0) fed from the terminals d1, d2 and d3 of the data reading circuit DERE coincides with the data fed from the channel data output means CHS of the receiver II, the output of a comparator circuit COP is a "High" level and the output of an OR gate OR20 is a "High" level. When the potentials at the terminal d1, d2 and d3 are "111" to designate all the channels, the output of an AND gate AN60 is a "High" level and the output of the OR gate OR20 is also a "High" level.

When a light emission testing signal has been input with the potential at the terminal d5 being at a "High" level, a pulse fed from and AND gate AN61 is output through an AND gate AN62 and an OR gate OR21 to set a flip-flop FF24 and release the reset of a counter CO15. At this time, if the camera I is not in exposure control operation with the potential at the terminal ES of the operation mode detecting circuit MODE being a "Low" level, and AND gate AN71 outputs a "High" level signal of the Q output of the flip-flop FF24 which signal is transmitted through a signal line FST to the transistors Tr10 shown in FIG. 9. The transistor Tr10, in response to the "High" level signal, becomes conductive to make the potential at the signal line ST1 a "Low" level, thereby effecting the test light emission of the flash device III. A photocell SLP and an amplifier SLAM output a "High" level pulse, detecting the rising of light emitted by another flash device. The pulse is output thrugh the OR gate OR21 to set the flip-flop FF24 and effect the light emission of the relevant flash device. After a lapse of a given time from the start of the flash light emission, the output of a counter CO15 turns to a "High" level to reset the flip-flop FF24, restoring the initial condition.

When the output of the OR gate OR20 becomes a "High" level, and AND gate AN64 outputs a pulse fed from the AND gate AN61 to set a flip-flop FF25. As the result, a counter CO16, being release from a reset condition, starts to count the standard clock pulses $\phi3$. After a lapse of a given time, the output of an AND gate AN16 becomes a "High" level. The given time is determined to be sufficient for the completion of a preparatory operation for exposure control, i.e. sufficient for the microcomputer MC0 to become ready for receiving an interruption signal at its terminal it1 after receiving an interruption signal at the terminal it0. At that time, if one-shot photography mode is designated with the potential at the terminal d4 being a "High" level, the output of an AND gate AN67 becomes a "High" level which is transmitted through an OR gate OR22 and the signal line RLST to the transistor Tr18 shown in FIG. 9. The transistor Tr18 becomes then conductive to make the potential at the signal line ST4 a "Low" level so that exposure control operation starts in the camera I. When a given time has lapsed further from that time, the output of the AND gate AN65 becomes a "High" level to reset a flip-flop FF25 with the counter CO16 being reset, while the output of the AND gate AN66 becomes a "Low" level to inhibit the transmission of the shutter release signal to the camera I.

When the continuous photography mode is designated, the potential at the terminal d4 is s "Low" level so that the "High" level signal fed from the AND gate An66 is output from an AND gate AN68 to set the flip-flop FF26 and that a shutter release signal is output. The outputting of the release signal continues even after the counter CO16 is reset such that exposure control operation is effected every time the film wind-up and cocking of the exposure control mechanism have been completed in the camera. This operation may be effected by a motor driven winder device which is mounted on the camera I and which cocks the exposure control mechanism and winds up a film. When data are transmitted again from the remote controller A(V) or B(VI) and the output of the OR gate OR20 becomes a "High" level, the pulse fed from the AND gate AN61 is output this time from an AND gate AN69 to reset the flip-flop FF26 so that no shutter release signal is transmitted. Accordingly, in the case of the continuous photography mode, a first shutter release signal output from one of the remote controllers initiates the continuous photography and the second shutter release signal terminates the continuous photography.

The pulse output from the AND gate AN61 is also supplied to a flip-flop FF27 to set the latter and release the reset of a counter CO17 such that the counter CO17 counts the standard clock pulses $\phi 3$. In accordance with the output q10 of the counter CO17, the transistor Tr0 turns on or off, thereby causing the light emitting diode CHL to indicate that data have been read normally. After a lapse of a given time, the flip-flop FF27 is reset to stop the indication. The Q output of the flip flop FF27 is transmitted through a signal line LMST to the transistor Tr19 shown in FIG. 9 to make the latter conductive. With the conduction of the transistor Tr19, the potential at the signal line ST5 becomes a "Low" level and an interruption signal is input to the interrupt terminal it0 of the camera microcomputer to initiate the preparatory operation for exposure control. The read data RM0 through RM6 are captured. The above is the description of the receiver II.

Then, the flash device II will be explained with reference to FIGS. 15, 16 and 17. FIG. 15 shows definite examples of the charged condition monitoring circuit CHM and the charged condition detecting circuit CHD. The monitoring circuit CHM comprises a series connection of resistors R1, R2 and R3 which connection is connected across the main capacitor MC. From the output terminal of the variable resistor R2 is output a voltage as a function of the charged voltage of the main capacitor MC. The output voltage is compared by a comparator AC5 with a reference voltage whith is a fraction of the voltage on the power supply line VF divided by resistors R4 anf R5. When the output voltage is higher than the reference voltage, a "High" level signal is output at the terminal CH2 as a charge completion signal. The charge completion signal also makes the transistor Tr6 shown in FIG. 5 to energize the light emitting diode LD1.

Additionally, another reference voltage is produced by resistors R7 and R8 and it is higher than the reference voltage produced by resistors R4 and R5. When the voltage at the terminal CH1 becomes higher than the reference voltage produced by the resistors R7 and R6, the output of another comparator AC6 turns to a "High" level to make a transistor Tr52 conductive and connect a resistor R9 in parallel with a resistor R8, thereby lowering the reference voltage. In this case, the lowered reference voltage is still higher than the reference voltage produced by the registers R4 and R5. The "High" level of the comparator AC6 makes the output of an AND gate AN71 a "Low" level even if a flip-flop FF30 is set, so that a transistor Tr53 becomes non-conductive to stop the operation of the voltage booster circuit DD shown in FIG. 5. When the charged voltage of the main capacitor MC drops due to spontaneous discharging, the output of the comparator AC6 again becomes a "Low" level to restart the voltage boosting. Accordingly, as long as the flip-flop FF30 is set, the charged voltage of the main capacitor MC is maintained above a voltage at which the charge completion signal is output from the terminal CH2, but unnecessary voltage boosting operation is avoided.

When a pulse is input along the signal line ST3, the pulse is output through a transistor Tr51 and an inverter IN20 to set a flip-flop FF30 and reset a counter CO20. Accordingly, the counter CO20 is to start counting from its initial condition at each time when a pulse is input along the signal line ST3, so that the counter CO20 counts a given time e.g. 3 min from the interruption of the data exchange. When the counting of the given time is completed, a pulse is output from the carry terminal CY of the counter CO20 to reset the flip-flop FF30 so that the standard clock pulse $\phi F$ will not be input to the counter CO20 through the AND gate AN72 and that an AND gate AN71 interrupts operation of the voltage booster DD irrespectively of the output of the comparator AC6.

To restart the boosting operation, the operation of the camera I should be restarted such that a pulse is output at the terminal ST3 to set the flip-flop FF30. Although not shown in the Figure, it is necessary that when the power switch MSFL shown in FIG. 5 is closed, a power-on reset circuit sets the flip-flop FF30 and reset the counter CO20 ensuring the voltage boosting operation for the given time from the closure of the power switch MSFL. Further, a push switch may be provided such that, when the push switch is operated, the flip-flop FF30 is set to reset the counter CO20 and to restart the boosting operation in the case where the flash device is used, being separated from the camera I after the boosting operation is interrupted.

As described above, so far as the power switch MSFL is closed, the boosting operation is effected whenever the camera I operates. Additionally, as explained with reference to FIG. 9, whenever data are transmitted from the exposure meter or the remote controller, the receiver actuates the camera and accordingly the boosting operation of the flash device is also initiated. Thus, the boosting operation of the flash device III is controlled by means of the exposure meter and the remote controller and power waste due to unnecessary boosting is avoided when the flash device III is not in use.

FIG. 16 shows an example of definite flash control circuit FLCC and FIG. 17 is a flowchart a showing the operation of the microcomputer MCF provided in the flash control circuit FLCC. The transistor circuit connected to the signal lines ST2 and ST3 has the same construction as the transistor circuit in the signal receiving device II. As it is unnecessary to output a signal along the signal line ST1 from the flash device III, only the input transistor Tr31 is connected to the signal line ST1. The block MODE is an operation mode detecting circuit having the same circuit construction as the operation mode detecting circuit of the receiver II as definitely shown in FIG. 10.

When a pulse of 50 μsec width is input through the signal line ST3 and the potential at the terminal FC of the operation mode detecting circuit MODE becomes a "High" level, AND gates AN78 through AN80 are enabled and an AND gate AN81 is disabled. While no data is exchanged, the AND gate AN81 is enabled to reset a flip-flop FF32 so that, if a charge completion signal of a "High" level is supplied from the charged condition detecting circuit CHD through the terminal CH2, the outputs of the AND gate AN81, an OR gate OR30 and an AND gate AN76 become "High" levels to make the transistor Tr35 conductive and a "High" level signal is output along the signal line ST2. When the charging of the main capacitor has not been completed with the potential at the terminal CH2 being a "Low" level, a transistor Tr34 becomes conductive and a "Low" level signal is output along the signal line ST2. When the potential at the terminals FC and fo of the operation mode detecting circuit MODE becomes "High" levels, the output of an AND gate AN78 becomes a "High" level which is output along the signal line ST2, and which corresponds to the bit b0 of the data FCO, i.e., the power ON signal.

Then, when the potential at a terminal f1 becomes a "High" level, an AND gate AN79 outputs a signal fed from the terminal CH2, the signal corresponding to the bit b1 of the data FCO, i.e., the signal representing the charged condition. The signal output along the line ST2 at that timing, is read into a D flip-flop DF17 through a transistor Tr33 and an inverter IN21. This is because flash devices should not be fired if any one of the flash devices has not reach a charge completion state in the case where a plurality of flash devices are to be fired for multi-flash photography with the flash devices being connected to the camera with multi-flash cable connectors. To this end, when the transistor Tr34 becomes conductive, all the output current of the transistors Tr35 in other flash devices flow into the transistor Tr34, resulting in a "Low" level signal being output along the signal line ST2. The D flip-flop DF17 is also supplied with a "Low" level signal. Accordingly, when charge has not been completed even in a single flash device in the case of the multi-flash photography, the camera I, being supplied with no charge completion signal, performs a daylight photography operation and the flash device III will not emit light because of the "Low" level at the Q output of the D flip-flop DF17.

When the potential at a terminal f2 becomes a "High" level, the $\overline{Q}$ output of a flip-flop FF31 is output through an AND gate AN80 and along the signal line ST2. The signal is an FDC signal which indicates whether a flash light stop signal was produced within a given time from the start of the flash light emission. If the flash light stop signal has not been input, the flip-flop FF31 remain in the reset condition and a "High" level signal from the $\overline{Q}$ output of the flip-flop FF31 is transmitted for showing that a flash photography with a proper exposure was not effected. When a flash light stop signal is applied, the flip-flop FF31 is being set for a predetermined time from the opening of the X contact Sx and outputs its $\overline{Q}$ output of a "Low" signal which is the FDC signal indicating that a flash photography has been effected with a proper exposure. The terminals f3 through f7 are not connected with any timinal and "Low" level signals are output from the terminals f3 through f7. The terminal b3 is utilized for the determination whether the flash device is adapted for the system of the present embodiments.

In the case, a pulse of 100 μsec width is input through the signal line ST3, the potential at the terminal CF of the operation mode detecting circuit MODE becomes a "High" level and the output of an inventor IN23 becomes a "Low" level so that the outputs of AND gates AN76 and AN77 become "Low" levels to make transistors Tr34 and Tr35 non-conductive. Thus, a condition has been attained wherein the data fed along the signal line ST2 is read in through the transistor Tr33 and an inverter IN21. Further, as the inverter IN23 drops to a "Low" level, an interruption signal is applied to the interruption terminal it5 of the microcomputer MCF, which performs the operation shown in FIG. 17.

In the following, the operation of the microcomputer MCF will be described with reference to the FIG. 17. When power supply along the power line VF is commenced, the microcomputer MCF starts its operation from the step ①. At the step ①, the microcomputer MCF captures the data of the automatic flash light control or the set flash light amount which data is supplied from the data output circuit AMD and applied to the port P5. The data is set in the register AMR. Following table 17 shows the relationship between the data set in the register AMR and the emitted flash light amount and the outputs of the decoder DE5.

TABLE 17

| AMR | m5 | m4 | m3 | m2 | m1 | m0 | Flash light Amount |
|---|---|---|---|---|---|---|---|
| | | | *... both H and L will do. | | | | |
| 001 | H | H | H | H | H | L | −3.0 |
| 010 | H | H | H | H | L | H | −2.5 |
| 011 | H | H | H | L | H | H | −2.0 |
| 100 | H | H | L | H | H | H | −1.5 |
| 101 | H | L | H | H | H | H | −1.0 |
| 110 | L | H | H | H | H | H | −0.5 |
| 111 | H | H | H | H | H | H | Full light emission |
| 000 | * | * | * | * | * | * | Automatic light control |

As seen in the table 17, in order to reduce the amount of light emission by 3 Ev (3 steps in terms of APEX exposure amount) from the amount of full light emission, a transistor Tr60 is conductive and a transistor Tr66 becomes non-conductive simultaneously with the light emission. When the voltage of the capacitor C10 charged through the resistor R10 excesses the reference voltage determined by the constant current CI11 and the resistor R17, the output of the comparator AC9 inverts to interrupt the light emission. Thus, a time required for the 3 Ev less light emission is counted and the light emission is interrupted upon the lapse of the time. Accordingly, the resistor R10, R11, R12, R13, R14 or R15 to be coupled with the capacitor C10 changes in accordance with the output of the decoder DE5 such that the time of the light emission is controlled to obtain a desired amount of light emission. In the case of the full light emission, all the outputs of the decoder DE5 are "High" levels and transistors Tr60 through Tr65 are all non-conductive so that the comparator AC9 will not output the light emission stop signal. Following table 18 shows data provided by the omitted light amount data output circuit AMD.

TABLE 18

| AMD | Light Emission Mode | Emitted Light Amount |
|-----|---------------------|----------------------|
| 000 | Automatic Light Control | |
| 001 | | −3.0 Ev |
| 010 | | −2.5 Ev |
| 011 | Manually Set Light Amount | −2.0 Ev |
| 100 | | −1.5 Ev |
| 101 | | −1.0 Ev |
| 110 | | −0.5 Ev |
| 111 | | Full |

Returning back to the flowchart of FIG. 17, whether the automatic flash light control mode has been set or not is determined at step ② on the basis of the data read from the port P5. If the automatic flash light control mode has been set, "111" is set in the register AMR to make the circuit the full light emission condition, and the process proceeds to step ④. When the automatic flash light control mode has not been set, the content of the register AMR is left unchanged and the process proceeds to the step ④. At step ④, the emitted light amount data in the register AMR is output at the port P4 and the potential at the terminal P20 is made a "Low" level at step ⑤ so that the automatic light control is not effected. At step ⑥, the potential at the terminal P21 is made a "High" level such that light emission may not be inhibited. At step ⑦, the emitted light amount data AMR and the blank indication data are set in the display data register DPR0, and then blank data are respectively set in the display data registers DPR1 through DPR4. Signals based on the data in the registers DPR0 through DPR4 are supplied to the display section FDP. Accordingly, at the time of closure of the power switch MSFL, only the characters MANU and the to-be-emitted light data are displayed. The microcomputer MCF becomes ready to receive an interruption signal at the interruption terminals it5 and it6 and resets flags CEF and CCF of which function will be described later. Then the microcomputer terminates its operation.

The microcomputer starts its operation from the step ⑮ when the potential at the terminal CF of the operation mode detecting circuit MODE becomes a "High" level and an interruption signal is applied to the interruption terminal it5. At step ⑮, the CFO input to the data input terminal SIN is read in the register IOR in synchronization with the drops of the clock pulses input to the terminal CKI. The data which is the diaphragm aperture value data for flash photography as mentioned before is then set in the register AFR. At step ⑰, next data CF1, which is the data of the focal length value fv of the exchangeable lens, is read and set in the register FFR. Of the data CF2 read in next, the lower three bits represent a camera exposure control mode and upper five bits represents a film speed Sv. The exposure control mode data is set in the register MFR and the film speed data is set in the register SFR. The data CF3 read in next is the data supplied from the exposure meter IV or the remote controller A(V) and is set in the register FMR. Thus, the data reading is completed. The details of those data have been shown in the tables 7 and 8.

At step ㉓, it is determined whether the bit b2 set in the register FMR is "0" or "1". When the bit b2 is "1", this means that data for daylight photography have been sent from the exposure meter or the remote controller, and the process jumps to step # ㉚ for the photography without flash light illumination. At step ㉚, "1" is set at the bit b0 of the display data register DPR0. At bits b1 through b3 is set the content of the register MFR where the data of the camera exposure control mode has been set. A blank display data is set at bits b4 through b7. The film speed, i.e., ISO data fed from the camera is set in the display data register DPR1 while the data of the diaphragm aperture value data for flash photography fed from the camera is set in the register DPR2. In the registers DPR3 and DPR4 are set blank displaying data. Then, the flag CEF is made "0" and the potential at the terminal P21 is made a "Low" level to inhibit flash firing and then the process jumps to step ㉛. The functions of the display data registers are shown in the following table 19.

TABLE 19

| Register | Bit | Data | What is displayed |
|----------|-----|------|-------------------|
| DPR0 | b0 | 0 | Blank |
| | b3 ~ | 1 | AMBI (Flash is not fired) |
| | b1 | 000 | P (P mode) |
| | | 001 | A (P mode) |
| | | 010 | S (S mode) |
| | | 011 | M (M mode) |
| | | 100 | EXT (External mode) |
| | b7 ~ | 0000 | AUTO (Automatic Light Control) |
| | b4 | 0001 | MANU −3.0 (−3 Ev) |
| | | 0010 | MANU −2.5 (−2.5 Ev) |
| | | 0011 | MANU −2.0 (−2 Ev) |
| | | 0100 | MANU −1.5 (−1.5 Ev) |
| | | 0101 | MANU −1.0 (−1 Ev) |
| | | 0110 | MANU −0.5 (−0.5 Ev) |
| | | 0111 | MANU FULL (Full Light Emission) |
| | | 1*** | Blank |
| DPR1 | | | ISO Data |
| DPR2 | | | Controlled Diaphragm Aperture Value Data |
| DPR3 | | | Shortest Flash Photography Available Distance |
| DPR4 | | | Longest Flash Photography Available Distance (Suitable Camera-to-object Distance in the case of the Manual Setting) |

When it is detected at step ㉓ that no flash firing inhibit signal has been input to the bit b2 of the register FMR, "0" is set at the bit b0 of the register DPR0 at step ㉔ to inhibit the display of AMBI and the potential at the terminal P21 is made a "High" level to enable the flash firing. Then, the process proceeds to step # ㉖ wherein it is determined whether the bit b3 of the register FMR is "0" or "1". If the bit b3 is "1", this means that control data for flash photography have been sent from the exposure meter IV or the remote controller A(V), with the test flash being effected and the automatic flash light control not being effected. Accordingly, at step ㊵, the potential at the terminal P20 is made a "Low" level to disable the automatic flash light control. At step ㊷, "1" is set in the flag CEF. The flag CEF is "1" with the to-be-emitted flash light amount data being set on the basis of the data fed from the exposure meter IV or the remote controller A(V), and "0" with no flash light amount data being set.

At step ㊸, the to-be-emitted flash light amount fed from the port P5 is set in the register AMR. When the read data is "000" for the automatic flash light control mode, the data for full light emission is set. When the read data is not for the automatic flash light control mode, the data in the register AMR is left unchanged and the process proceeds to step ㊻. At step ㊻, it is determined whether the bit b4 is "0" or "1". When the bit b4 is "0" which means that the amount of the flash light to be emitted is to be reduced and the amount given by the set data AMR is reduced by the amount given by the data b7, b6 and b5. When the result of the reduction is less than the amount given by the data "001", the data "001" is set in the register AMR and the process jumps to step ㊿. When the bit b4 is "1" which means that the amount of the flash light is to be increased, the amount given by the data b7, b6 and b5 is added to the amount of the data set in the register AMR. When the result of the addition exceeds the amount given by the data "111", the data "111" is set in the register AMR and the process jump to step ㊿. At the step ㊿, the data Iv of the to-be-omitted flash light is selected in accordance with the data fed from the register AMR and the following calculation is made from the data Iv of the to-be-emitted flash light, the diaphragm aperture data Av and the ISO data Sv fed from the camera I:

$$Iv + Sv - Av = Dv$$

Then, the data of the calculated value Dv is set in the register DPR4 to enable display of the camera-to-object distance within which a proper exposure will be obtained. A blank data is set in the display data register DPR3 and the process jumps to step ㊻⑧.

If the automatic flash light control inhibiting signal has not been input at step ㊱, the process jumps to step ㊽, wherein the data fed from the port P5 is captured and set in the register AMR. In this case, as the exposure is controlled irrespectively of the data supplied from the exposure meter IV or the remote controller A(V), "0" is set for the flag CEF. At step ㊼, it is determined whether the automatic flash light control mode has been set. When the automatic flash light control mode has not been set, the potential at the terminal P20 is made a "Low" level and the content in the register AMR is output at the port P4. Then, the process proceeds to step ㊿ wherein the proper exposure available camera-to-object distance is displayed. When the automatic flash light control mode is detected at step ㊼, the potential at the terminal P20 is made a "High" level and the process jumps to step ㊻⑥ wherein the maximum camera-to-object distance Dvm for which a proper exposure is guaranteed is calculated in accordance with the following formula on the basis of the maximum amount Ivm of flash light to be emitted.

$$Ivm + Sv - Av = Dvm$$

The data of the calculated Dvm is set in the register DPR4. At step ㊻⑦, following calculation is made $$Ivo + Sv - Av = Dvo$$

on the basis of the minimum amount Ivo of flash light to be emitted, in order to calculate the minimum camera-to-object distance value Dvo for which a proper exposure is guaranteed. The data of the calculated value Dvo is set in the register DPR3.

At step ㊻⑧, "0" is set at the bit b7 of the register DPR0 and the contents of the registers AMR and MFR are respectively set at the bits b6 through b4 and b3 through b1. The content of the register SFR is set in the register DPR1 while the content of the register AFR is set in the register DPR2. Then, a timer within the microcomputer is reset to enable the timer interruption and also enable reception of interruption signals through the terminals it5 and it6. Then, the flag CCF is made "1" to indicate that display is being made in accordance with the data fed from the camera and the display section FDP is brought into a condition for the display in accordance with the contents in the registers DPR0 through DPR4. Then the microcomputer MCF terminates its operation.

With reference to FIG. 16, a switch SS connected with the terminal it6 of the microcomputer MCF is closed to change the data provided by the data output circuit AMD. When the switch SS is closed, an interruption is effected through the terminal it6 and the microcomputer MCF performs the operation starting at the step ⑧⓪ wherein it is determined whether the flag CCF is "0" or not. If the flag CCF is not "0", this means that the display is not based on the data fed from the camera and the process jumps back to step 1. When the flag CCF is "0", this means that the display is made on the basis of the data fed from the camera and the process proceeds to step ⑧①. At step ⑧①, it is determined whether the bit b2 of the register FMR is "0" or "1". This is to discriminate whether the non-flash mode is set or not. If the bit b2 is "1" indicating the no-flash mode, the setting of the to-be-emitted light amount data is neglected and the operation terminates. When the flash light emission mode is detected at step ⑧①, it is determined whether the flag CEF is "0" or "1" to determine whether the display is made in accordance with the data fed from the exposure meter IV or the remote controller A(V). If the flags CEF is 1, the setting of the data is neglected and the operation terminates. When the flag CEF is "0", the timer is reset at the step ⑧③ and the process jumps to step ㊽.

When a given time, e.g., 3 minutes has lapsed after the above described operation terminates, the timer interruption is effected so that the microcomputer MCF performs the operation starting at the step 1 and comes to the condition at the time of power on. Following table 20 shows the registers and flags recited in the description of the operation of the microcomputer MCF.

TABLE 20

| Register/Flag | Function |
|---|---|
| AMR | Register for the to-be-emitted light amount data and flash light emission mode |
| DPR0 | Register for the display of the flash light emission mode, the to-be-emitted light amount data and the exposure control mode |
| DPR1 | Register for the display of ISO data |
| DPR2 | Register for the display of F (diaphragm aperture value) |
| DPR3 | Register for the display of the minimum flash photography available camera-to-object distance |
| DPR4 | Register for the display of the maximum flash photography available or proper exposure available camera-to-object distance |
| AFR | Register for the setting of the diaphragm aperture value data |
| FFR | Register for the setting of the focal length |
| SFR | Register for the setting of the ISO data |
| MFR | Register for the setting of the exposure control mode |

TABLE 20-continued

| Register/Flag | Function |
| --- | --- |
| FMR | Register for the setting of the data of the flash light emission mode/no-flash mode, the automatic flash light control/manual light control, and the amount of flash light to be changed |
| IOR | Register for the serial signal input |
| CEF | Flag for the automatic flash light control inhibing signal |
| CCF | Flag indicating that display is being made on the basis of the data fed from the camera |

Next, explanation will be made about the flash firing operation with reference to FIG. 16. When the potential on the signal line ST1 is made a "Low" level by the camera I or the receiver II, a transistor Tr31 becomes conductive. At this time, if the potential at the terminal ES of the operation mode detecting circuit MODE is a "High" level with a pulse of 150 μ-sec width being input through the signal line ST3 and the Q output of a D flip-flop DF17 is a "High" level with the D flip-flop latching a charge completion signal, the outputs of an AND gate AN84 and an OR gate OR31 are "High" levels. If the potential at the terminal P21 of the microcomputer MCF is a "High" level not to inhibit flash firing, a flip-flop F32 is set and flash firing initiation signal is supplied from the output terminal FSTA to the trigger circuit TRC shown in FIG. 5, causing the Xenon tube Xe to start light emission.

The setting of the flip-flop FF32 releases the reset of the counter CO22 which then starts counting of a time which is longer than the time required for the full light emission of the flash device. When the time to be counted has lapsed, an output of the counter CO22 resets the flip-flop 32 and the counter CO22 is also reset. At this time, if the potential at the terminal P20 of the microcomputer MCF is a "High" level showing the automatic flash light control mode, an AND gate AN82 is in an enabled condition while the flip-flop FF32 is in set condition. If a "High" pulse is input along the signal line ST3 during that time, the pulse is transmitted through the AND gate AN82, an OR gate OR32 and the output terminal FSTP to the flash interrupting circuit STC shown in FIG. 5 to stop the light emission of the Xenon tube XE. In the case of non-automatic flash light control mode, a transistor Tr66 becomes non-conductive in response to the start of the flash firing. After a lapse of a time depending on the to-be-emitted light amount manually set on the flsh device III, the output of the comparator AC9 turns to a "High" level, so that a flash stop signal is output at the output terminal FSTP through an AND gate AN87 and the OR gate OR32 to stop the light emission of the Xenon tube XE. When the pulse is putput from the AND gate AN82 at the time of the automatic flsh light control mode, the flip-flop FF31 is set.

When an exposure control operation is completed and the potential on the signal line ST1 becomes a "High" level, the output of the AND gate AN83 will be a "High" level to release the reset of the counter CO21, which begins to count the clock pulses φf fed from the microcomputer MCF. With this, the transistor Tr5 shown in FIG. 5 turns on and off repeatedly at a given frequency, causing the light emitting diode LD0 to blink and indicate that a flsh photography has been done with a proper exposure. The $\overline{Q}$ output of the flip-flop FF31 is transmitted through the AND gate AN80 to the camera as the "Low" level FDC signal. When the counter CO21 has counted the given time, the flip-flop FF31 is reset and the counter CO21 is also reset to deenergize the light emitting diode LD0 with no FDC signal being supplied to the camera I.

When the potential on the signal line ST1 becomes a "Low" level with the potential at the terminal ES of the operation mode detecting circuit MODE being a "Low" level and the potential at the terminal CH2 of the charged condition detecting circuit CHD being a "High" level showing the charge completed condition, the output of the AND gate AN85 and OR gate OR31 becomes "High" levels. Accordingly, the Xenon tube XE is fired thereafter in the manner as described above.

Figure 18:
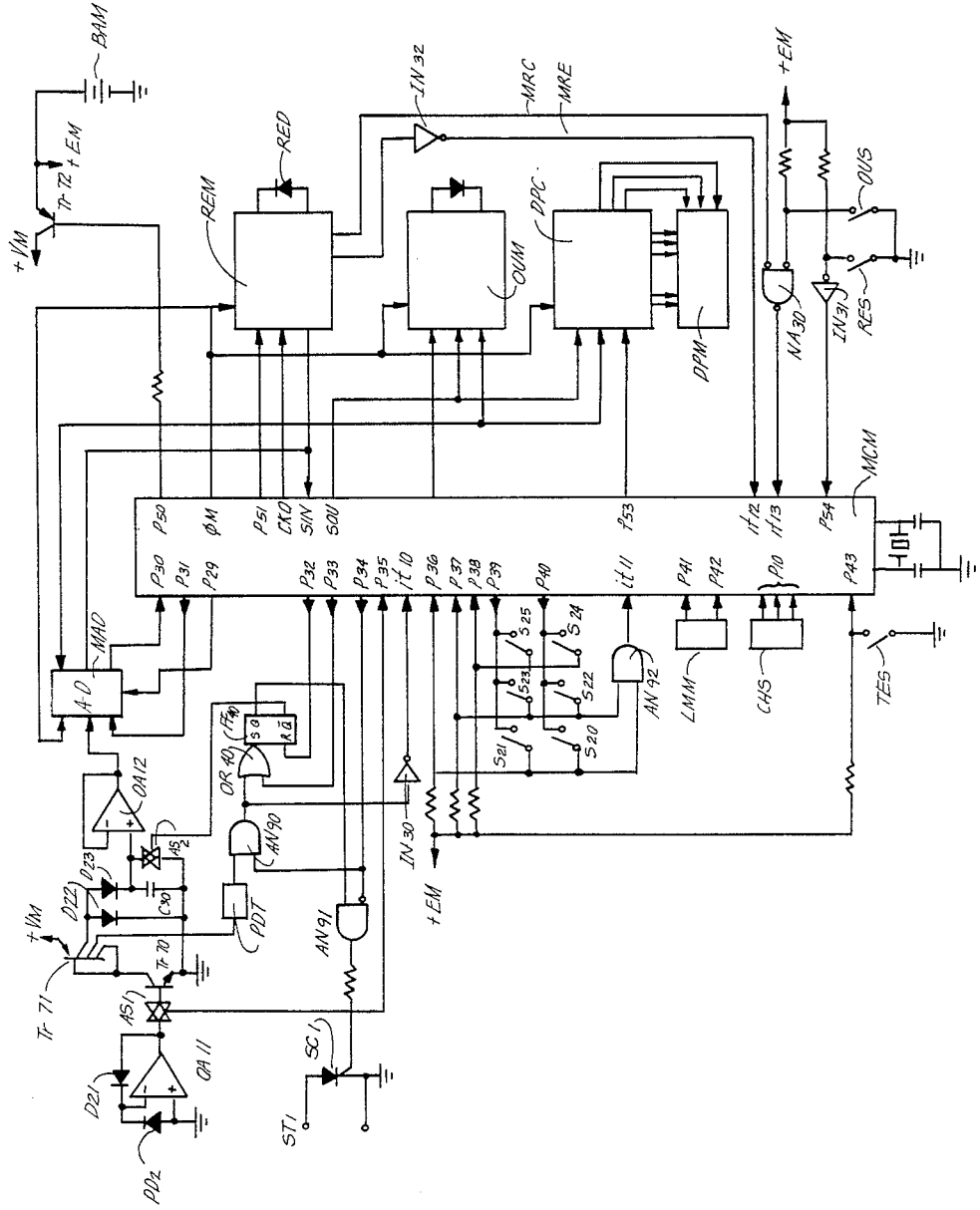
FIG. 18 is a circuit diagram showing the circuit construction of the exposure meter II shown in FIG. 1.
Figure 19:
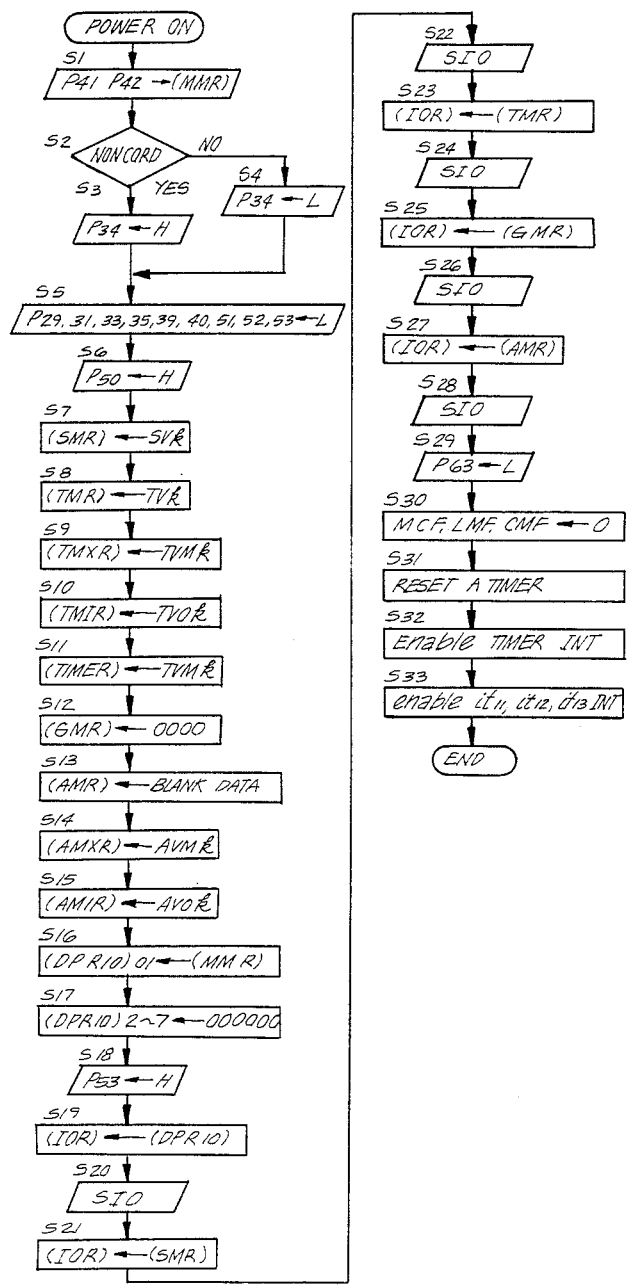
FIGS. 19(a), 19(b), 19(c), 20(a), 20(b), 21(a), and 21(b) are flowcharts for showing the operation of the microcomputer MCM in the exposure meter.
Figure 19:
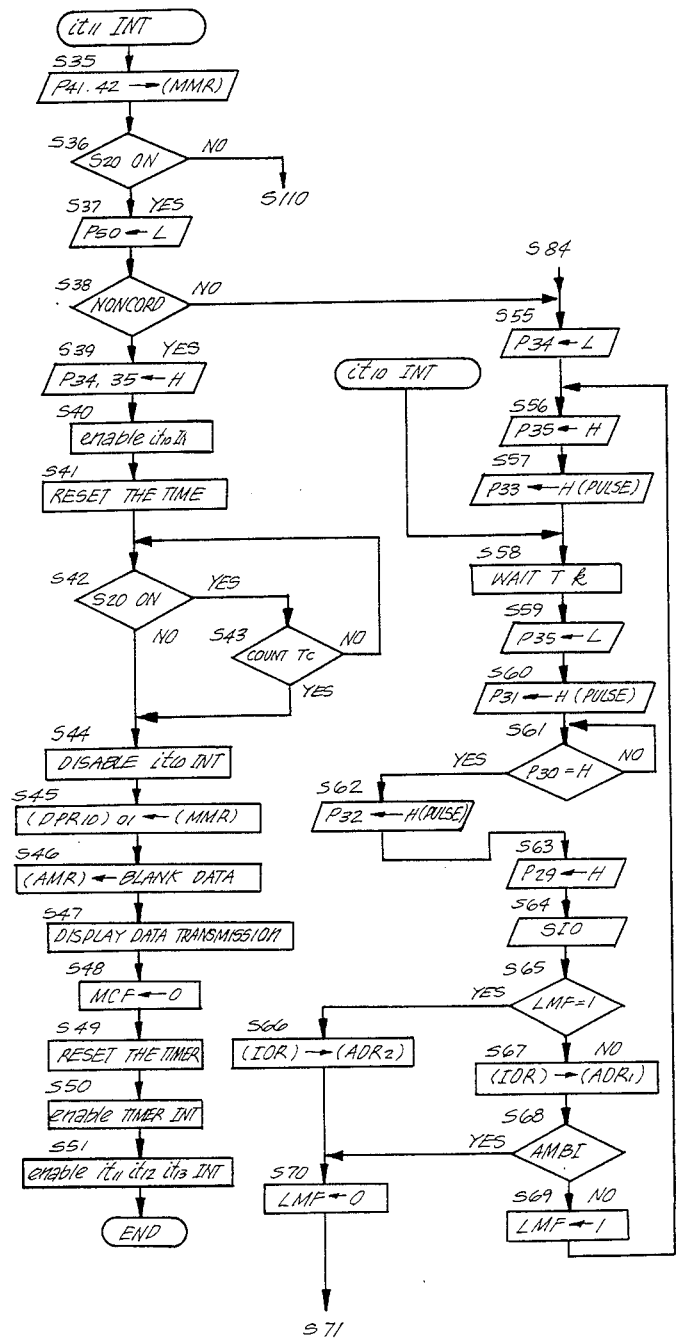
Figure 19:
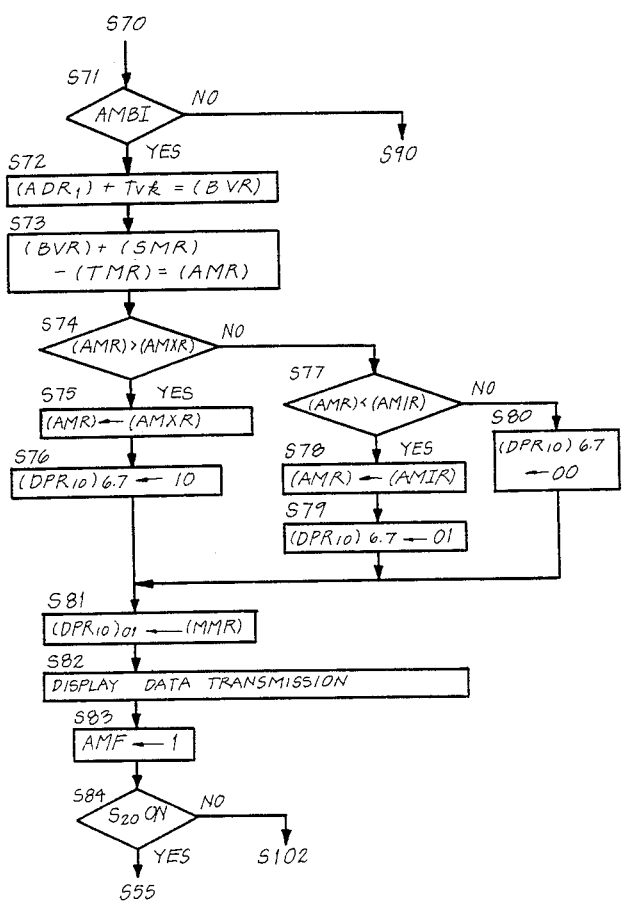
Figure 20:
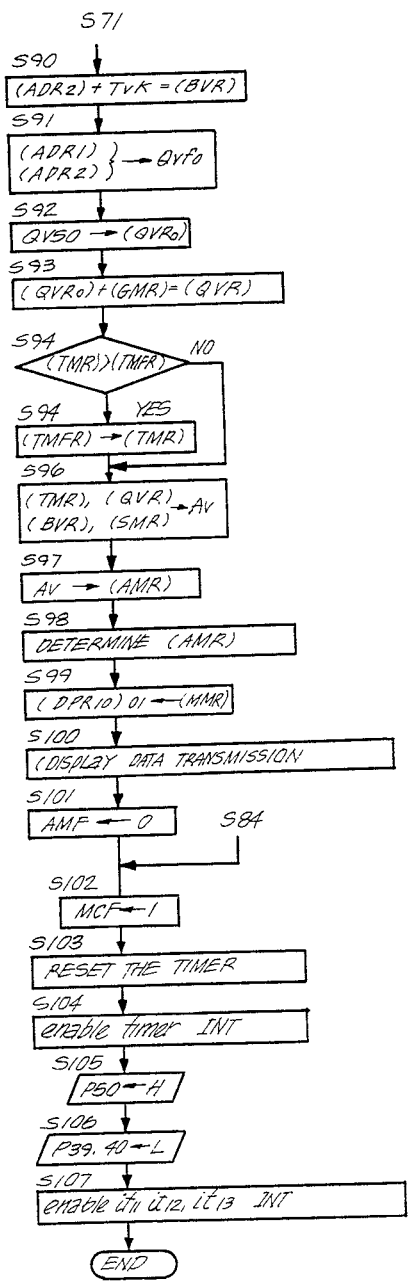
Figure 20:
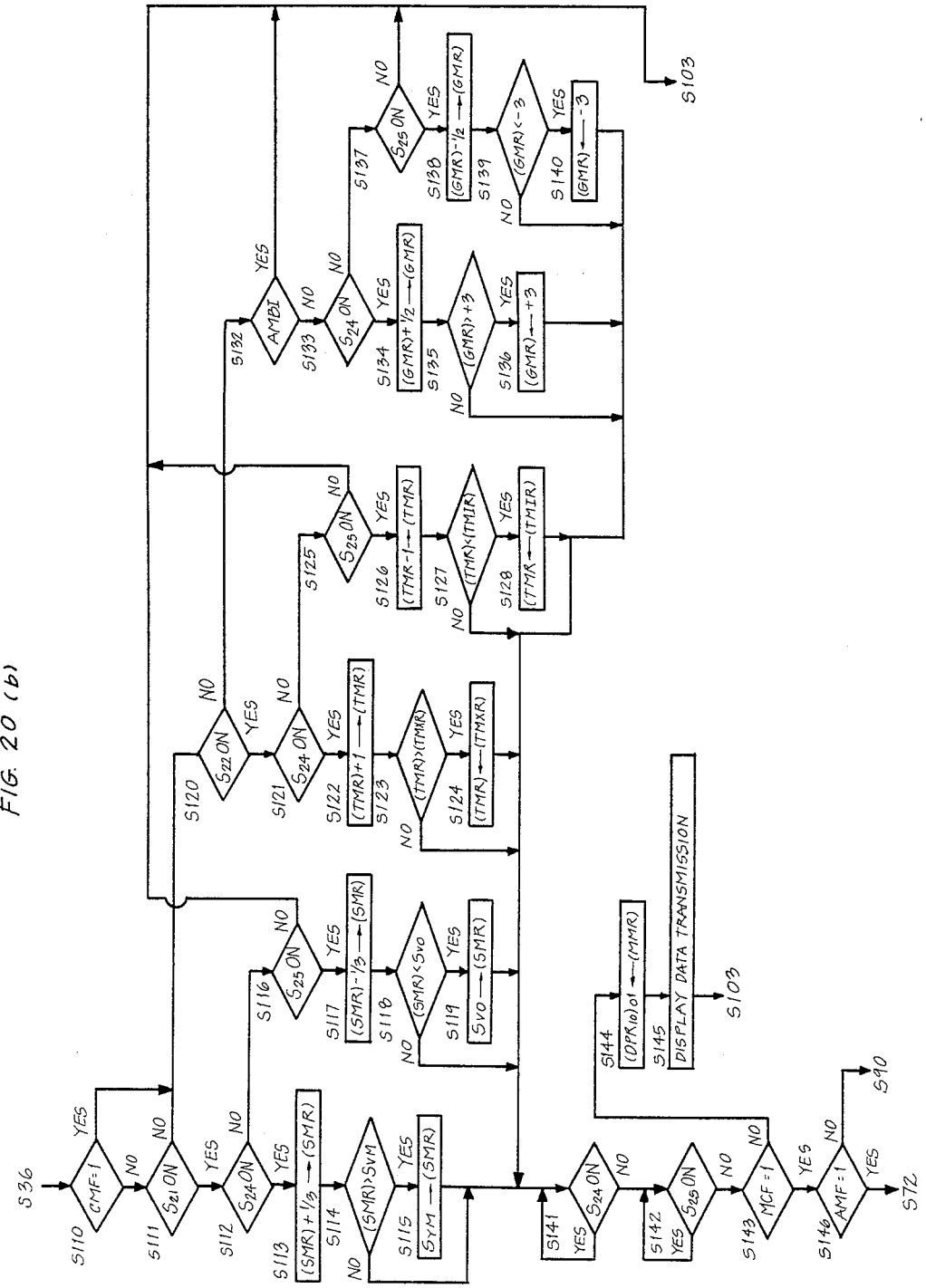
Figure 21:
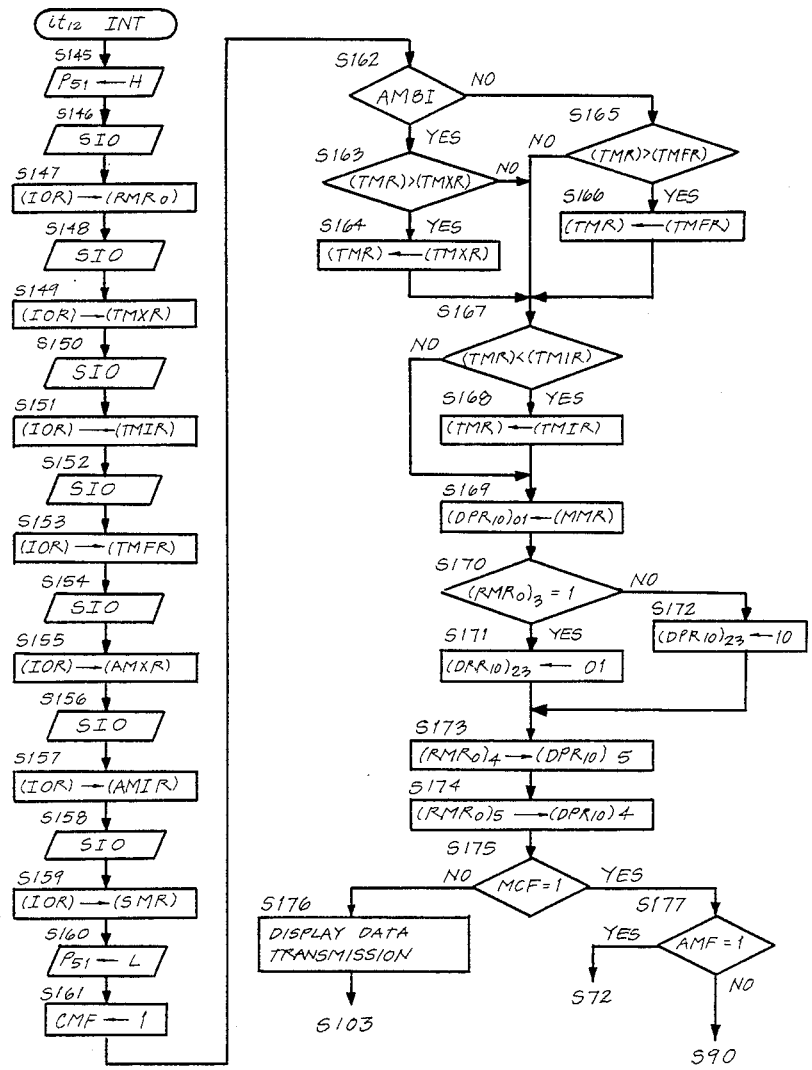
Figure 21:
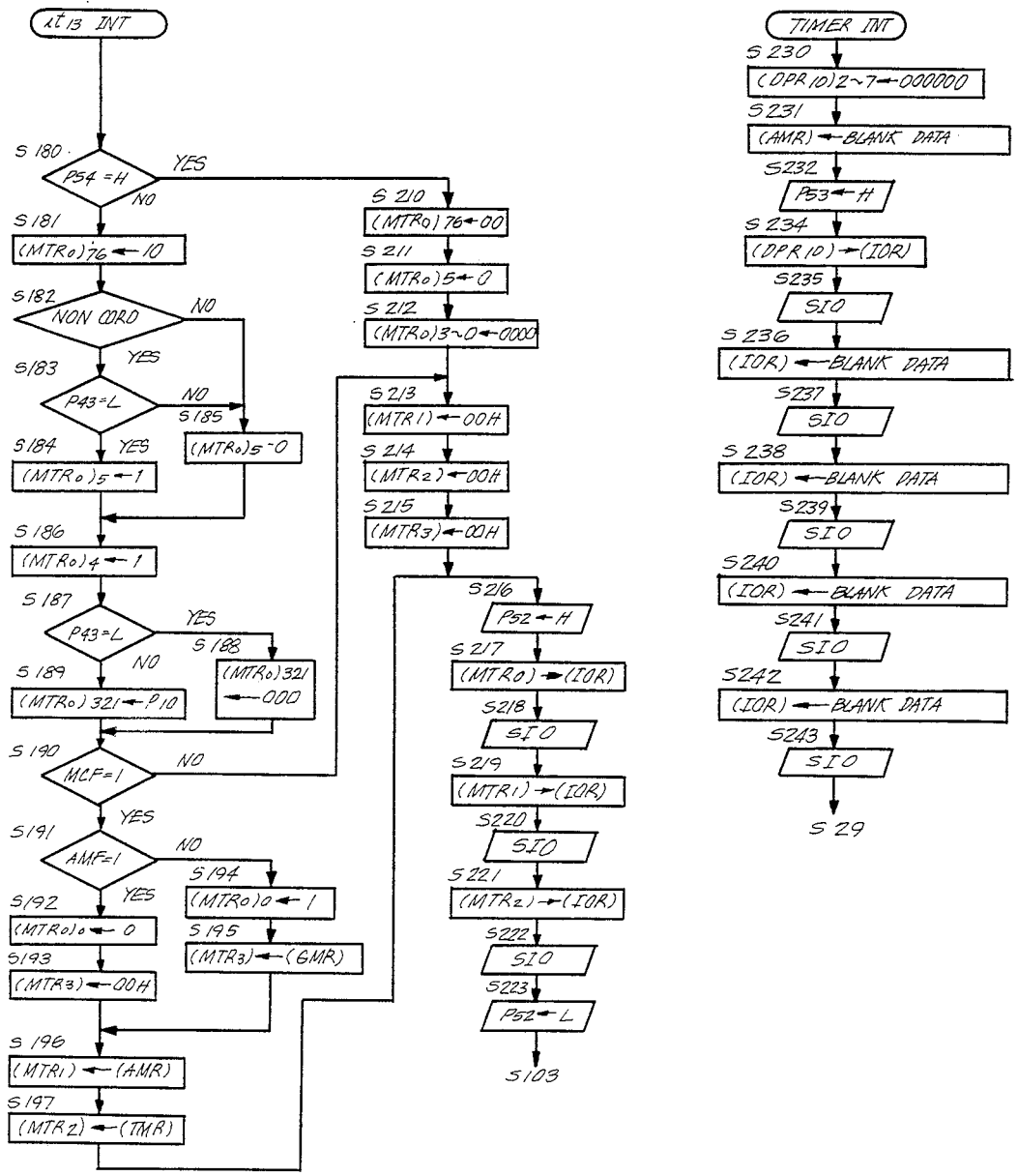

FIG. 18 shows an exemplary definite circuit of the exposure meter IV and FIGs. 19, 20 and 21 are flow-charts showing the operation of a microcomputer in the circuit. Explanation will now be made about the operation of the circuit shown in FIG. 18 with reference to those flowcharts. A power source battery BAM supplies power through a power line +EM to the microcomputer MCM, a signal receiving circuit REM, a signal transmitting circuit OUM, a display circuit DPC, a measuring mode data output circuit LMM, a channel data output circuit CHS, AND gates AN90, AN91 and AN92, a NAND gate N30, inverters IN30 and IN31, an OR gate OR40 and a flip-flop FF40. In response to the beginning of the power supply, the microcomputer starts its operation beginning at step S1. At step S1, the microcomputer captures a measuring mode data fed from the measuring mode data output circuit LMM through terminals P41 and P42, and sets the data in a register MMR. The measuring mode data output circuits LMM outputs a data commensurate with the position of the slide switch 19 shown in FIG. 1. At step S2, it is determined whether NON CORD mode has been set or not. If the NON CORD mode has been set, the potential at the terminal P34 is made a "High" level to inhibit the conduction of a thyrister SC1 to be used for triggiring the flash device. At the same time the "High" level enables an AND gate AN90 to output a pulse fed from a detecting circuit PDT which detects the rising of the flsh light. If the NON CORD mode has not bee set, the potential at the terminal P34 is made a "Low " level to allow the conduction of the thyrister SC1 and inhibit the AND gate AN90 from outputting of the pulse fed from the detecting circuit PDT.

At steps S5 and S6, the potential at terminals P29, P31, P33, P35, P39, P40, P51, P52 and P53 are made "Low" levels and the potential at a terminal P50 is made a "High level. Then, an ISO data Svk of a given value is prestored in a register SMR, an exposure time data Tvk of a given value is prestored in a register TMR, the data Tvmk of the shortest exposure time settable on the exposure meter IV is prestored in a register TMXR, the longest exposure time data Tvok is prestored in a register TMIR, and the shortest exposure time data Tvmk is also prestored in a register TMFR where a data of the synchronizable limit (shortest) exposure time is to be set. Further, a data of "0000" which indicates that the amount to be changed is "0", is prestored in a register GMR where a data of the amount by which the to-be-emitted flush light amount is to be changed, is to be set. A blank displaying data is prestored in a register AMR where the data of the calculated diaphragm aperture value is to be set. At step S14, a data Avmk of the limit diaphragm aperture value that can be displayed, is prestored in a register AMXR where the data of the value for the minimum diaphragm aperture size fed from the camera is to be set. A data Avok of the other limit diaphragm aperture that can be displayed, is prestored in a register where the full open aperture value data is to be set.

The content of a register MMR where the measuring mode data is set, is set at bits b1 and b0 of the display data register DPR10, and "00000" is set at the remaining bits b7 through b2. The following table 21 shows the relationship between the data set in the register DPR10 and what are displayed by the display circuit DPC.

TABLE 21

| Bit | Data | What is displayed |
|---|---|---|
| b7, b6 | 1 0 | UNDER (indication of under exposure) |
| | 0 1 | OVER (indication of over exposure) |
| | 0 0 | Blank (Off or Proper Diaphragm Aperture Value Indication) |
| b5 | 0 | Blank (Off or Shutter is not released) |
| | 1 | REL (Completion of Exposure Control) |
| b4 | 0 | Blank (Off or Charge uncompleted) |
| | 1 | FCH (Charge completed) |
| b3, b2 | 0 0 | Blank (Off or No data exchange) |
| | 0 1 | OK (Within the controllable range) |
| | 1 0 | OUT (Out of the controllable range) |
| b1, b0 | 0 0 | AMBI (Ambient light measuring mode) |
| | 0 1 | CORD (With cord flash light measuring mode) |
| | 1 0 | NON CORD (Without cord, light trigging flash light measuring mode) |

At step S18, the potential at a terminal P53 is made a "High" level such that the display circuit DPC becomes ready to receive data. Then, the content of the display data register DPR10 is set in the input/output register IOR which performs serial data input/output operation. From the terminal CKO are output clock pulses in response to which data are serially output from the terminal SOU and read in the display circuit DPC. Then, serially transmitted are the data Svk in the register SMR, th data Tvk in the register TMR, the data "OH" in the register GMR and the blank data in the register AMR. The potential at the terminal P53 is made a "Low" level and the process proceeds to step S30. Then, flags MCF, LMF and CMF are reset and a timer is reset to allow the interruption by the timer and allow the interruption to the terminals it11, it12 and it13. Then the operation terminates.

With reference to FIG. 18, a switch S20 is associated with the light measuring button 27, a switch S21 is associated with the ISO setting key 23, a switch S22 is associated with the exposure time setting key 22 and a switch S23 is associated with a to-be-emitted light amount changing key 24. When any one of those switches is closed with the potential at terminals P39 and P40 being "Low" levels, the output of an AND gate AN92 drops to a "Low" level and an interruption signal is input to the terminal it11. A switch S24 is associated with the UP key 25 while a switch S25 is associated with the DOWN key 26. When an interruption signal is input, operation starts at step S35 wherein the data of the light measuring mode is set in a register MMR and it is determined whether the light measuring switch S20 has been turned on or not. This determination is made by detecting the "Low" level at the terminal P36 with the potentials at terminals P40 and P39 being made a "Low" and a "High" levels respectively. When the switch S20 is ON, the process proceeds to step S37, while the process jumps to step S110 with the switch S20 being OFF. At step S37, the potential at terminal P50 is mde a "low" level to make a transistor Tr72 conductive to effect power supply through the power line +VM to the light measuring circuit, the detecting circuit PDT and the A-D converter circuit MAD. At step S38, it is determined whether the NON CORD mode has been set. If the NON CORD mode has been set, the process proceeds to step S39 while the process jumps to step S55 when the NON CORD mode has not been set. At step S39, the potential at the terminal P35 is made a "High" level to make the analog switch AS1 conductive. The potential at a terminal P34 is also made a "High" level to disable an AND gate AN91 and enable an AND gate AN90 such that the pulse fed from the detecting circuit PDT may be applied through the AND gate AN90 and an inverter IN30 to the interruption terminal it10. Then, the timer is reset and the process proceeds to step S42, wherein it is determined whether the light measuring switch S20 remains ON or not. When the switch S20 remains on, it is determined whether the timer has counted the given time Tc. If the counting of the given time, e.g., 10 sec has not been completed, the process goes back to step S42. The operation of steps S42 and S43 is repeated until it is detected that the light measuring switch S20 is OFF or that the given time Tc has been lapsed, when the process proceeds to step S44. At step S44, the reception of the interruption signal at the terminal it10 is disabled and the process proceeds to step S45. At step S45, the mode data in the register MMR is set at the bits b0 and b1 of the register DPR10 and a blank display data is set in the register AMR. Then, the display data is transmitted to the display circuit DPC in the same manner as in steps S18 through S29, with the flag MCF and the timer being reset to enable the timer interruption and the application of interruption signals to the terminals it11, it12 and it13. Thereafter, the operation terminates. The flag MCF is "1" when the display of the diaphragm aperture value display is possible, and "0" when impossible.

With reference to FIG. 18, the photocell PD2 is disposed within the hemispherical receptor 15 (see FIG. 1) to measure incident light, and is connected across two input terminals of the operational amplifier OA11. The output of the photocell PD2 is converted into a voltage logalithmically compressed by a diode D21. If the analog switch AS1 is conductive at this time, the output of the amplifier OA11 is applied to the base of a transistor Tr70 which output at its collector, a current commensurate with the output current of the photocell PD2. The collector current of the transistor tr70 is converted into two collector currents by a current mirror multi-collector transistor Tr71. One of the currents is applied to a logarithmic compression and integrating circuit composed of diodes D22 and D23 and a capacitor C30. The other current is applied to the detecting circuit PDT. When the detection circuit PDT detects the rising of a flsh light, the detection signal is applied through the AND gate AN90 and the OR gate OR40 to a flip-flop FF40 to set the latter and block the analog switch AS2 so that integration by the capacitor C30 starts. The "Low" level of the output of the inverter IN30 allows the application of interruption signal to the terminal it10 of the microcomputer MCM and operation starts at step S58. The operation will be described later. If it is detected at step S38 that NON CORD has not been set, the potential at the terminal P34 is made a "Low" level at step S55, such that the thyrister SC1 is made ready to become conductive and that the pulse fed from the detecting circuit PDT is prevented from being output from the AND gate AN90. Then, the potential at terminal P35 is made a "High" level to make the analog switch AS1 conductive. A "High" level pulse is output at the terminal P33 to set the flip-flop FF40 through the OR gate OR40 and make the analog switch AS2 non-conductive such that the capacitor C30 begins integration. At the same time, the output of the AND gate AN91 is made a "High" level to make the thyrister SC1 conductive and the potential on the signal line ST1 a "Low" level, thereby firing the flash device connected to the flash terminal 30 of the exposure meter IV through a cord.

At step S58, a given integration time Tk, e.g., 1/64 sec corresponding to 6 by Tv of APEX system, is counted. After a lapse of the integration time Tk, the potential at a terminal P35 is made a "low" level to make the analog switch AS1 non-conducting so that the charge integrated in the capacitor C30 is sample-held. Then, at step S60, a "High" level pulse is output at a terminal P31 to initiate the operation of the A-D converter MAD and waits until the potential at the terminal P30 a "High" level which shows completion of the A-D conversion. When the A-D conversion has been completed with the potential at a terminal P30 a "High" level, a "High" level pulse is output at a terminal P32 to reset the flip-flop FF40 and make the analog switch AS2 conductive, so that the charge in the capacitor C30 is discharged. Then, the potential at the terminal P29 is made a "High" level to make a condition wherein data are serially output from the A-D converter MAD. Then, serial data input/output operation is effected. With this, eight clock pulses are output from the clock terminal CkO and A-D converted data are serially output at the serial data input terminal SIN in synchronization with the clock pulses and the data are read in the register IOR.

At step S65, it is determined whether the flag LMF is "1" or "0". When the flag LMF is "0", the content of the register IOR is set in the register ADR1 and then it is determined whether the AMBI mode has been set or not. When the AMBI has not been set, the flag LMF is made "1" and the process returns to step S56 from which the above mentioned operation is performed to make the next light measuring operation. In this case, the flash device which has just completed firing, will not be fired even if the flash device is connected to the exposure meter, and only the ambient light component is measured. When the A-D convented data are captured, the captured data is set in the register ADR2 since the flag LMF is "1". Then, the flag LMF is changed to "0" and the process proceeds to step S71. When the AMBI mode is detected, the light measurement is made only one time and the process proceeds through step S70 to step S71. As seen in the above description, in the case of the NON CORD and CORD modes, light measurement is made twice at the time of the flash firing and at the time when the flash device is not fired. In this case, the flag LMF is used for the discrimination between the first and second measurements.

At step S71, it is determined whether the AMBI has been set or not. If AMBI mode has been set, the process proceeds to step S72. If AMBI mode has not been set, the process jumps to step S90 shown in FIG. 20. At step S72, in the register BVR is set a data given by addition of a data corresponding to the APEX value of the above mentioned integration time Tk, to the content of the register ADR1. As the content of the register ADR1 represents an integration of the object brightness for a given time, i.e., Bv−Tvk, the above addition is to make a calculation of (Bv−Tvk)+Tvk=Bv. At step S73, the calculation of Bv+Sv−Tv=Av is made on the basis of the ISO data and the set exposure time data and the data of the calculated diaphragm aperture value Av is set in the register AMR. Then, it is determined whether the calculated diaphragm aperture value Av exceeds the minimum diaphragm aperture size value in the register AMXR. When the calculated value exceeds, the content of the register AMXR is set in the register AMR and a condition for displaying the character OVER is set. Then, the process proceeds to step S81. When it is detected at step S74 that the calculated diaphragm aperture value is less than the minimum diaphragm aperture size value, it is then determined whether the value of the data in the register AMR is less than the full aperture value. When it is detected that the value of the data in the register is less than the full aperture value, the content of the register AMIR is set in the register AMR and a condition for displaying the character UNDER is set. Then, the process proceeds to step S81. When it is detected at step S77 that the calculated diaphragm aperture value is not less than the full aperture value, a condition for not displaying the characters OVER and UNDER is set and the process proceeds to step S81. At step S81, a condition for displaying the light measuring mode is set, and the data for display are transferred to the display circuit DPC to effect the display in the same manner as in the steps S18 through S29. "1" is set for the flag AMF to show that the light measurement has been made in the AMBI mode, and the process proceeds to step S84.

At step S84, it is determined whether the light measuring switch S20 has been closed or not. If it has been closed, the process goes back to step S55 to effect next ambient light measurement. If the light measuring switch S20 has been opened, the process jumps to step S102 shown in FIG. 20. At step S102, "1" is set for a flag MCF to show completion of light measurement and the timer is reset allowing timer interruption. Then, the potential at a terminal P50 is made a "High" level to stop the power supply through the transistor Tr72. The potentials at the terminals P39 and P40 are made "Low" levels to enable reception of interruption signals at the terminals it11, it12 and it13, and the microcomputer MCM terminates its operation.

If it is detected at step S71 that the AMBI mode has not been set, the process jumps to step S90 shown in FIG. 20. At step S90, calculation of (Bv−Tvk)+Tvk=Bv is made in the same manner as in step S72 and the data of the calculated value Bv is set in a register BVR. If it is assumed that the APEX value of the measured light amount at the time of flash firing is Qvfo, the value of the data set in the register ADR1 is $\log_2 (2^{Bv-Tvk}+2^{Qvfo})$. Therefore, the value Qvfo is calculated from the data in the register ADR1 and the data of Bv−Tvk set in the register ADR2. The process of the calculation is as follows: If it is asumed that Qvfo−(Bv−Tvk)=α1, the following relationship exists $$\log_2 (2^{Bv-Tvk} + 2^{Qvfo}) = (Bv - Tvk) + \log_2 (1 + 2^{\alpha 1})$$
$$= Qvfo + \log_2 (1 + 2^{-\alpha 1})$$

Accordingly, α1 is calculated by the above formula and the calculated α1 is converted into a value $\log_2$ $(1+2^{-\alpha 1})$ by using a ROM table. Then the following calculation is made $$\log_2 (2^{Bv-Tvk}) - \log_2 (1+2^{-\alpha 1}) = Qvfo$$

and the data of the calculated value Qvfo is set in a register QvRo. To or from the content of the register QVRo is added or subtracted the content of the register GMR where the data of to-be-changed light amount data is set, and the amount Qvf of light to be measured in the actual flash photography is calculated. The data of the calculated value Qvf is set in a register QVR and the process proceeds to step S94.

At step S94, it is determined whether exposure time given by the content of the register TMR where the data of the controlled exposure time is set, is shorter than the flash synchronizable limit exposure time of which data is stored in the register TMFR. If the exposure time given by the content of the register TMR is shorter than the limit exposure time, the content of the register TMFR is set in the register TMR. If not, the content of the register TMR is left therein. Then, the process proceeds to step S96. At step S96, a diaphragm aperture value for providing a proper exposure is calculated on the basis of the data of the exposure time Tv, ISO value Sv, object brightness Bv and the to-be-received light amount Qvf upon flash firing. The data of the calculated value is set in the register AMR. The process of the calculation is as follows. First, following relationship exists:

$$Av = \log_2 (2^{Bv-Tvk} + 2^{Qvf}) + Sv$$

If it is assumed that $$Qvf - (Bv - Tv) = \alpha 2$$

$\alpha 2$ satisfying following relationship is calculated $$Av = Qvf + Sv + \log_2 (1 + 2^{-\alpha 2})$$

and $\log_2 (1+2^{-\alpha 2})$ is obtained from the calculated $\alpha 2$. Then, the Av is obtained by the above mentioned calculation. At step S98, it is determined likely as in steps S74 through S80 whether the obtained value Av is within the controllable range. At step S99, a condition for displaying the light measuring mode is set and the display data is transmitted to the display circuit DPC. As this process is not for the AMBI mode, the flag AMF is made "0" and the microcomputer MCM terminates its operation after it performs the operation of the above described steps S102 through S107.

When it is detected at step S36 of FIG. 19 that the light measuring switch S20 has not been closed, the process jumps to step S110 in FIG. 20. At step S110, it is determined whether the flag CMF is "1" or "0". The flag CMF is "1" with data having been read from the camers I, and "0" with no data having been read. Accordingly, if the flag CMF is "1", the ISO data need not be changed and the process jumps to S120. If the flag CMF is "0", the process jumps to step S111.

At step S111, it is determined whether the ISO switch S21 has been closed or not. If the switch S21 has not been closed, the process proceeds to step S120. If the switch S21 has been closed, it is then determined whether the UP switch S24 has been closed or not. If the UP switch S24 has been closed, a summing up operation is made with a data commensurate with ⅛ Ev and the content of the register SMR where the ISO data is set. Then, it is determined whether the summed-up data is larger than the maximum value Svm. If the data is larger then the maximum value Svm, the data of the maximum value Svm is set in the register SMR. When the data is not larger than the maximum value Svm, the content of the register SMR is left unchanged and the process jumps to step S141. When it is detected at step S112 that the UP switch S24 has not been closed, it is determined at step S116 whether the DOWN switch 25 has been closed. If the DOWN switch S25 has not been closed either, the process jumps to step S102 from which the above described operation is made and the microcomputer MCM stops its operation. When the DOWN switch S25 has been closed, the value of the ISO data is reduced by ⅛ Ev at step S117 and it is determined whether the reduced value is smaller than the minimum value Svo. If the reduced value is smaller, the minimum value Svo is set in the register SMR while the data of the reduced value is left in the register SMR when the reduced value is not smaller than the minimum value. Then, the process jumps to step S141.

When it is detected at step S110 that the flag CMF is "1", or it is detected at step S111 that the ISO switch S21 has not been closed, the process jumps to step S120 wherein it is determined whether the exposure time switch S22 has been closed. The process proceeds to step S121 with the switch S22 being closed, and jumps to step S132 with the switch S22 being open. At step S121, it is determined whether the UP switch S24 has been closed. If the UP switch S24 has been closed, the value of the exposure time data in the register TMR is increased by 1 Ev and it is determined whether the increased value is larger than the maximum value (the shortest limit exposure value available in the camera) of which data is stored in the register TMXR. If the increased value is larger than the maximum value, the data of the maximum value is set in the register TMR. If the increased value is not larger than the maximum value, the data of the increased value is left in the register TMR. Then, the process proceeds to step S141. When it is detected that the UP switch S24 has not been closed, it is then determined at step S125 whether the DOWN switch S25 has been closed. If the DOWN switch S25 has not been closed, the process goes back to the above mentioned step S102. If the DOWN switch S25 has been closed, the value of the content in the register TMR is reduced by 1 Ev and it is determined whether the reduced value is less than the minimum value of which data is stored in the register TMIR. If the reduced value is less than the minimum value, the content of the register TMIR is set in the register TMR. If the reduced value is not less than the minimum value, the data of the reduced value is left in the register TMR. Then, the process jumps to step S141.

At step S132, it is determined whether the AMBI mode has been set. If the AMBI mode has been set, this means that setting of to-be-changed light amount data is useless and the process goes back to step S104. When AMBI mode has not been set, it is determined at step S133 whether the UP switch has been closed. If the UP switch S24 has been closed, the value of the to-be-changed amount data set in the register GMR is increased by ⅛ Ev. When the increased value exceeds +3 Ev, the data of +3 Ev is set in the register GMR. When the increased value does not exceed +3 Ev, the data of the increased value is left in the register GMR. Then the process jumps to step S141. If the UP switch S24 is open, it is then determined at step S137 whether the DOWN switch S25 has been closed. When the DOWN switch S25 has been closed, the value of the content in the register GMR is reduced by ½ Ev and it is determined whether the reduced value is less than −3 Ev. If the reduced value is less than −3 Ev, the data of −3 Ev is set in the register GMR. If the reduced data is set less than −3 Ev, the data of the reduced value is left in the register GMR. Then, the process proceeds to step S141. If it is detected at step S137 that the DOWN switch S25 is open, the process goes back to step S102.

At step 141, it is determined whether the UP switch S24 is open. If the switch S24 is not open, the microcomputer waits until the switch S24 is opened. This is to change the value of the data by one step with each depression of the key. When the UP switch S24 is open, it is then determined whether the DOWN switch S25 is open. If the switch S25 is not open, the microcomputer waits until the switch S25 is opened. When it is detected that both switches S24 and S25 are open, it is then determined whether the light measurement and the exposure calculation have been done or not, i.e., whether the flag MCF is "1" or not. If the flag MCF is not "1", the displayed data is transmitted to the display circuit DPC and the process goes back to step S103. If the flag MCF is "1", it is then determined whether the flag AMF is "1" or not. If the flag AMF is "1", the calculation for AMBI mode, beginning at step S72 is made. If the AMF is "0", calculation for the flash photography in CORD or NON CORD mode is made from the step S90. This is to calculate a new diaphragm aperture value with the changed data.

Figure 22:
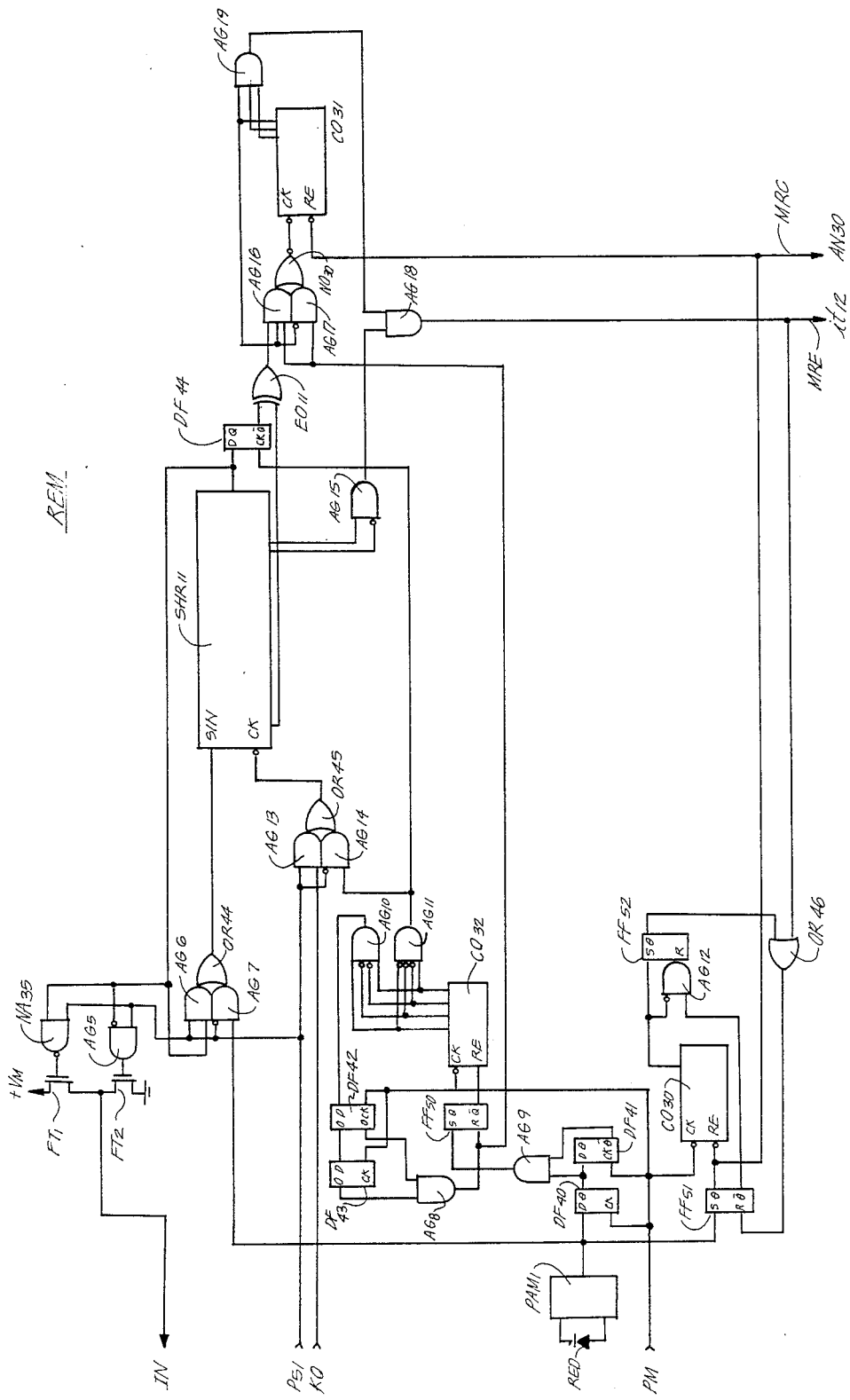
FIGS. 22 and 23 are circuit diagrams showing exemplary definite circuits of the blocks REM and OVM in the exposure meter IV shown in FIG. 18.

FIG. 22 shows an exemplary definite circuit of the signal receiving circuit REM shown in FIG. 18. The definite circuit has substantially the same construction as that of the signal receiving circuit DERE of the receiver II shown in FIG. 11. A light receiving or photocell element RED receives infrared light emitted by the light emitting element CHL in the receiver II. An amplifier PAM1 outputs digital signals with the carrier wave component being eliminated. The digital signals are read in the shift register SHR11 as in the circuit of FIG. 11. While the data reading in operation is being performed, the potential on the signal line MRC is a "High" level and the output of the NAND gate NA30 in FIG. 18 remains a "High" level to inhibit data transmission even if the data transmission switch OVS is closed. When the 7-byte data are correctly read twice, the output of an AND gate AN19 turns to a "High" level and an AND gate AG15 detect that the data have been provided by the receiver II, the output of an AND gate AG18 turns to a "High" level. In response to the "High" level, the output MRE of an inverter IN32 drop to a "Low" level and an interruption signal is applied to the interruption terminal it12. With this, the microcomputer starts the operation beginning at step S145 shown in FIG. 21.

At step S145, the potential at a terminal P51 is made a "High" level to enable or unblock AND gates AG5, AG6 and AG13 and a NAND gate NA35 shown in FIG. 22. If the serial data input/output operation is performed under this condition, eight clock pulses are input from the terminal CKO of the microcomputer MCM and a one-byte data is output in response to the rising of the clock pulses. The output data is read into a shift register SHR11 through the AND gate AG6 in synchronization with the drop of the clock pulses. When the data fed from the shift register SHR11 assumes a "High" level, the output of the NAND gate NA35 will be a "Low" level to make a P-channel FET FT1 conductive so that a "High" level signal is applied to the data input terminal SIN of the microcomputer. When the data output from the shift register SHR11 assumes a "Low" level, the output of the AND gate AG5 will be a "High" level to make the N-channel FET FT2 conductive so that a "Low" level signal is applied to the data input terminal SIN. The first byte data RM0 that was read as described above, is set in a register RMR0 of the microcomputer MCM.

Thereafter, in the same manner as described above, the data of the shortest exposure time available in the camera is set in the register TMXR, the longest exposure time data is set in the register TMIR, and the data of the synchronizable limit exposure time for flash photography is set in the register TMFR. Then the data of the aperture value corresponding to the minimum diaphragm aperture size is set in the register AMXR and the full aperture value data is set in the register AMIR. When the data "01H" representing that any particular lens has not been mounted on the camera is read, it is necessary that the diaphragm aperture data of the limits to be displayed by the exposure meter IV are set in the registers AMXR and AMIR. At step S159, the ISO data fed from the camera I is set in the register SMR and the potential at the terminal P51 is made a "Low" level. "1" is set for a flag CMF at step S161. The flag CMF shows that data have been read in from the camera I. At step S162, whether the AMBI mode has been set is determined. If the AMBI mode has been set, it is then determined whether the set exposure time in the register TMR is shorter than the shortest available exposure time. If the former is shorter than the latter, the content in the register TMXR is set in the register TMR and the process proceeds to step S167. When it is detected at step S167 that the AMBI mode has not been set, it is then determined whether the set exposure time is shorter than the synchronizable limit exposure time in the register TMFR. If the former is shorter than the latter, the data of the synchronizable limit exposure time is set in the register TMR, and the process proceeds to step S167. At step S167, it is determined whether the set exposure time is longer than the longest available exposure time in the register TMIR. If the former is longer tha the latter, the data of the longest available exposure time is set in the register TMR.

At step S169, the data MMR of the measuring mode is set at the bits b1 and b0 of the display data register DPR10.Then, at step S170, it is determined whether any out-of-controllable-range data is included in the data transmitted from the camera I through the signal receiving device II. If an out-of-range is included, "10" is set at the bits b3 and b2 of the register DPR10. If out-of-range data is not included, "01" is set at the same bits. Then, the data showing whether the camera exposure control operation has been performed or not, is set at the bit b5 of the register DPR10. At the bit b4 of the same register is set a data showing whether the charging in the flash device III has been completed or not. At step S175, it is determined whether the flag MCF is "1" or not. If the flag MCF is not "1", this means that the light measurement is not performed and the display data is transferred to the display circuit DPC. Then, the process goes back to step S103. When the flag MCF is "1", the light measurement is being performed. At step S177, it is determined whether the measurement in the AMBI mode is being performed, i.e., whether the flag AMF is "1" or not. If the AMBI mode measurement is being performed, the process returns to step S72 to make the exposure calculation for the AMBI mode on the basis of read data. If the measurement is not in the AMBI mode, the process returns to step S90 to make the calculation for the CORD or NON CORD mode.

If the potential on the signal line MRC is a "LOW" level at the time when the signal transmission switch OUS shown in FIG. 18 is closed, the output of the NAND gate NA30 turns to a "Low" level so that an interruption signal is input to the interruption terinal it13 and the microcomputer MCM performs the operation beginning at step S180, it is determined whether the reset switch RES has been closed or not. If the switch RES has been closed, the process jumps to step S210. If the switch RES has not been closed, the process proceeds to step S181. At step S181, "10" it set at the bits b7 and b6 of the register MTR0 where the data MT0 is set, and it is determined whether the NON CORD mode has been set or not. If the NON CORD mode has been set, it is then determined whether the flash light emission testing switch TES has been closed or not. If the test switch TES has been closed, "1" is set at the bit b5 of the register MTR0 to transmit the light emission testing signal. If the test switch TES has not been closed, "0" is set at the bit b5 and no light emission testing signal is transmitted. If the NON CORD mode has not been set, "0" is set at the bit b5 irrespective of the state of the test switch TES.

Then, "1" is set at the bit b4 of the register MTR0 to transmit the signal for the one-frame shot photography mode. Then, whether the potential at a terminal P43 is a "Low" leve or not is discriminated to determine whether the test switch TES has been closed or not. If the potential at the terminal P43 is a "Low" level, data of "000" is set at the bits b3, b2 and b1 of the register MTR0 to inhibit shutter releasing. If the test switch TES has not been closed, the data applied from the channel data output circuit CHS to the port P10 is set at the bits b3, b2 and b1 of the register MTR0.

A step S190, it is determined whether the flag MCF is "1" or not. If the flag MCF if "1", this means that the light measurement is being performed and the process proceeds to step S191. At step S191, it is determined whether the light measurement is made in the AMBI mode or not. If the light measurement is in the AMBI mode, "0" is set at the bit b0 of the register MTR0 to show that the exposure data are for ambient or constant light photography, and "00H" is set in the register MTR3 for the to-be-changed light amount data. If the light measurement is not in the AMBI mode, "1" is set at the bit b0 of the register MTR0 and the to-be-changed light amount data GMR is set in the register MTR3. At step S196, the diaphragm aperture value data in the register AMR is set in the register MTR1 and the exposure time data in the register TMR is set in the register MTR2. Then, the process jumps to step S216.

If it is detected at step S190 that the light measurement is not being made, the process jumps to step S213 wherein the data of "00H" is set in the registers MTR1, MTR2 and MTR3, and the process proceeds to step S216. If it is detected at step S180 that the reset switch RES has been closed, "00" is set at the bits b7 and b6 of the register MTR0 and "0" is set respectively at the bits b5 and b3 through b0 of the same register. "00H" is set respectively in the registers MTR1, MTR2 and MTR3 and the process proceeds to step S216.

Figure 23:
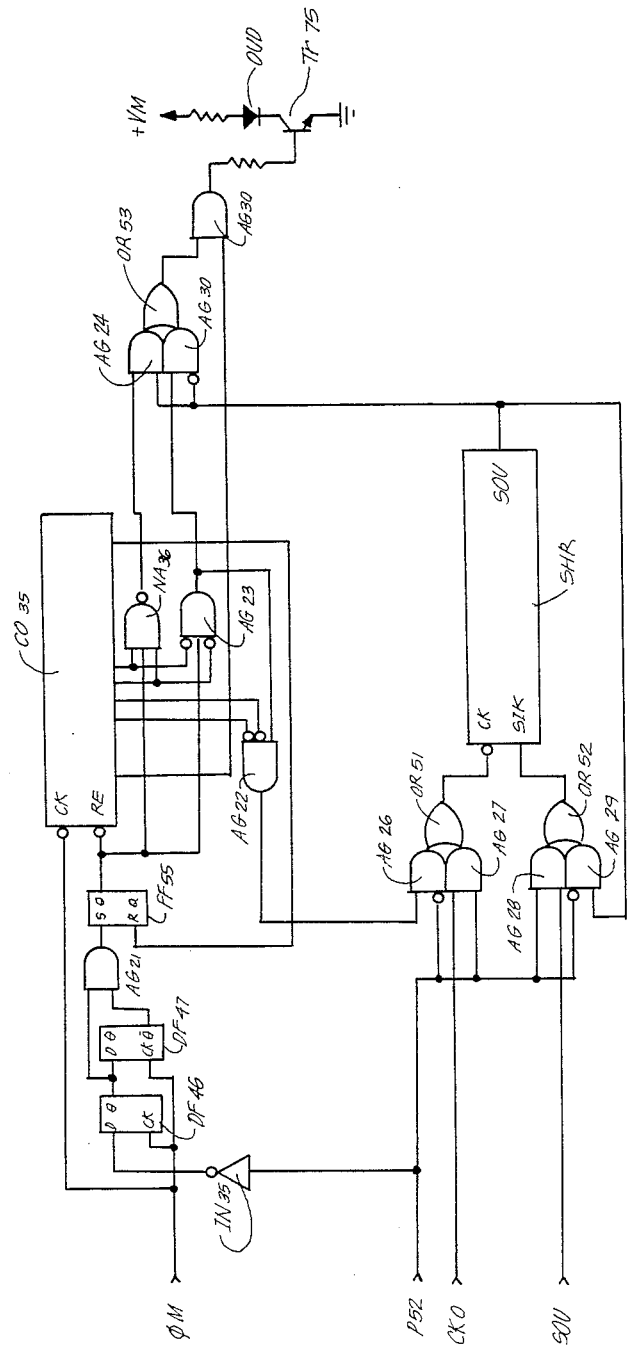

FIG. 23 shows an exemplary definite circuit of the data transmission circuit OUM shown in FIG. 18. The exemplary circuit has substantially the same construction as that of the circuit shown in FIG. 12. When the potential at the terminal P52 of the microcomputer MCM becomes a "High" level, AND gates AG27 and AG28 are enabled. Then, the 4-byte data MT0, MT1, MT2 and MT3 are serially and sequentially output from the microcomputer MCM and read in a shift register SHR15. When the microcomputer MCM makes the potential at its terminal P52 a "Low" level, the output of an inverter IN35 rises to a "High" level. In response to the rising of the output, the light emitting diode OUD emits light signals as in the circuit of FIG. 12.

When a given time, e.g., 30 sec has lapsed from the turning on of the power source BAM or the completion of the operation in response to an interruption signal applied to the terminal it11, it12 or it13, the microcomputer is interrupted by a timer output and performs the operation beginning at step S230. The bits b2 through b7 of the display data register DPR10 are first made "0" and a blank display data is set in the register AMR. Then, the potential at the terminal P53 is made a "High" level to transmit the content of the register DPR10 to the display circuit DPC. Further, blank data are transmitted to the display circuit DPC to turn off the display of the ISO data, exposure time, to-be-changed amount and diaphragm aperture value, and the process goes back to step S29 to stop the operation. Table 22 shows the registers and flags recited in the description with reference to flowcharts shown in FIGS. 19, 20 and 21.

TABLE 22

| Register or Flag | Function |
| --- | --- |
| SMR | Register for setting an ISO data |
| TMR | Register for setting an exposure time data |
| TMXR | Register for storing the shortest exposure time data |
| TMIR | Register for storing the longest exposure time data |
| TMFR | Register for storing the flash synchronizable limit exposure time data |
| GMR | Register for setting a to-be-changed flash light amount data |
| AMR | Register for setting a diaphragm aperture value data |
| AMXR | Register for storing the maximum aperture value |
| AMIR | Register for storing the minimum aperture value |
| DPR10 | Display data register (see Table 21) |
| MMR | Register for setting a light measuring mode data |
| IOR | Serial data input/output register |
| ADR1 ADR2 | Register for setting the light measurement data (A-D converted data) |
| BVR | Register for setting an object brightness data |
| QVR0 | Register for setting the measured flash light amount data |
| QVR | Register for setting the flash light amount data for the exposure calculation |
| AMF | Flag for showing completion of exposure calculation for AMBI mode |
| MCF | Flag for indicating completion of exposure calculation |
| CMF | Flag for indicating completion of capturing data from the camera |
| LMF | Flag for indicating completion of first data capturing |

FIG. 24 shows an exemplary definite circuit of the remote controlleer A(V). The circuit has basically the same construction as those shown in FIGS. 11 and 12. A power source battery BAR1 is connected with a main switch MSR1. A frequency divider DIV1 divides the frequency of the output of an oscillator OSC1 and outputs standard pulses $\phi A$ and $\phi B$. A switch S10 is operated to output a signal showing either one of the flash photography or the ambient or constant light photography and is linked with the switching or change-over member 41 shown in FIG. 1. When the switch S10 is closed, its output signal shows that exposure control data for the ambient light photography are transmitted. When the switch S10 is open, its output signal shows that exposure control data for flash photography are transmitted. A channel data output circuit CHS1 outputs a data commensurate with the setting position of the dial 43 shown in FIG. 1. A switch S11 is operated to alternatively select the continuous photography mode and the one shot photography mode. When the switch S11 is closed, the continuous photography mode is effected. When the switch S11 is open, the one shot photography mode is effected. The switch S11 is linked with the selection member 42 in FIG. 1. When a test light emission switch S12 is opened, a test light emission initiating signal is transmitted. Then the test tight emission switch S12 is opened, the channel data output circuit CHS1 outputs data of "000" to inhibit shutter releasing. A fixed data "10" representing the remote controller A(V) is output as the data for the bits b7 and b6. The above mentioned data make up the data MTO to be transmitted to the camera I.

When a switch S13 linked with the clear button 4, is closed, all the exposure control data become "OOH". The block APS outputs a data of the controlled diaphragm aperture value set by the dial 36 in FIG. 1. The block TIS outputs a data of the exposure timer set by the dial 35 in FIG. 1. When the signal transmission button 47 is depressed, a switch RS1 is closed to raise the output of a NOR gate NO35 to a "High" level if the remote controller is not in signal receiving condition. In response to the rising of the output of the NOR gate NO35, one clock pulse of the standard clock pulses $\phi A$ is output from an AND gate AG35 and the above mentioned various set data are latched by a shift register SHR17. Then, a next one clock pulse of the standard clock pulses $\phi A$ is output from an AND gate AG36 and a light emitting diode DOU1 transmits data as in the circuit of FIG. 12. Reception of data is also effected by a light receiving element IRD1 and preamplifier PAM2 as in the circuit of FIG. 11.

When the signals have been received and it is detected that the data are correctly read, a flip-flop FF64 is set to enable decoders DE1 and DE2. Then, the read data RM1 though RM6 are displayed by a liquid crystal display of a display circuit PDP by way of the decoder DE1. Light emitting diodes LD1, LD2 and LD3 make indications in accordance with the signal supplied through the decoder DE2 from the bits b5, b4 and b3 of the data RM0 which bits respectively show the charge completion, the shutter release completion and the out of controllable range. A counter CO45 counts the standard clock pulses $\phi B$ such that a flip-flop FF65 is reset to deenergize the light emitting diodes after a lapse of a given time and that a flip-flop FF64 is reset to deenergize the liquid crystal display after a lapse of additional given time. In the case when an incorrect data has been read or the data transmission is initiated, the flip-flop FF64 is reset through a OR gate OR63 to reset the flip-flop FF65 so that the display is deenergized.

FIG. 25 shows an exemplary definite circuit of the remote controller B(VI). The circuit has substantially the same construction as that of the circuit in FIG. 12. A power source battery BAR2 is connected with a main switch MSR2. A frequency divider DIV1 divides the frequency of the output of an oscillator OSC2 and outputs standard clock pulses $\phi A$. A circuit CHS2 outputs a channel data commensurate with the set position of the dial 51 in FIG. 1. A switch S20 linked with the mode selection member 50 in FIG. 1, is opened for one shot photography and closed for the continuous photography. A switch S21 is opened for the test flash light emission and closed in the case of no test light emission. When the switch S21 is opened, the channel data output circuit CHS2 outputs a data of "000" to inhibit shutter release operation. A fixed data "11" is set at the bits b7 and b6. The above mentioned data make up the data MT0. "00H" is set for the data MT1, MT2 and MT3. When the signal transmission button 53 in FIG. 1 is depressed, a switch RS2 is closed so that the above mentioned set data MT0 through MT3 are latched by a shift register SHR21 in response to a pulse fed from an AND gate AG71. In response to a pulse fed from an AND gate AG72, a light emitting diode DOU2 transmits data latched in the shift register SHR21 in the same manner as in the circuit of FIG. 12.

In the above embodiments, the case when a particular lens has not been mounted on the camera should be constructed to include the cases when a particular exchangeable lens has not been mounted completely, e.g., the exchangeable lens has not been turned to the position to be lock, and the case when a photographic optical system such as a bellows that is not provided with the data output means.

The flash device III and the receiver II may be coupled to the camera I in the following manner. A connector section having the same contact arrangement as that on the hot shoe 1 may be provided on the bottom of the camera to be coupled with an adapter such as a power grip having contacts corresponding to the contact on the camera bottom, with a hot shoe being provided on the adapter. With those constructions, the flash device III and the receiver II may be separately mounted on the hot shoe of the camera I and the hot shoe of the adapter and the receiver II need not be provided with the hot shoe 7. In this case, as it is possible that a motor drive device is attached to the bottom of the camera, the motor drive device should be provided with signal lines through which the signals from the camera bottom is output from the bottom of the motor drive device. The receiver II may be connected with the camera I and the flash device III through cables. Additionally, the signal receiving section 3 and the signal transmitting section of the receiver II may be provided on the front plane of the camera I with the function of the receiver II may be accommodated in the camera I.

Although the receiver II, the exposure meter IV and the remote controller A(V) in the above described embodiments have both the function of signal transmission and signal receiving, the signal transmission function of the receiver II and the signal receiving function of the exposure meter IV and the remote controller A(V) may be eliminated. In this case, the data RM0 through RM6 are unnecessary.

Further, the system may be modified such that the exposure meter IV or the remote controller A(V) transmits the data of the measured object brightness or the measured flash light amount to the camera I which calculates the exposure control data on the basis of the transmitted data. Additionally, both the system of the embodiment and the modified system may be provided for selective operation.

In another modified system, a data showing the number of steps by which the to-be-emitted flash light amount can be increased or reduced, may be transmitted from the flash device III to the camera I and then to the exposure meter IV through the receiver II. In this system, the exposure meter may automatically provide a limit for the to-be-changed data and the exposure calculation with uncontrollable data is not effected.

The out-of-controllable-range signal transmitted from the camera I through the receiver II may be transmitted as a signal showing which data is out-of-controllable range.

Although the flash photography data CF0 through CF3 are always transmitted, in the above embodiment, from the camera I to the flash device III in so far as the camera I is in operation, the system may be modified such that the exposure calculation for flash photography is performed and the flash photography data CF0 through CF3 are transmitted only when the camera I has received a charge completion signal.

Still further, although the channel can not be designated for the slave function of the receiver II and the test flash light emission function in the above embodiment, a shutter release signal transmission member may be additionally provided in the exposure meter IV and remote controller A(V) and B(VI) and the shutter release signal may be treated likely as the test light emission signal. Then, the shutter release signal and the channel signal are independent of each other and a channel may be designated for the test light emission and the slave light emission.

Additionally, the system may be modified such that a data of the number of photographies is transmitted from the remote controller to the receiver in the case of the continuous mode. In this case, the remote controller may be provided with a photographed frame number setting dial which may be settable to a 0 position for not releasing the shutter, an 1 position for the one shot photography, a 2 position for the two frame shot and so forth until for example a 5 position for the five frame photography, as well as the C position for the continuous photography as in the embodiment until the signal transmission button 47 or 53 is depressed again. The receiver may be arranged to compare the data transmitted from the remote controller with the data of the counted number of the closure of the X contact in the camera, the latter being supplied through the signal line ST1. The receiver may not output the shutter release signal after the two data coincide with each other.

In the embodiment, when data for daylight photography is supplied from the exposure meter or the remote controller, the camera supplies a signal of "1" for the bit b2 of the data CF3 to inhibit the flash firing. However, the following alternative may be possible. When the receiver receives a signal indicating that the supplied data is for the daylight photography, the transistor Tr13 in FIG. 9 is enforced to become conductive and a "Low" level signal is output along the signal line ST2 at the timing when the flash device outputs a charge completion signal, i.e., at the timing when the data of the bit b1 of the data FC0 is output. This can be done with the logic AND of the signal at the terminals FC and fi and the inverted signal at the terminal d0, and with the outputs of the AND logic and AND gate AN42 being applied through an OR gate to the base of the transistor Tr13. Then, even if the transistor Tr35 of the flash device in FIG. 16 becomes conductive, its output current will flow into the transistor Tr13 and the transistor Tr33 in FIG. 16 is non-conductive so that the D-flip-flop DF17 latches a "Low" level signal. Accordingly, the flash device will not be fired even if the X contact is closed in the charge completed condition. The camera do not read in the charge completion signal and do not indicate the charge completion.

The data exchange between on one hand the exposure meter and the remote controller and on the other hand the receiver may be made by means of ultrasonic wave or other communication means instead of the infrared signal. The setting of the data may be made by push buttons instead of the dials.

In the above embodiment, when the flash photography data are input to the camera I from the receiver II, the camera I supplies to the flash device III a signal (bit b3 of the data CF3) indicating the manual flash light emission, and the flash devie III receiving the signal, will not respond to the flash interruption signal fed thereafter. Other systems may be possible for the inhibition of such automatic flash light control. That is, the camera I may be provided with a gate circuit which inhibits the outputting of the flash interruption signal along the signal line ST3 when the receiver II supplies flash photography data. Otherwise, the camera I may be provided with a delay circuit which allow the output of the flash interruption signal after a lapse of a time sufficient for the flash device III to be fired fully, or the camera may control the operation of of power supply to the light measuring circuit which will be inoperative in that case. In this way, only the circuit in the camera I may inhibit the automatic light control of the flash device III. Still otherwise, when the receiver II receives the flash photography data from the exposure meter IV or the remote controller A(V) and detects the closure of the X contact Sx, the receiver II enforcedly drop the potential on the signal line ST3 for a given time such that a "High" level pulse fed from the camera I for the flash interruption is maintained at a "Low" level due to the suction of current within the receiver. With this operation, no flash interruption signal is transmitted to the flash device III and the automatic light control thereof is not effected.

We claim:

1. A method of transmitting camera data for use in a data transmission system for a camera, wherein a plurality of operation control data including exposure control data based on a light measurement are transmitted from an external exposure meter to a camera system including a camera and the operation of said camera system is controlled in accordance with the transmitted operation control data, said method comprising the steps of:
   serially and wirelessly transmitting the operation control data;
   initiating the operation of said camera upon completion of receipt of all the serial data; and
   controlling the operation of said camera system in accordance with the received serial data.

2. A method of transmitting camera data according to claim 1 wherein the operation control data includes a shutter release data generated in response to a manual operation and for initiating an exposure operation of said camera, said method includes the steps of; initiating the serial data transmission of the operation control data in response to the manual operation; and effecting the camera shutter release operation in accordance with the transmitted shutter release data.

3. A method of transmitting camera data according to claim 2 wherein the operation control data includes a system selection data for selectively causing a plurality of camera systems to operate, said method includes the steps of: discriminating in said camera system whether the transmitted operation control data includes or not a designating data that designates the camera system itself; and permitting the shutter release operation based on the shutter release data only when said camera system itself is designated.

4. A method of transmitting camera data according to claim 1 wherein said camera system includes a flash device and the operation control data includes a flash light emission testing data generated in response to a manual operation and for testing the flash light emission of said flash device, said method includes the steps of:

initiating the serial data transmission of the operation control data in response to the manual operation;

effecting the test light emission of said flash device based on the transmitted flash light emission testing data; and calculating the exposure control data based on the light measurement at the test light emission.

5. An exposure meter comprising:

a photographic data setting means wherein exposure time and film sensitivity value are manually set;

a light measuring means including a light receiving element and for performing the light measuring operation based on one of the two kinds of light measuring modes between for the daylight measurement and for the flash light measurement;

a first designating means wherein one of the light measuring modes between for the daylight measurement and for the flash light measurement of said light measuring means is manually designated;

a calculating means for calculating a proper diaphragm aperture value in accordance with the light measuring output of said light measuring means on the basis of the designated measuring mode of said first designating means and the set exposure time and film sensitivity value fed from said photographic data setting means;

a second designating means wherein the test light emission at said electronic flash device irrespective of photographic operation is manually designated;

a third designating means wherein the initiation of camera exposure operation is manually designated; and a signal transmitting means for transmitting in the form of light signals serial digital signals in order of data representing the light measuring mode, test light emission, initiation of exposure operation designated by said first through third designating means and set exposure time and calculated diaphragm aperture.

6. An exposure meter according to claim 5 wherein said signal transmitting means outputs signals one byte by one byte, first byte composing the data representative of light measuring mode, test light emission and initiation of exposure operation, second byte being set exposure time and third byte being calculated diaphragm aperture.

7. An exposure meter according to claim 6 wherein said signal transmitting means repeats the three bytes data transmission twice.

* * * * *